United States Patent
Jin et al.

(10) Patent No.: US 11,516,085 B2
(45) Date of Patent: *Nov. 29, 2022

(54) COMMUNICATION METHOD AND APPARATUS FOR BANDWIDTH PART SWITCHING IN WIRELESS COMMUNICATION SYSTEM

(71) Applicant: Samsung Electronics Co., Ltd., Suwon-si (KR)

(72) Inventors: Seung Ri Jin, Suwon-si (KR); Soeng Hun Kim, Suwon-si (KR); Dong Gun Kim, Suwon-si (KR); Jae Hyuk Jang, Suwon-si (KR); Alexander Sayenko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

This patent is subject to a terminal disclaimer.

(21) Appl. No.: 17/151,550

(22) Filed: Jan. 18, 2021

(65) Prior Publication Data

US 2021/0144062 A1    May 13, 2021

Related U.S. Application Data

(63) Continuation of application No. 16/193,540, filed on Nov. 16, 2018, now Pat. No. 10,897,399.

(30) Foreign Application Priority Data

Nov. 16, 2017 (KR) .................. 10-2017-0153118

(51) Int. Cl.
*H04W 36/00* (2009.01)
*H04W 72/04* (2009.01)
(Continued)

(52) U.S. Cl.
CPC ........ *H04L 41/0896* (2013.01); *H04L 1/0061* (2013.01); *H04L 43/0847* (2013.01);
(Continued)

(58) Field of Classification Search
CPC ............... H04L 41/0896; H04L 1/0061; H04L 43/0847; H04L 5/001; H04L 5/0053;
(Continued)

(56) References Cited

U.S. PATENT DOCUMENTS

| 10,897,399 B2 * | 1/2021 | Jin .................... H04W 36/0079 |
| 2013/0237208 A1 | 9/2013 | Vujcic |

(Continued)

FOREIGN PATENT DOCUMENTS

| EP | 3611866 A1 | 2/2020 |
| WO | 2019051177 A1 | 3/2019 |

OTHER PUBLICATIONS

Samsung, "Timer-based BWP switching," 3GPP TSG-RAN WG2 NR #99bis Meeting, R2-1711199, Prague, Czech, Oct. 9-13, 2017, 3 pages. (Year: 2017).*

(Continued)

*Primary Examiner* — Joshua Kading

(57) ABSTRACT

A method of UE includes receiving a radio resource control (RRC) message for configuring bandwidth parts (BWPs) of a serving cell, receiving a physical downlink control channel (PDCCH) indicating activation of a first BWP, performing a BWP switching to the first BWP indicated by the PDCCH, and starting a first downlink BWP timer associated with the first BWP. A UE includes a transceiver, and at least one controller coupled with the transceiver, the at least one controller configured to receive an RRC message for configuring BWPs of a serving cell, receive a PDCCH indicating activation of a first BWP, perform a BWP switching to
(Continued)

the first BWP indicated by the PDCCH, and start a first downlink BWP timer associated with the first BWP.

18 Claims, 26 Drawing Sheets

(51) Int. Cl.
| | |
|---|---|
| *H04W 36/14* | (2009.01) |
| *H04W 48/20* | (2009.01) |
| *H04W 48/18* | (2009.01) |
| *H04L 41/0896* | (2022.01) |
| *H04W 74/08* | (2009.01) |
| *H04W 76/27* | (2018.01) |
| *H04W 36/04* | (2009.01) |
| *H04W 36/30* | (2009.01) |
| *H04W 36/12* | (2009.01) |
| *H04W 8/04* | (2009.01) |
| *H04L 1/00* | (2006.01) |
| *H04L 43/0823* | (2022.01) |
| *H04W 56/00* | (2009.01) |
| *H04L 5/00* | (2006.01) |
| *H04L 69/326* | (2022.01) |
| *H04L 69/324* | (2022.01) |
| *H04W 92/02* | (2009.01) |

(52) U.S. Cl.
CPC ......... *H04W 8/04* (2013.01); *H04W 36/0022* (2013.01); *H04W 36/0027* (2013.01); *H04W 36/0055* (2013.01); *H04W 36/0077* (2013.01); *H04W 36/0079* (2018.08); *H04W 36/04* (2013.01); *H04W 36/125* (2018.08); *H04W 36/14* (2013.01); *H04W 36/305* (2018.08); *H04W 48/18* (2013.01); *H04W 48/20* (2013.01); *H04W 56/002* (2013.01); *H04W 72/042* (2013.01); *H04W 74/0833* (2013.01); *H04W 76/27* (2018.02); *H04L 5/001* (2013.01); *H04L 69/324* (2013.01); *H04L 69/326* (2013.01); *H04W 92/02* (2013.01)

(58) Field of Classification Search
CPC ... H04L 5/0078; H04L 5/0098; H04L 69/324; H04L 69/326; H04W 8/04; H04W 36/0022; H04W 36/0027; H04W 36/0055; H04W 36/0077; H04W 36/0079; H04W 36/04; H04W 36/125; H04W 36/14; H04W 36/305; H04W 48/18; H04W 48/20; H04W 56/002; H04W 72/042; H04W 74/0833; H04W 76/27; H04W 92/02; H04W 24/10

See application file for complete search history.

(56) References Cited

U.S. PATENT DOCUMENTS

| | | |
|---|---|---|
| 2014/0254452 A1 | 9/2014 | Golitschek Edler Von Elbwart et al. |
| 2018/0220486 A1 | 8/2018 | Tseng et al. |
| 2019/0124558 A1 | 4/2019 | Ang et al. |
| 2019/0132109 A1 | 5/2019 | Zhou et al. |
| 2019/0132857 A1 | 5/2019 | Babaei et al. |
| 2019/0199503 A1 | 6/2019 | Son |
| 2019/0364602 A1 | 11/2019 | Yi et al. |
| 2020/0029316 A1 | 1/2020 | Zhou et al. |
| 2020/0351064 A1 | 11/2020 | Shi |
| 2021/0167930 A1* | 6/2021 | Jeon ................... H04L 27/2607 |

OTHER PUBLICATIONS

Supplementary European Search Report in connection with European Application No. 18880012.2 dated Oct. 7, 2020, 11 pages.

International Search Report and Written Opinion of the International Searching Authority in connection with International Application No. PCT/KR2018/014093, dated Feb. 27, 2019, 11 pages.

Huawei, et al., "Stage-2 TP for BWP," R2-1710218, 3GPP TSG-RAN WG2 #99bis, Prague, Czech Republic, Oct. 9-13, 2017, 2 pages.

Huawei, et al., "Remaining issues on bandwidth part," R1-1717077, 3GPP TSG RAN WG1 Meeting #90bis, Prague, Czech Republic, Oct. 9-13, 2017, 11 pages.

Mediatek Inc, "Remaining Details on Bandwidth Part Operation in NR," R1-1718327, 3GPP TSG RAN WG1 Meeting 90bis, Prague, Czech Republic, Oct. 9-13, 2017, 13 pages.

Samsung, "On Bandwidth Part Operation," R1-1716019, 3GPP TSG RAN WG1 NR Ad-Hoc#3, Nagoya, Japan, Sep. 18-21, 2017, 5 pages.

Korean Intellectual Property Office, "Notice of Allowance" dated Dec. 30, 2021, in connection with Korean Patent Application No. 10-2017-0153118, 4 pages.

Samsung, "The Impact of Bandwidth Part on RAN2: Overview and Issues" 3GPP TSG RAN WG2 #99bis, R2-1711595, Prague, Czech Republic, Oct. 9 to 13, 2017, 8 pages.

* cited by examiner

FIG. 10
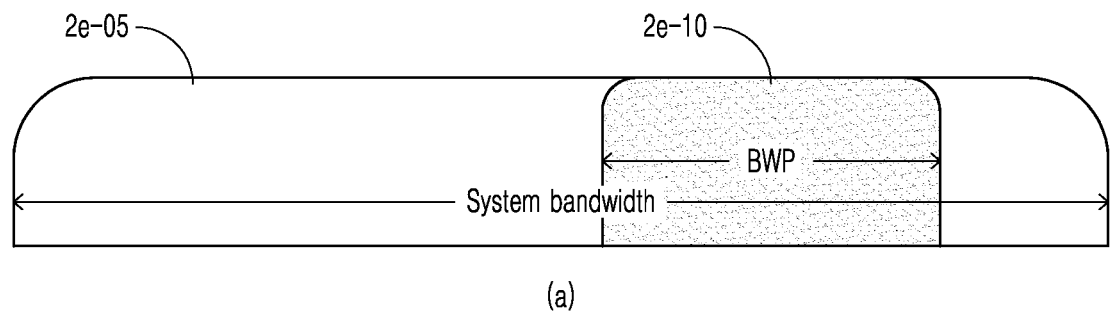
(a)
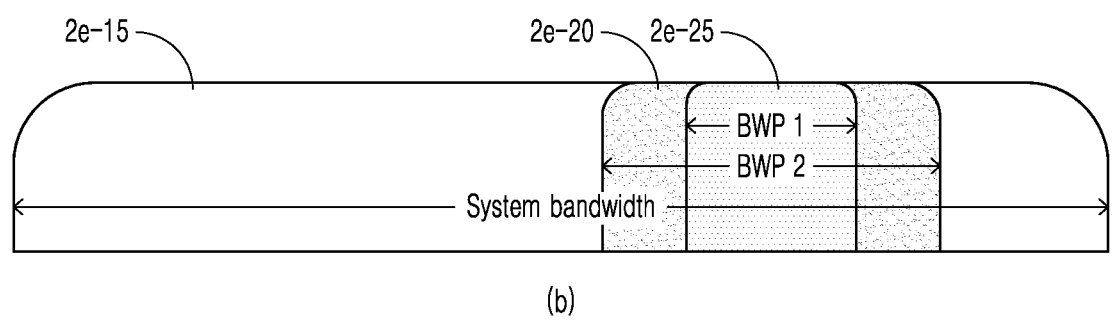
(b)
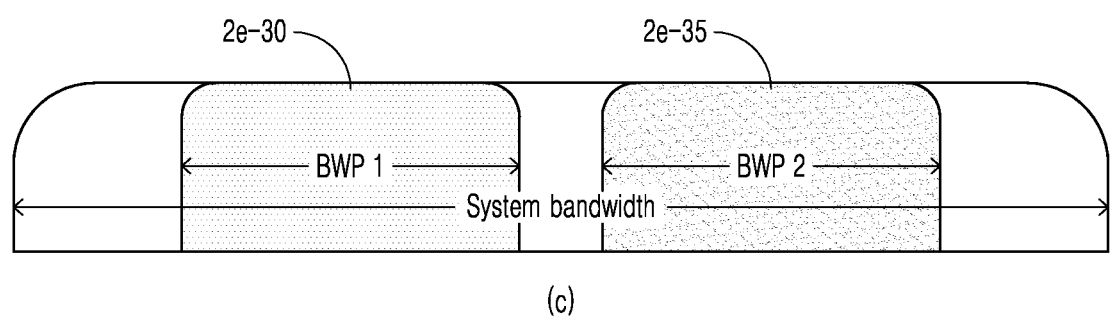
(c)

COMMUNICATION METHOD AND APPARATUS FOR BANDWIDTH PART SWITCHING IN WIRELESS COMMUNICATION SYSTEM

CROSS-REFERENCE TO RELATED APPLICATIONS

This application is a continuation of application Ser. No. 16/193,540, filed Nov. 16, 2018, which is based on and claims priority under 35 U.S.C. § 119 to Korean Patent Application No. 10-2017-0153118, filed on Nov. 16, 2017, in the Korean Intellectual Property Office, the disclosures of which are incorporated by reference herein their entirety.

BACKGROUND

1. Field

The disclosure relates to communication methods and apparatuses in wireless communication systems.

2. Description of Related Art

To meet the increase in demand for wireless data traffic after the commercialization of 4G communication systems, considerable efforts have been made to develop improved 5G communication systems or pre-5G communication systems. This is one reason why '5G communication systems' or 'pre-5G communication systems' are called 'beyond 4G network communication systems' or 'post long term evolution (LTE) systems'. In order to achieve a high data rate, 5G communication systems are being developed to be implemented in a super-high frequency band (millimeter wave (mmWave)), e.g., a band of 60 GHz. In order to reduce path loss in such a super-high frequency band and to increase a propagation distance of electric waves in 5G communication systems, various technologies such as beamforming, massive multiple input multiple output (massive MIMO), full dimensional MIMO (FD-MIMO), array antennas, analog beamforming, and large scale antennas are being studied. In order to improve system networks for 5G communication systems, various technologies such as evolved small cells, advanced small cells, cloud radio access networks (cloud RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency shift keying (FSK) and quadrature amplitude modulation (QAM) (FQAM) and sliding window superposition coding (SWSC) and advanced access technologies such as filter bank multi-carrier (FBMC), non-orthogonal multiple access (NOMA), and sparse code multiple access (SCMA) have been developed.

The Internet has evolved from a human-based connection network, where humans create and consume information, to the Internet of things (IoT), where distributed elements such as objects exchange information with each other to process the information. Internet of everything (IoE) technology, in which the IoT technology is combined with, for example, technology for processing big data through connection with a cloud server, is being newly provided. In order to implement the IoT, various technological elements such as a sensing technology, wired/wireless communication and network infrastructures, a service interface technology, and a security technology are required. In recent years, technologies related to sensor networks for connecting objects, machine-to-machine (M2M) communication, and machine type communication (MTC) have been studied. In the IoT environment, intelligent Internet technology (IT) services may be provided to collect and analyze data obtained from connected objects and thus to create new values in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, MTC, etc. are implemented by using 5G communication technology including beamforming, MIMO, array antennas, etc. Application of a cloud RAN as the above-described big data processing technology may be an example of convergence of the 5G communication technology and the IoT technology.

SUMMARY

Provided are methods and apparatuses for appropriately providing communication services in wireless communication systems.

Additional aspects will be set forth in part in the description which follows and, in part, will be apparent from the description, or may be learned by practice of the presented embodiments.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 is a diagram for describing an exemplary scenario of configuring a bandwidth part (BWP) in a next-generation mobile communication system to which an embodiment is applicable;

DETAILED DESCRIPTION

Figure 1:
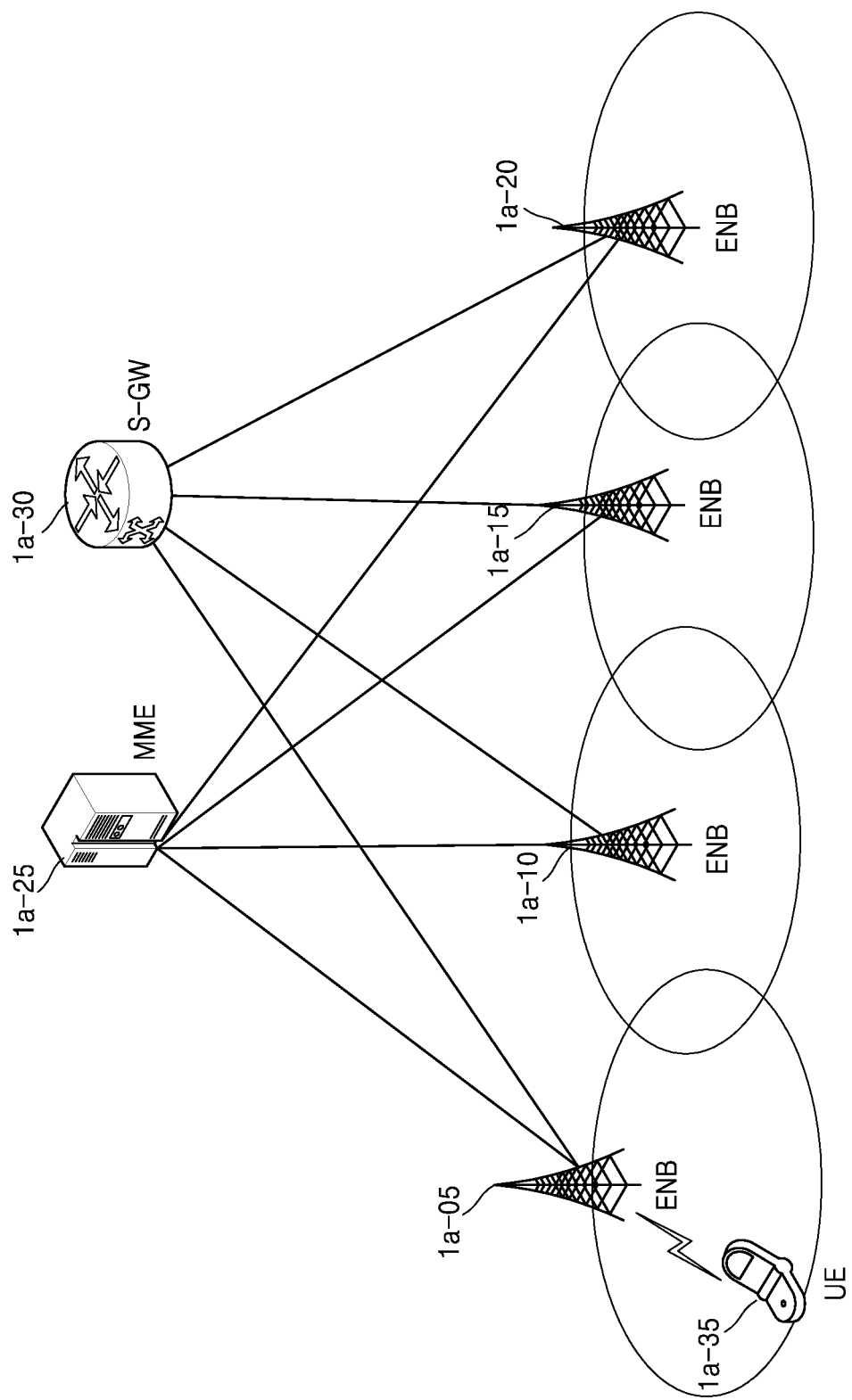
FIG. 1 is a diagram illustrating an exemplary structure of a long term evolution (LTE) system.

FIGS. 1 through 28, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In one aspect, a method for operating user equipment (UE) is provided. The method includes receiving a Radio Resource Control (RRC) message for configuring bandwidth parts (BWPs) of a serving cell, receiving a Physical Downlink Control Channel (PDCCH) indicating activation of a first BWP, performing a BWP switching to the first BWP indicated by the PDCCH, and starting a first downlink BWP timer associated with the first BWP.

In another aspect, a user equipment (UE) for transmitting and receiving data in a wireless communication system is provided. The UE includes a transceiver, and at least one controller coupled with the transceiver, the at least one controller configured to receive a Radio Resource Control (RRC) message for configuring bandwidth parts (BWPs) of a serving cell, receive a Physical Downlink Control Channel (PDCCH) indicating activation of a first bandwidth part (BWP), perform a BWP switching to the first BWP indicated by the PDCCH, and start a first downlink BWP timer associated with the first BWP.

In yet another aspect, a non-transitory computer-readable medium includes program code, wherein the program code that, when executed by a processor, causes the processor to receive a Radio Resource Control (RRC) message for configuring bandwidth parts (BWPs) of a serving cell, receive a Physical Downlink Control Channel (PDCCH) indicating activation of a first bandwidth part (BWP), perform a BWP switching to the first BWP indicated by the PDCCH, and start a first downlink BWP timer associated with the first BWP.

Hereinafter, embodiments of the present disclosure will be described with reference to accompanying drawings.

While describing the embodiments, technical content that is well-known in the related fields and not directly related to the present disclosure will not be provided. By omitting redundant descriptions, the essence of the present disclosure will not be obscured and may be clearly explained.

For the same reasons, components may be exaggerated, omitted, or schematically illustrated in drawings for clarity. Also, the size of each component does not completely reflect the actual size. In the drawings, like reference numerals denote like elements.

Features of one or more embodiments of the present disclosure and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art, and the present disclosure will only be defined by the appended claims.

Here, it will be understood that combinations of blocks in flowcharts or process flow diagrams may be performed by computer program instructions. Since these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments of the present disclosure means a software component or hardware component such as a Field-Programmable Gate Array (FPGA) or an Application-Specific Integrated Circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more Central Processing Units (CPUs) in a device or security multimedia card. Also, in the embodiments, the "unit" may include at least one processor.

In the following description, terms identifying access nodes, terms indicating network entities, terms indicating messages, terms indicating interfaces between network entities, terms indicating various types of identification information, etc. are used merely for convenience of explanation. Therefore, the present disclosure is not limited to these terms and other terms having technically equivalent meanings may also be used.

To facilitate explanation, the present disclosure uses terms and names defined in and derived from the 3rd Generation Partnership Project (3GPP) long term evolution (LTE) standards. However, the present disclosure is not limited to these terms and names but may be equally applied to systems according to other standards.

FIG. 1 is a diagram illustrating the structure of an LTE system.

Referring to FIG. 1, a radio access network (RAN) of the LTE system includes evolved base stations (e.g., evolved nodes B (eNBs) or nodes B) 1a-05, 1a-10, 1a-15, and 1a-20, a mobility management entity (MME) 1a-25, and a serving-gateway (S-GW) 1a-30. A user equipment (UE) or mobile station (MS) 1a-35 accesses an external network via the eNB 1a-05, 1a-10, 1a-15, or 1a-20 and the S-GW 1a-30.

In FIG. 1, each of the eNBs 1a-05, 1a-10, 1a-15, and 1a-20 is an access node of a cellular network, which provides radio access to UEs for accessing the network, and corresponds to a legacy node B of a universal mobile telecommunications system (UMTS). Each eNB 1a-05, 1a-10, 1a-15, or 1a-20 is connected to the UE 1a-35 through radio channels and performs complex functions compared to the legacy node B. Since all user traffic data including real-time services such as voice over Internet protocol (VoIP) is serviced through shared channels in the LTE system, an entity for collating buffer status information of UEs, available transmit power status information, channel status information, etc. and performing scheduling is required and each of the eNBs 1a-05, 1a-10, 1a-15, and 1a-20 serves as such an entity. That is, the eNBs 1a-05, 1a-10, 1a-15, and 1a-20 support connections between UEs and a core network (CN). A single eNB generally controls multiple cells. For example, the LTE system uses radio access technology such as orthogonal frequency-division multiplexing (OFDM) at a bandwidth of 20 MHz to achieve a data rate of 100 Mbps. The LTE system also uses adaptive modulation & coding (AMC) to determine a modulation scheme and a channel coding rate in accordance with a channel status of the UE 1a-35. The S-GW 1a-30 is an entity for providing data bearers and configures or releases the data bearers under the control of the MME 1a-25. The MME 1a-25 is an entity for performing a mobility management function and various control functions for the UE 1a-35 and is connected to the eNBs 1a-05, 1a-10, 1a-15, and 1a-20. Furthermore, the MME 1a-25 and the S-GW 1a-30 perform authentication, bearer management, etc. for UEs accessing the network, and process packets received from or to be delivered to the eNBs 1a-05, 1a-10, 1a-15, and 1a-20.

Figure 2:
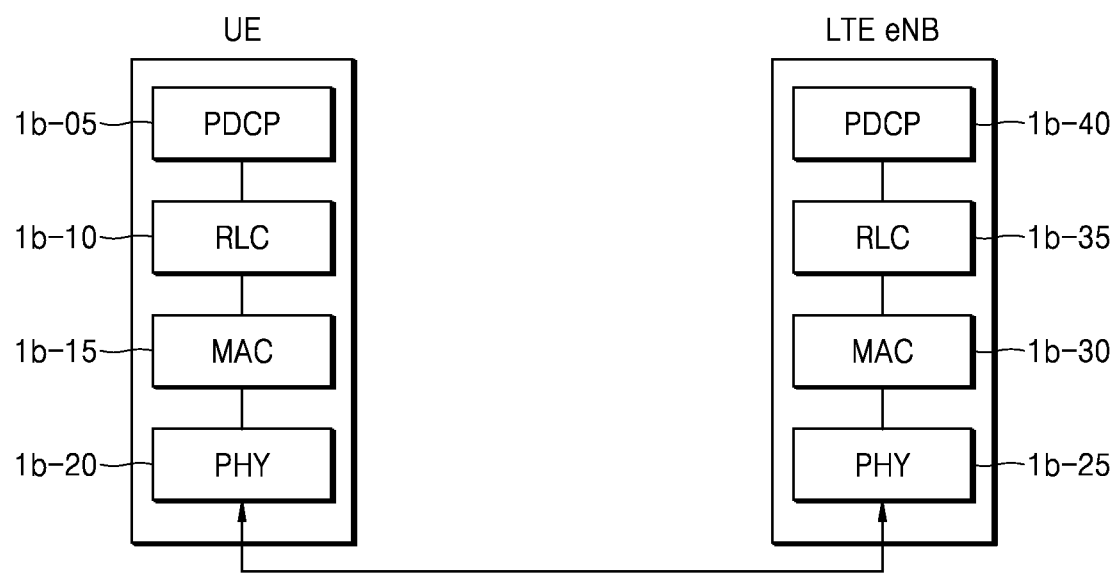
FIG. 2 is a diagram illustrating an exemplary radio protocol architecture of an LTE system.

FIG. 2 is a diagram illustrating a radio protocol architecture of an LTE system.

Referring to FIG. 2, the radio protocol architecture of the LTE system includes packet data convergence protocol (PDCP) layers 1b-05 and 1b-40, radio link control (RLC) layers 1b-10 and 1b-35, and media access control (MAC) layers 1b-15 and 1b-30 respectively for a UE and an eNB. The PDCP layer 1b-05 or 1b-40 is in charge of IP header compression/decompression, etc. Main functions of the PDCP layer 1b-05 or 1b-40 are summarized below.

Header compression and decompression: robust header compression (ROHC) only
Transfer of user data
In-sequence delivery of upper layer packet data units (PDUs) at PDCP re-establishment procedure for RLC acknowledged mode (AM)
For split bearers in DC (only support for RLC AM): PDCP PDU routing for transmission and PDCP PDU reordering for reception
Duplicate detection of lower layer service data units (SDUs) at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink The RLC layer 1b-10 or 1b-35 performs, for example, an automatic repeat request (ARQ) operation by reconfiguring PDCP PDUs to appropriate sizes. Main functions of the RLC layer 1b-10 or 1b-35 are summarized below.

Transfer of upper layer PDUs.
Error Correction through ARQ (only for AM data transfer).
Concatenation, segmentation and reassembly of RLC SDUs (only for unacknowledged mode (UM) and AM data transfer).
Re-segmentation of RLC data PDUs (only for AM data transfer).
Reordering of RLC data PDUs (only for UM and AM data transfer).
Duplicate detection (only for UM and AM data transfer).
Protocol error detection (only for AM data transfer).
RLC SDU discard (only for UM and AM data transfer).
RLC re-establishment.

The MAC layer 1b-15 or 1b-30 is connected to multiple RLC entities configured for a single UE and multiplexes RLC PDUs into a MAC PDU and demultiplexes the RLC PDUs from the MAC PDU. Main functions of the MAC layer 1b-15 or 1b-30 are summarized below.

Mapping between logical channels and transport channels.
Multiplexing/demultiplexing of MAC SDUs belonging to one or different logical channels into/from transport blocks (TB) delivered to/from the physical layer on transport channels.
Scheduling information reporting.
Error correction through hybrid ARQ (HARM).
Priority handling between logical channels of one UE.
Priority handling between UEs by means of dynamic scheduling.
Multimedia broadcast multicast service (MBMS) service identification.
Transport format selection
Padding.

A physical (PHY) layer 1b-20 or 1b-25 channel-codes and modulates upper layer data into OFDM symbols and transmits the OFDM symbols through a radio channel, or demodulates OFDM symbols received through a radio channel and channel-decodes and delivers the OFDM symbols to an upper layer. The PHY layer 1b-20 or 1b-25 also has the error correction function through HARQ, and a receiver transmits 1-bit to indicate whether packet data transmitted from a transmitter is appropriately received. This bit is called HARQ acknowledgment (ACK)/negative acknowledgment (NACK) information. Downlink (DL) HARQ ACK/NACK information in response to uplink (UL) transmission may be transmitted through a physical HARQ indicator channel (PHICH) and UL HARQ ACK/NACK information in response to DL transmission may be transmitted through a physical uplink control channel (PUCCH) or a physical uplink shared channel (PUSCH).

Although not shown in FIG. 2, radio resource control (RRC) layers are present above the PDCP layers 1b-05 and 1b-40 of the UE and the eNB. To control radio resources, the RRC layers may exchange configuration control information related to access and measurement.

The PHY layer 1b-20 or 1b-25 may include one or more frequencies/carriers and a technology for simultaneously setting and using multiple frequencies is called carrier aggregation (CA). According to the CA technology, instead of using only one carrier for communication between a UE and an eNB, one primary carrier and multiple secondary carriers are used and thus data capacity may be greatly increased by the number of secondary carriers. In LTE, a cell served by an eNB using the primary carrier is called a primary cell (PCell) and a cell served by an eNB using the secondary carrier is called a secondary cell (SCell).

Figure 3:
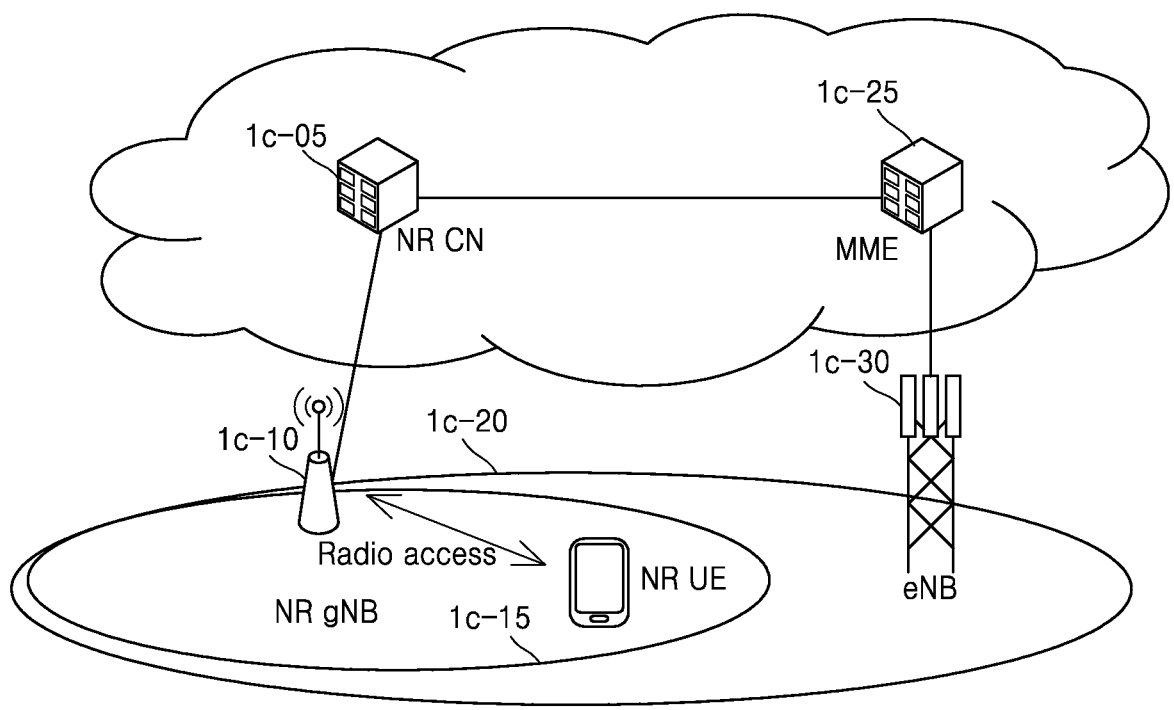
FIG. 3 is a diagram illustrating an exemplary structure of a next-generation mobile communication system to which an embodiment is applicable.

FIG. 3 is a diagram illustrating the structure of a next-generation mobile communication system to which an embodiment is applicable.

Referring to FIG. 3, a radio access network of the next-generation mobile communication system (e.g., a new radio (NR) or 5G system) may include a new radio node B (NR NB) or new radio next-generation node B (NR gNB) 1c-10 and a new radio core network (NR CN) or next-generation core network (NG CN) 1c-05. A new radio user equipment (NR UE) or UE 1c-15 accesses an external network via the NR gNB 1c-10 and the NR CN 1c-05.

In FIG. 3, the NR gNB 1c-10 corresponds to an evolved node B (eNB) of a legacy LTE system. The NR gNB 1c-10 is connected to the NR UE 1c-15 through radio channels and may provide superior services compared to a legacy node B. Since all user traffic data is serviced through shared channels in the next-generation mobile communication system, an entity for collating buffer status information of UEs, available transmit power status information, channel status information, etc. and performing scheduling is required and the NR gNB 1c-10 serves as such an entity. A single NR gNB generally controls multiple cells. A bandwidth greater than the maximum bandwidth of LTE may be given to achieve an ultrahigh data rate, and beamforming technology may be added to radio access technology such as orthogonal frequency-division multiplexing (OFDM). Adaptive modulation & coding (AMC) is also used to determine a modulation scheme and a channel coding rate in accordance with a channel status of the NR UE 1c-15. The NR CN 1c-05 performs functions such as mobility support, bearer setup, and quality of service (QoS) setup. The NR CN 1c-05 is an entity for performing a mobility management function and various control functions for the NR UE 1c-15 and is connected to multiple NR gNBs. The next-generation mobile communication system may cooperate with the legacy LTE system, and the NR CN 1c-05 is connected to an MME 1c-25 through a network interface. The MME 1c-25 is connected to a legacy eNB 1c-30.

Figure 4:
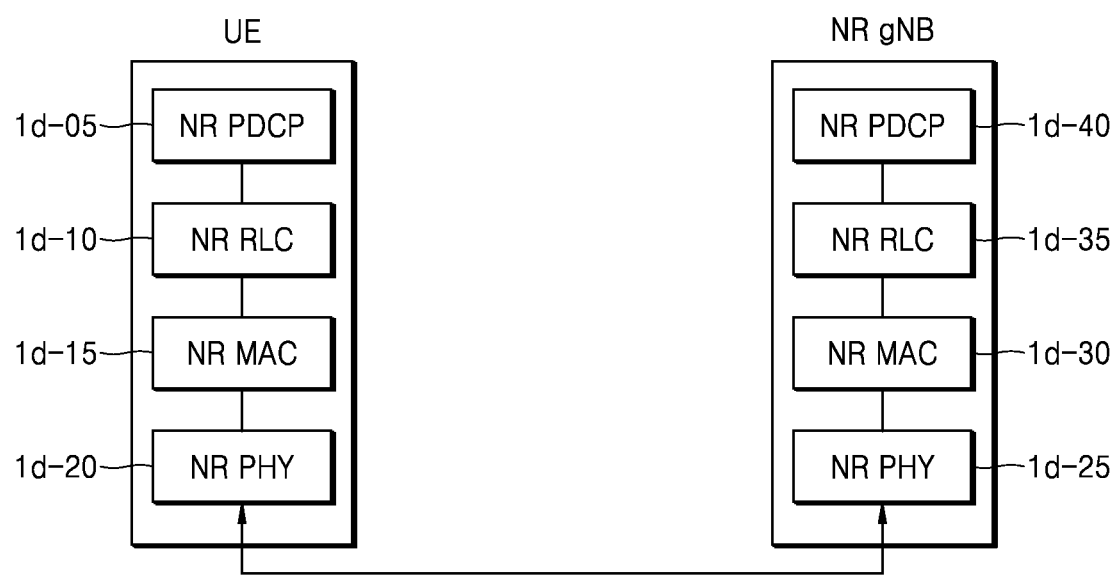
FIG. 4 is a diagram illustrating an exemplary radio protocol architecture of a next-generation mobile communication system to which an embodiment is applicable.

FIG. 4 is a diagram illustrating a radio protocol architecture of a next-generation mobile communication system to which an embodiment is applicable.

Referring to FIG. 4, the radio protocol architecture of the next-generation mobile communication system includes NR PDCP layers 1d-05 and 1d-40, NR RLC layers 1d-10 and 1d-35, NR MAC layers 1d-15 and 1d-30 respectively for a UE and a NR gNB.

Main functions of the NR PDCP layer 1d-05 or 1d-40 may include some of the following functions.
  Header compression and decompression: ROHC only.
  Transfer of user data.
  In-sequence delivery of upper layer PDUs.
  PDCP PDU reordering for reception.
  Duplicate detection of lower layer SDUs.
  Retransmission of PDCP SDUs.
  Ciphering and deciphering.
  Timer-based SDU discard in uplink.

Herein, the reordering function of the NR PDCP layer 1d-05 or 1d-40 refers to a function of reordering PDCP PDUs received from a lower layer, on a PDCP sequence number (SN) basis and may include a function of delivering the reordered data to an upper layer in order, a function of recording missing PDCP PDUs by reordering the PDCP PDUs, a function of reporting status information of the missing PDCP PDUs to a transmitter, and a function of requesting to retransmit the missing PDCP PDUs.

Main functions of the NR RLC layer 1d-10 or 1d-35 may include some of the following functions.
  Transfer of upper layer PDUs.
  In-sequence delivery of upper layer PDUs.
  Out-of-sequence delivery of upper layer PDUs.
  Error Correction through ARQ.
  Concatenation, segmentation and reassembly of RLC SDUs.
  Re-segmentation of RLC data PDUs.
  Reordering of RLC data PDUs.
  Duplicate detection.
  Protocol error detection.
  RLC SDU discard.
  RLC re-establishment.

Herein, the in-sequence delivery function of the NR RLC layer 1d-10 or 1d-35 refers to a function of delivering RLC SDUs received from a lower layer, to an upper layer in order and may include a function of reassembling multiple RLC SDUs segmented from a RLC SDU and delivering the RLC SDU when the segmented RLC SDUs are received, a function of reordering received RLC PDUs on a RLC SN or PDCP SN basis, a function of recording missing RLC PDUs by reordering the RLC PDUs, a function of reporting status information of the missing RLC PDUs to a transmitter, a function of requesting to retransmit the missing RLC PDUs, a function of delivering only RLC SDUs previous to a missing RLC SDU, to the upper layer in order, when the missing RLC SDU exists, a function of delivering all RLC SDUs received before a timer is started, to the upper layer in order, although a missing RLC SDU exists, when a certain timer is expired, or a function of delivering all RLC SDUs received up to a current time, to the upper layer in order, although a missing RLC SDU exists, when a certain timer is expired. In this case, the NR RLC layer 1d-10 or 1d-35 may process the RLC PDUs in order of reception (in order of arrival regardless of sequence numbers) and deliver the RLC PDUs to a PDCP entity out of order (out-of-sequence delivery), and reassemble segments received or stored in a buffer, into a whole RLC PDU and process and deliver the RLC PDU to the PDCP entity. The NR RLC layer 1d-10 or 1d-35 may not have a concatenation function, and the concatenation function may be performed by the NR MAC layer 1d-15 or 1d-30 or be replaced with a multiplexing function of the NR MAC layer 1d-15 or 1d-30.

Herein, the out-of-sequence delivery function of the NR RLC layer 1d-10 or 1d-35 refers to a function of delivering the RLC SDUs received from the lower layer, to the upper layer out of order and may include a function of reassembling multiple RLC SDUs segmented from a RLC SDU and delivering the RLC SDU when the segmented RLC SDUs are received, or a function of storing RLC SNs or PDCP SNs of received RLC PDUs and recording missing RLC PDUs by ordering the RLC PDUs.

The NR MAC layer 1d-15 or 1d-30 may be connected to multiple NR RLC entities configured for a single UE, and main functions of the NR MAC layer 1d-15 or 1d-30 may include some of the following functions.
  Mapping between logical channels and transport channels.
  Multiplexing/demultiplexing of MAC SDUs.
  Scheduling information reporting.
  Error correction through HARQ.
  Priority handling between logical channels of one UE.
  Priority handling between UEs by means of dynamic scheduling.
  MBMS service identification.
  Transport format selection.
  Padding.

A NR PHY layer 1d-20 or 1d-25 may channel-code and modulate upper layer data into OFDM symbols and transmit the OFDM symbols through a radio channel, or demodulate OFDM symbols received through a radio channel and channel-decode and deliver the OFDM symbols to an upper layer.

Although not shown in FIG. 2, NR RRC layers are present above the NR PDCP layers 1d-05 and 1d-40 of the UE and the NR gNB. To control radio resources, the NR RRC layers may exchange configuration control information related to access and measurement.

The NR PHY layer 1d-20 or 1d-25 may include one or more frequencies/carriers and a technology for simultaneously setting and using multiple frequencies is called CA. According to the CA technology, instead of using only one carrier for communication between a UE and an eNB, one primary carrier and multiple secondary carriers are used and thus data capacity may be greatly increased by the number of secondary carriers. In LTE, a cell served by an eNB using the primary carrier is called a PCell and a cell served by an eNB using the secondary carrier is called an SCell.

Figure 5:
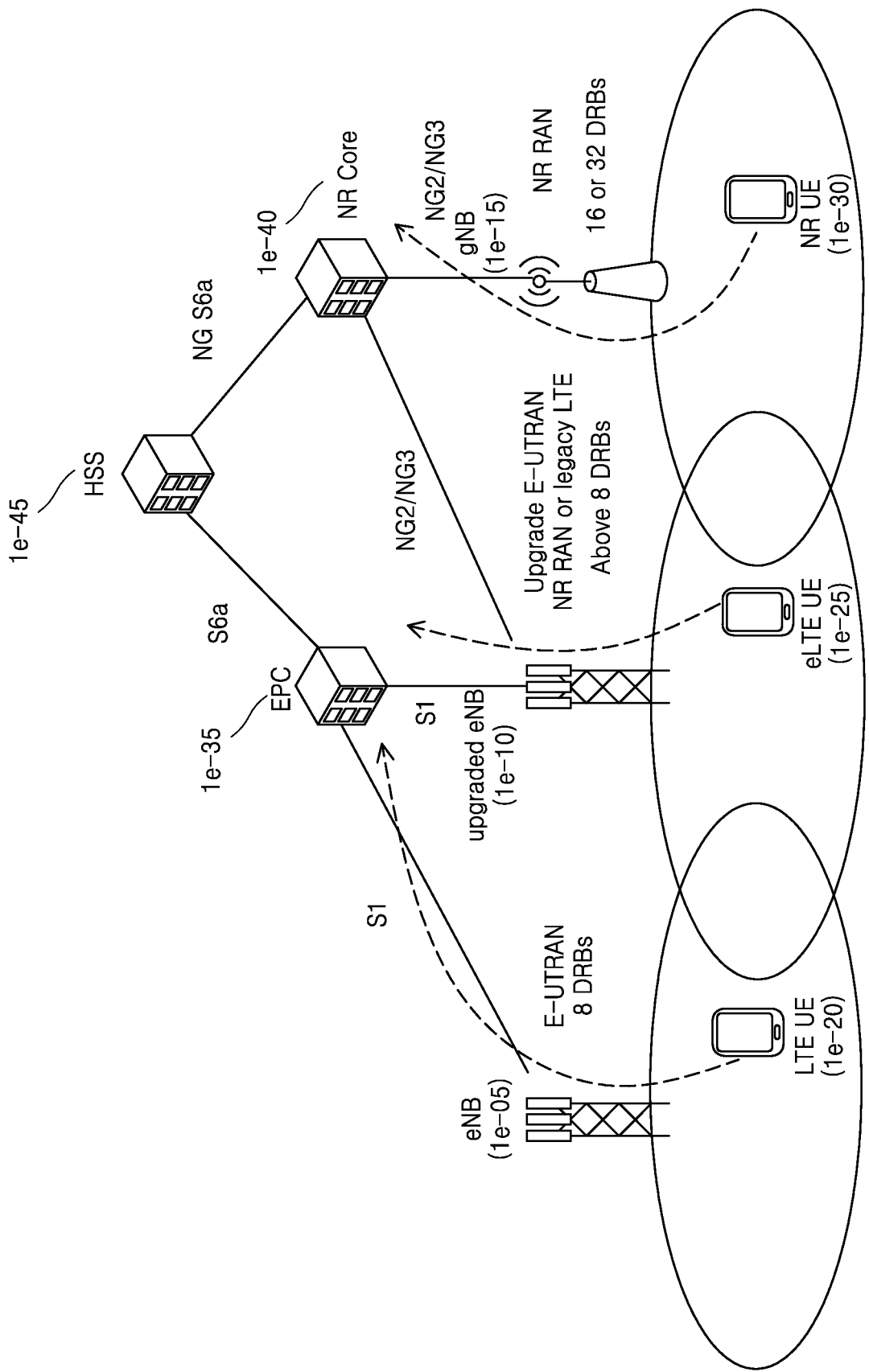
FIG. 5 is an exemplary diagram for describing user equipments (UEs), LTE, enterprise long term evolution (eLTE), and new radio (NR) network structures, and data radio bearers (DRBs), to which an embodiment is applicable.

FIG. 5 is a diagram for describing UEs, LTE, enterprise long term evolution (eLTE), and NR network structures, and data radio bearers (DRBs), to which an embodiment is applicable.

As illustrated in FIG. 5, a mobile communication system according to an embodiment may include an eNB 1e-05 and an LTE UE 1e-20, which support LTE from Rel-8 to Rel-14, an upgraded eNB 1e-10 and an eLTE UE 1e-25, which support LTE from Rel-15, and a next-generation node B (gNB) 1e-15 and a NR UE 1e-30, which support NR. Accurately, the upgraded eNB 1e-10 and the eLTE UE 1e-25 are defined as supporting an increased number of DRBs compared to LTE. In a next-generation mobile communication system, a NR core network (NR CN) 1e-40 is connectable to an evolved packet core network (EPC) 1e-35 and a new RAT radio access network (NR RAN) (e.g., 1e-10), and the eLTE UE 1e-25 and the NR UE 1e-30 connectable to the NR CN 1e-40 need to be simultaneously connectable to the NR CN 1e-40 and a LTE CN, i.e., the EPC 1e-35. That is, the NR UE 1e-30 needs to be able to use NAS(Non Access Stratum) access to both of the EPC 1e-35 and the NR CN 1e-40. To achieve dual connectivity to the EPC 1e-35 and the NR CN 1e-40, a gNB needs to be used or a legacy LTE eNB needs to be upgraded to access the NR CN 1e-40. The upgraded LTE eNB may support an increased number of DRBs.

Commonly, eNBs and UEs supporting 3G/UMTS and 4G/LTE technologies support up to 8 DRBs. That is, various services were provided to a wireless RAN and a UE through the same DRBs and there was no great demand for more than 8 DRBs until LTE Rel-14. Since continuity of services was a main issue, 8 DRBs were sufficient to distinguish and manage the services. However, as the services are diversified and independent management and protection of the services without grouping the services are demanded, additional DRBs are required. This requirement needs to be considered for both LTE and NR systems. When the number of DRBs in the LTE system increases, an increased number of DRBs (e.g., 11 to 15, and more particularly, 11, 13, or 15 DRBs) may be supported considering a DRB structure of the LTE system. In the NR system, since a DRB structure thereof is not definitely determined, an increased number of DRBs (e.g., 16 to 32, and more particularly, 16 or 32 DRBs) may be configured as required.

When different mobile communication systems support different numbers of DRBs as described above, a core network needs to receive information about the number of DRBs supported by a specific UE and a corresponding wireless RAN, to allocate DRBs and PDU sessions for the UE. For example, when an LTE eNB and an LTE UE support 8 DRBs and are connectable to up to 8 PDU sessions and when an upgraded LTE eNB and an eLTE UE support 15 DRBs and are connectable to up to 15 PDU sessions, an LTE EPC may manage radio resources and PDU sessions by reflecting the above information. Likewise, a NR 5G CN may also manage radio resources and PDU sessions by reflecting information indicating that the numbers of DRBs and PDU session connections supported by a NR eNB and a NR UE differ from the numbers of DRBs and PDU session connections supported by an eLTE eNB and an eLTE UE.

An embodiment discloses a method, performed by a core network, of checking the number of DRBs supported by a specific UE and a wireless network, to determine the number of PDU sessions configurable for the UE in a next-generation mobile communication system.

An embodiment describes a method, performed by a core network, of managing radio resources and PDU sessions by receiving a signal indicating the maximum numbers of supported DRBs and PDU sessions from a RAN (or an eNB) and a UE.

Figure 6:
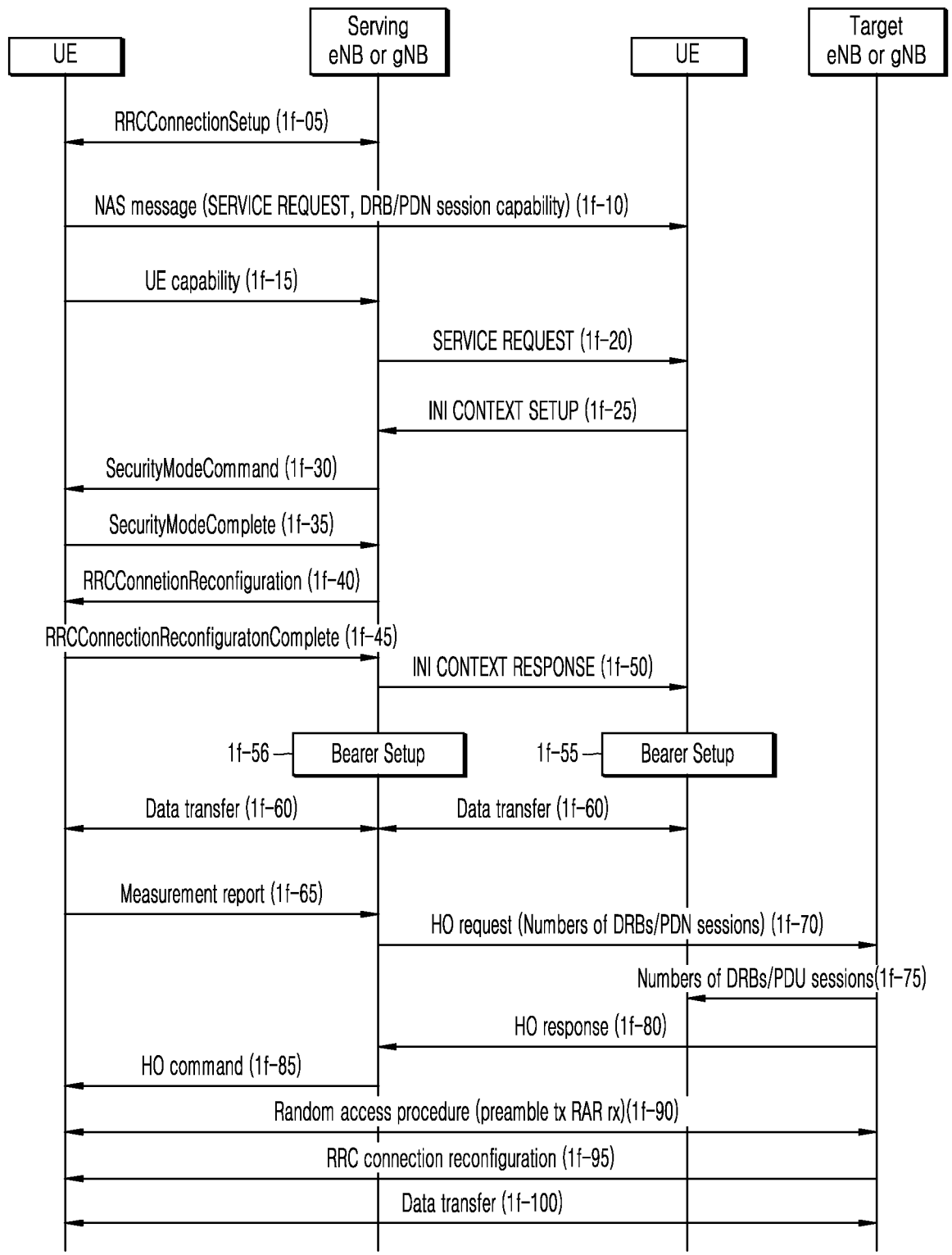
FIG. 6 is an exemplary flowchart for describing an operation of reporting and checking the numbers of DRBs and packet data unit (PDU) sessions in a mobile communication system, according to an embodiment.

FIG. 6 is a flowchart for describing an operation of reporting and checking the numbers of DRBs and PDU sessions in a mobile communication system, according to an embodiment.

In operation 1f-05, when a UE which is not currently connected to a network has data to be transmitted, the UE performs an RRC connection setup procedure with an eNB (or a gNB). That is, the UE achieves reverse transmission synchronization with the eNB through a random access procedure and transmits an RRC Connection Request message to the eNB. The RRC Connection Request message may include a UE identity, an establishmentCause, etc. The eNB transmits an RRC Connection Setup message such that the UE establishes an RRC connection. The RRC Connection Setup message includes RRC connection configuration information. An RRC connection is also called a signaling radio bearer (SRB) and is used to transmit and receive an RRC message as a control message between the UE and the eNB. The RRC connected UE transmits an RRC Connection Setup Complete message to the eNB. Due to the above-described RRC connection procedure, the UE may transmit a control message such as a SERVICE REQUEST message for requesting a core network (CN) to configure bearers for a certain service, to the CN as a non-access stratum (NAS) message (1f-10). In an embodiment, the SERVICE REQUEST message may include the numbers of DRBs/PDU sessions supported by the UE. In operation 1f-15, the UE reports the maximum numbers of DRBs and connectable PDU sessions supported by the UE, to the eNB by using an RRC message (UE capability). The UE capability report may be provided using an access stratum (AS) signal, e.g., an RRC message (UE capability report). In this case, the UE transmits the UE capability report to a PCell connected to the UE. Herein, the PCell may be an LTE, eLTE, or NR cell, which means that the UE capability report is transmitted to an eNB, an upgraded eNB, or a gNB. Operations 1f-10 and 1f-15 may be performed sequentially or simultaneously or only one thereof may be performed. Although only one of operations 1f-10 and 1f-15 is performed, the CN may check the numbers of DRBs/PDU sessions supported by a whole system (e.g., the eNB and the UE) due to operation of the eNB.

In operation 1f-20, the eNB provides UE capability information about the numbers of DRBs/PDU sessions supported by the UE based on the UE capability report included in the RRC Connection Setup Complete message, to the currently connected CN (e.g., a NR CN or an EPC) by using a SERVICE REQUEST message. In this case, the eNB independently or integrally transmits, to the CN, the UE capability information (e.g., the numbers of DRBs/PDU sessions) received from the UE, and information about the numbers of DRBs/PDU sessions supported by the eNB. The eNB may transmit the UE capability information received from the UE without any modification or by modifying the UE capability information based on the capability of the eNB. That is, when the numbers of DRBs/PDU sessions supported by the eNB are less than the numbers of DRBs/PDU sessions supported by the UE, the eNB may report integrated capability information of the UE and the eNB based on the smaller values. In operation 1f-25, the CN allocates data and PDU session connections per service/slice, based on the capability information integrally received from the eNB, and transmits an INITIAL CONTEXT SETUP message. That is, the CN updates and provides mapping rules and manages data radio resources based on configuration information. The INITIAL CONTEXT SETUP message includes QoS information to be used to configure DRBs and security information to be used for the DRBs (e.g., a security key or a security algorithm).

The eNB exchanges a Security Mode Command message (1f-30) and a Security Mode Complete message (1f-35) with the UE to configure a security mode. After the security mode is completely configured, the eNB transmits an RRC Connection Reconfiguration message to the UE (1f-40). The RRC Connection Reconfiguration message includes DRB setup information for processing user data and the UE configures DRBs by using the DRB setup information and transmits an RRC Connection Reconfiguration Complete message to the eNB (1f-45). The eNB having completely configured the DRBs with the UE transmits an INITIAL CONTEXT RESPONSE message to the CN (1f-50) and the CN having received the INITIAL CONTEXT RESPONSE message exchanges a BEARER SETUP message and a BEARER SETUP RESPONSE message with eNB to configure bearers (1f-55 and 1f-56). The CN may configure bearers (1f-55) in an LTE system or the eNB may configure bearers based on the mapping rules received from the CN (1f-56) in a NR system. These messages are transmitted through an interface configured between the CN and the eNB. When the above-described operations are all completed, the UE transmits and receives data to and from the eNB and the CN (1f-60). As described above, a general data transmission procedure includes three steps of RRC connection setup, security setup, and DRB setup. The eNB may transmit an RRC Connection Reconfiguration message to the UE to renew, add, or modify the RRC connection for a certain reason.

Herein, the CN collectively refers to core networks in LTE and NR systems. The CN includes a serving-gateway (S-GW) and a mobility management entity (MME) in the LTE system and includes a user plane function (UPF) and an access and mobility management function (AMF) in the NR system.

In operation 1f-65, the UE transmits a measurement report including a result of measuring neighboring cells and a serving cell determines handover based on the measurement report received from the UE. In operation 1f-70, the serving cell transmits a handover request message for the UE to a target cell through an X2 or Xn interface. In operation 1f-70, the serving cell transmits, to the target cell, information about the numbers of DRBs/PDU sessions configured by the CN for previous data communication. Since the serving cell and the target cell may have different capabilities of supporting DRBs/PDU sessions, the information about the numbers of DRBs/PDU sessions configured by the CN for previous data communication is required to determine whether the DRBs/PDU sessions configured for a previous cell are equally usable after performing handover to the target cell. The target cell determines whether the DRBs/PDU sessions are supported, based on the information received from the serving cell and transmits a handover information message and a handover response message respectively to the CN and the serving cell (1f-75 and 1f-80). In operation 1f-85, the serving cell having received the handover response message signals, to the UE, a handover command including parameters required for handover to the target cell.

In operation 1f-90, the UE achieves UL synchronization with the target cell through a random access procedure. In operation 1f-95, the UE receives, from the target cell, an RRC signal including configuration information for data transmission and reception. The configuration information may include information for modifying or adding the DRB setup. When the configuration information is included in the handover command of operation 1f-85, operation 1f-95 may be omitted. In operation 1f-100, the connected UE and target cell transmit and receive data therebetween.

Figure 7:
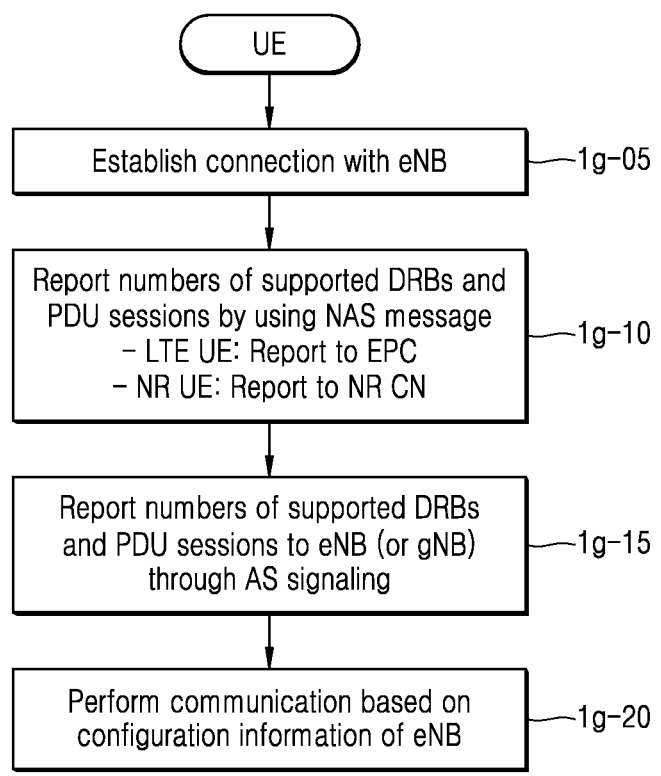
FIG. 7 is an exemplary flowchart of a method, performed by a UE, of reporting the numbers of DRBs/PDU sessions supported by the UE, according to an embodiment.

FIG. 7 is a flowchart of a method, performed by a UE, of reporting the numbers of DRBs/PDU sessions supported by the UE, according to an embodiment.

In operation 1g-05, the UE establishes an RRC connection with an eNB (or a gNB). In operation 1g-10, the UE reports the maximum numbers of DRBs and connectable PDU sessions supported by the UE, to a CN by using a NAS message. Herein, the number of DRBs may equal or differ from the number of PDU sessions. An LTE UE may report 8 DRBs and PDU sessions and an eLTE UE may have enhanced UE capability compared to the legacy LTE UE (for example, the eLTE UE may report 11 to 15 DRBs and PDU sessions). Likewise, a NR UE may also have enhanced UE capability compared to the legacy LTE UE (for example, the NR UE may report 16 or 21 DRBs and PDU sessions).

In operation 1g-15, the UE reports the maximum numbers of DRBs and connectable PDU sessions supported by the UE, to the eNB by using an access stratum (AS) message, e.g., an RRC message (UE capability report). In this case, the UE transmits the UE capability report to a PCell connected to the UE. Herein, the PCell may be an LTE, eLTE, or NR cell, which means that the UE capability report is transmitted to an eNB, an upgraded eNB, or a gNB.

Operations 1g-10 and 1g-15 may be performed sequentially or simultaneously or only one thereof may be performed. Although only one of operations 1g-10 and 1g-15 is performed, the CN may check the numbers of DRBs/PDU sessions supported by a whole system (e.g., the eNB and the UE) due to operation of the eNB.

In operation 1g-20, the UE performs communication based on DRB configuration information of the eNB.

Figure 8:
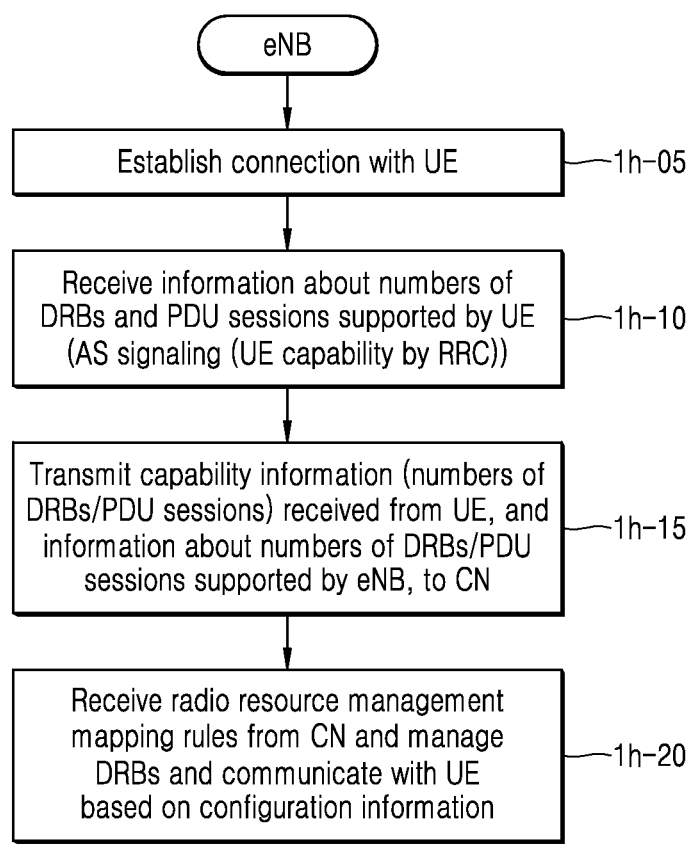
FIG. 8 is an exemplary flowchart of a method, performed by a base station, of reporting the numbers of DRBs/PDU sessions supported by the base station, according to an embodiment.

FIG. 8 is a flowchart of a method, performed by an eNB (or a gNB), of reporting the numbers of DRBs/PDU sessions supported by the eNB, according to an embodiment.

In operation 1h-05, the eNB establishes an RRC connection with a UE. In operation 1h-10, the eNB receives information about the maximum numbers of DRBs and connectable PDU sessions supported by the UE, from the UE by using an AS message, e.g., an RRC message (UE capability report). Herein, a cell may be an LTE, eLTE, or NR cell, which means that the UE capability report is transmitted to an eNB, an upgraded eNB, or a gNB.

In operation 1h-15, the eNB independently or integrally transmits, to a CN, the UE capability information (e.g., the numbers of DRBs/PDU sessions) received from the UE, and information about the numbers of DRBs/PDU sessions supported by the eNB. In this case, the eNB may transmit the UE capability information received from the UE without any modification or by modifying the UE capability information based on the capability of the eNB. That is, when the numbers of DRBs/PDU sessions supported by the eNB are less than the numbers of DRBs/PDU sessions supported by the UE, the eNB may report integrated capability information of the UE and the eNB based on the smaller values.

Operations 1h-10 and 1h-15 may be performed sequentially or simultaneously. Alternatively, operation 1h-10 may be omitted when the UE transmits the UE capability information by using a NAS message.

In operation 1h-20, the eNB receives mapping rules for radio resource management (for example, receives DRB mapping rules per traffic in an LTE system, or receives IP flow and QoS flow mapping rules and QoS flow and DRB mapping rules in a NR system) from the CN, and manages DRBs and communicates with the UE based on configuration information of the received mapping rules.

Figure 9:
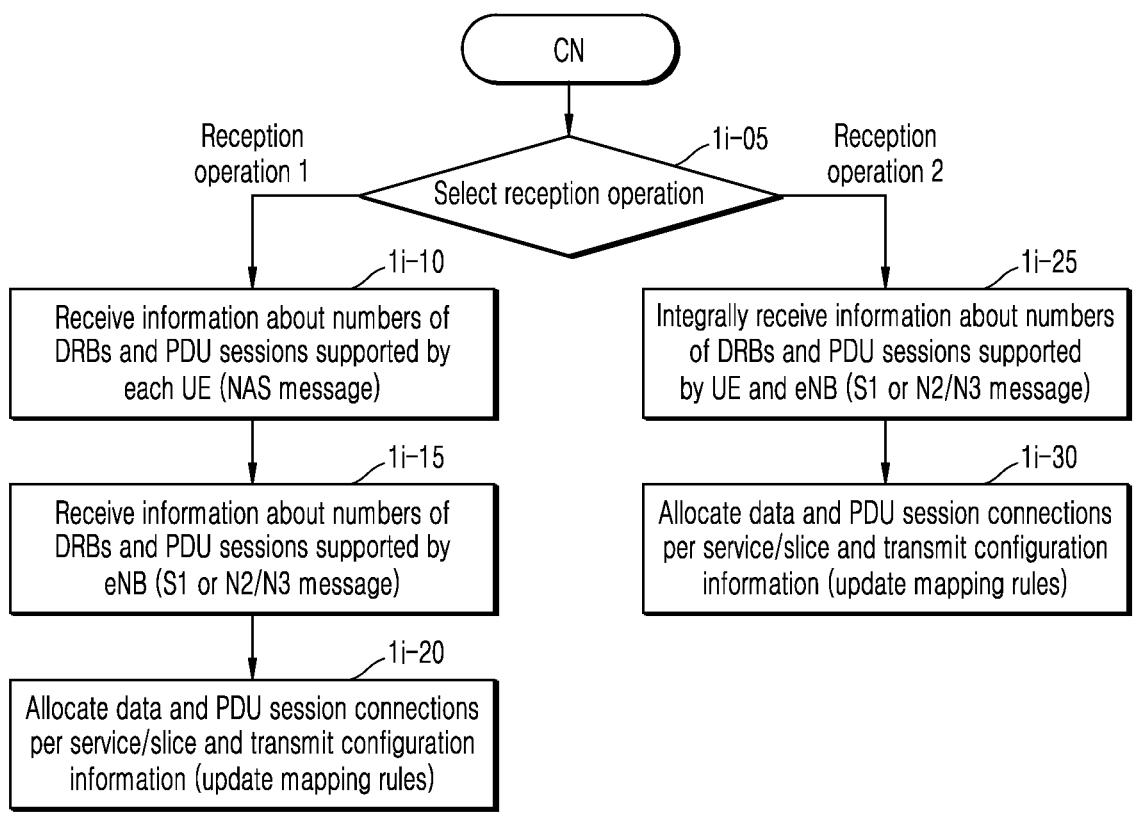
FIG. 9 is an exemplary flowchart of a method, performed by a core network (CN), of receiving capability reports indicating the numbers of DRBs/PDU sessions supported by a UE and a base station, from the UE and the base station and managing DRBs, according to an embodiment.

FIG. 9 is a flowchart of a method, performed by a CN, of receiving capability reports indicating the numbers of DRBs/PDU sessions supported by a UE and an eNB (or a gNB), from the UE and the eNB and managing DRBs, according to an embodiment.

In operation 1i-05, the CN operates in reception operation 1 or reception operation 2 depending on whether UE capability information (e.g., the numbers of DRBs/PDU sessions) is received from the UE by using a NAS message. Herein, reception operation 1 is performed to receive the UE capability information (e.g., the numbers of DRBs/PDU sessions) from the UE by using a NAS message, and reception operation 2 is performed to receive the UE capability information (e.g., the numbers of DRB s/PDU sessions) not from the UE by using a NAS message but from the eNB.

When the CN operates in reception operation 1 in operation 1i-05, the CN receives the UE capability information (e.g., the numbers of DRBs/PDU sessions) supported by the UE, by using a NAS message in operation 1i-10, and receives eNB capability information (e.g., the numbers of DRBs/PDU sessions) supported by the eNB, from the eNB through an interface (e.g., S1 or N2/N3) between the eNB and the CN in operation 1i-15. Herein, the eNB and the UE may be an eNB and UE supporting LTE, eLTE, or NR and the interface and NAS message used in this case follows the version of the eNB and UE. In operation 1i-20, the CN allocates data and PDU session connections per service/slice, based on the capability information independently received from the UE and the eNB, and transmits configuration information. That is, the CN updates and provides mapping rules and then manages data radio resources based on the configuration information.

When the CN operates in reception operation 2 in operation 1i-05, the CN receives UE capability information (e.g., the numbers of DRBs/PDU sessions) supported by the UE and eNB capability information (e.g., the numbers of DRBs/PDU sessions) supported by the eNB, through an interface (e.g., S1 or N2/N3) between the eNB and the CN in operation 1i-25. In this case, the eNB may transmit, to the CN, integrated capability information including both the UE capability information and the eNB capability information or including capability information processed by the eNB. In operation 1i-30, the CN allocates data and PDU session connections per service/slice, based on the capability information integrally received from the eNB, and transmits configuration information. That is, the CN updates and provides mapping rules and then manages data radio resources based on the configuration information.

According to an embodiment, a CN may accurately determine the number of PDU sessions for a specific UE by checking the numbers of DRBs supported by a UE and a wireless network in a next-generation mobile communication system. As such, services required for the specific UE may be appropriately provided through allocated DRBs and PDU sessions.

A bandwidth part (BWP) newly adopted for next-generation mobile communication systems may be configured in two types, e.g., an initially configured default BWP and a dynamically configurable BWP. A timer operation for using an initially configured BWP and a subsequently configured BWP for a DL in a next-generation mobile communication system will now be described. That is, a specific operation for configuring a BWP based on variations in UE status will now be described.

FIG. 10 is a diagram for describing a scenario of configuring a BWP in a next-generation mobile communication system to which an embodiment is applicable.

BWP technology refers to a technology by which a UE performs communication by using only a part of a system bandwidth used by a cell. Since a NR system basically supports a wide frequency band (e.g., a bandwidth of 400 MHz) compared to an LTE system, UEs may be overloaded to use the whole system bandwidth and only small bandwidths may be sufficient for some UEs. The BWP technology is used to reduce manufacturing costs of UEs and to save battery power of the UEs. A BWP may be configured by a base station (e.g., an eNB or a gNB) only for a UE supporting the BWP technology.

Referring to FIG. 10, three BWP configuration scenarios are present for the NR system.

A first scenario is to configure a BWP for the UE supporting only a small bandwidth 2e-10 that is less than a system bandwidth 2e-05 used by a cell. To reduce manufacturing costs, a specific UE may be developed to support only a limited bandwidth. This UE needs to report to the base station that only a limited bandwidth is supported, and thus the base station configures a BWP equal to or less than the maximum bandwidth supported by the UE.

A second scenario is to configure a BWP to save battery power of the UE. For example, although the UE may perform communication by using a whole system bandwidth 2e-15 used by a cell, or a BWP 2e-20 thereof, the base station may configure a smaller BWP 2e-25 to save battery power.

A third scenario is to configure individual BWPs corresponding to different numerologies. Numerologies are used to diversify physical layer configurations for optimal data transmission based on various service requirements. For example, in an orthogonal frequency-division multiple access (OFDMA) structure including a plurality of subcarriers, subcarrier spacing may be variably adjusted based on a certain requirement. The UE may perform communication by simultaneously using multiple numerologies. In this case, since physical layer configurations corresponding to the numerologies differ, individual BWPs 2e-35 and 2e-40 may be configured to correspond to different numerologies.

Since UEs support different bandwidths in the NR system, a default BWP usable by all UEs needs to be configured for an initial access and a BWP for a specific UE is configured from a specific timing. In this case, the configured BWP may be changed through specific signaling and a BWP to be configured by a target cell after handover is indicated to the UE through specific signaling. A BWP timer for specifying use of a specific BWP for the UE may be present and may be configured through RRC signaling. When an activated BWP is no longer used, the BWP timer stops using the configured BWP and returns to an initially configured default BWP. The BWP switching operation using the BWP timer may be configured by the base station to fall back to an appropriate BWP and to save battery power of the UE.

Figure 11:
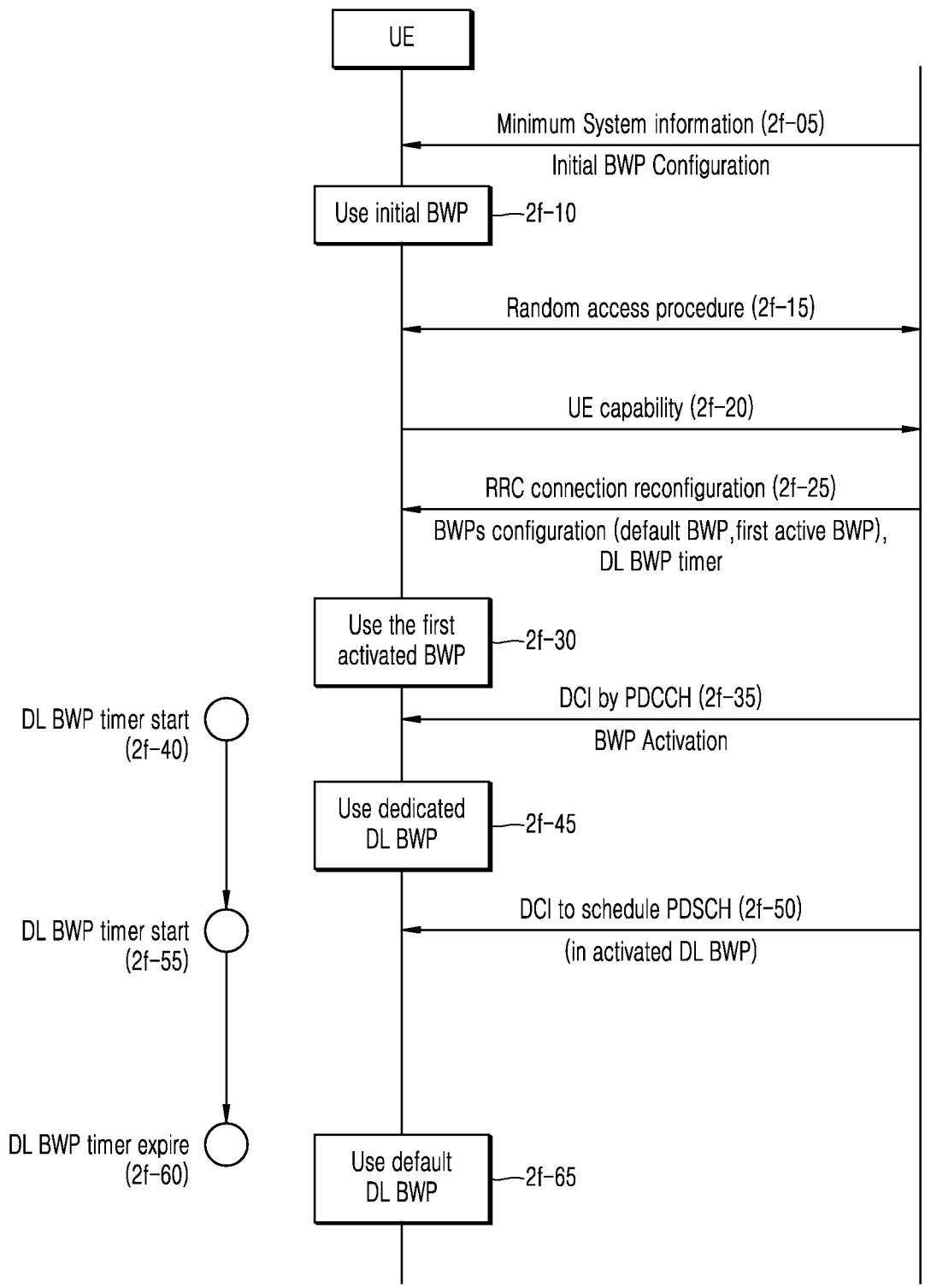
FIG. 11 is an exemplary flowchart for describing a timer-based operation to use a BWP in a wireless communication system to which an embodiment is applicable.

FIG. 11 is a flowchart for describing a timer-based operation to use a BWP in a wireless communication system to which an embodiment is applicable.

A UE receives minimum system information (MSI) broadcasted by a base station (e.g., an eNB or a gNB) at a specific frequency location (2f-05). The MSI is periodically broadcasted at a preset radio resource location and includes essential information required to camp on or initially access a corresponding cell. In an embodiment, the MSI includes configuration information of a first BWP used for initial access. The first BWP may be defined as an initial BWP. BWP configuration information includes center frequency and bandwidth information and random access radio resource information. In this case, the center frequency and bandwidth information may be indicated separately for a UL and a DL. The random access radio resource needs to be within at least the configured bandwidth. The bandwidth information may be provided as the number of PRBs or in units of hertz (Hz). In an embodiment, the DL configuration information of the first BWP may follow that of the MSI. In this case, the MSI does not need to additionally include the configuration information of the first BWP or includes only UL frequency information and the random access radio resource information.

The UE uses the first BWP (2f-10) to perform a subsequent procedure. The subsequent procedure includes a random access procedure and reception of a certain control message. The random access procedure (2f-15) includes transmitting a preamble for random access to the base station, transmitting a random access response (RAR) message to the UE, transmitting Msg3 to the base station, and transmitting Msg4 to the UE. The UE transmits the preamble by using the random access radio resource indicated by the MSI. During a certain period after the preamble is transmitted, the UE monitors whether a RAR message corresponding to the preamble is received. When the RAR message is successfully received, the UE transmits the Msg3 by using a radio resource indicated by the RAR message. Within a certain time, the UE receives the Msg4 and determines whether ultimately attempted random access succeeds. All radio resources used to transmit and receive the above-mentioned messages need to be within at least the first BWP.

During random access or immediately after random access succeeds, the UE reports UE capability information to the base station by still using the first BWP (2f-20). The UE capability information includes information about the maximum bandwidth supported by the UE. In addition, the UE receives a certain RRC message from the base station by using the first BWP (2f-25). The RRC message includes a list of a plurality of BWPs supported by a corresponding serving cell, and BWP timer information valid in the corresponding serving cell, and the BWP list includes BWP indices and BWP configuration information. That is, the base station may provide center frequency and bandwidth information of each of BWPs supported by the corresponding serving cell, separately for a UL and a DL by using the RRC message. The bandwidth does not exceed the maximum bandwidth indicated by the UE capability information. The base station may also provide indicators of a second BWP and a third BWP among the BWPs included in the BWP list. The second BWP is defined as a default BWP or a basic BWP and serves as a fallback BWP to which the UE returns when a BWP timer expires during operation using another BWP in the corresponding serving cell. The third BWP refers to a first active BWP among the plurality of BWPs by the base station through RRC signaling. The second BWP and the third BWP may be configured as the same BWP or different BWPs. When the UE supports multiple numerologies and the base station desires to configure a BWP per numerology, the RRC message includes configuration information of a plurality of BWPs. The BWPs may be configured by maintaining the same bandwidth and shifting a center frequency by a certain time interval based on a certain pattern. Such a technology is called frequency hopping, and pattern information and execution information for frequency hopping may be included in the configuration information. An indicator for activating the configured DL and UL BWPs may be included in the RRC message, or downlink control information (DCI) of a physical downlink control channel (PDCCH) may include a control message for triggering activation of a corresponding BWP.

In operation 2f-30, the UE performs communication by using the DL and UL third BWPs (i.e., first active BWPs) configured by the base station. The UE receives a PDCCH indicating an activation of a specific BWP(DCI indicates index information of the BWP to be activated) in operation 2f-35, and then starts the DL BWP timer valid in the corresponding cell (2f-40) and switches to the configured BWP (2f-45). The DL BWP timer is to define how long the UE uses the indicated active DL BWP. When DCI indicating a physical downlink shared channel (PDSCH) resource for DL data transmission is received through the PDCCH (2f-50), the DL BWP timer restarts (2f-55). When the BWP timer expires, the UE falls back to the second BWP (i.e., the default BWP) configured by the base station (2f-60 and 2f-65). This means that the configured DL BWP is deactivated when data transmission and reception is no longer actively performed using the configured DL BWP. Otherwise, deactivation may be explicitly indicated using DCI indicating the corresponding BWP index, and the configured BWP may be reconfigured to another BWP or the default BWP. In the case of the UL BWP, when the UL BWP is paired with the DL BWP (e.g., time-division duplex (TDD)), the UL BWP operates based on the DL BWP timer. That is, after the timer expires, the UL BWP falls back to the default BWP to perform communication. When the UL BWP is unpaired with the DL BWP (e.g., frequency-division duplex (FDD)), activation/deactivation of the UL BWP may be explicitly indicated through the PDCCH, an independent BWP timer may be used for the UL BWP, or the UL BWP may fall back to the default UL BWP along with expiration of the DL BWP timer.

Figure 12:
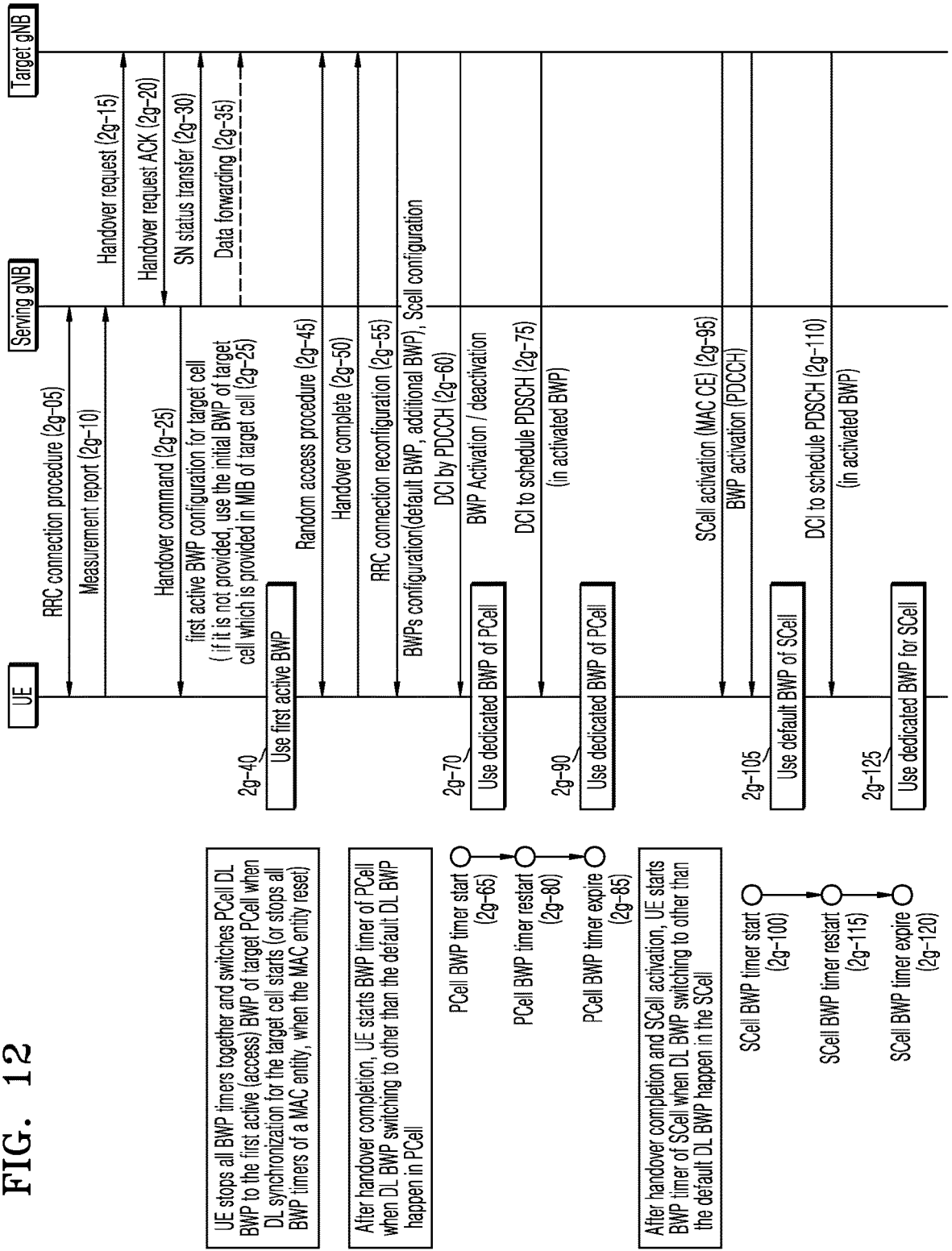
FIG. 12 is an exemplary flowchart for describing a handover procedure using a BWP timer, according to an embodiment.

FIG. 12 is a flowchart for describing a handover procedure using a BWP timer, according to an embodiment.

Referring to FIG. 12, after a UE performs an RRC connection procedure with a base station (e.g., an eNB or a gNB) in operation 2g-05, it is assumed that subsequent operations are based on the BWP timer-based activation/deactivation operation described above in relation to FIG. 11. The gNB may transmit, to the UE, a measurement request to measure neighboring cells and the UE transmits, to the gNB, a measurement report including a result of measuring the corresponding neighboring cells (2g-10). The serving gNB decides whether to hand the UE over to a neighboring cell, based on the measurement report. Handover is a technology for switching a serving cell for providing services to a connected mode UE, to another gNB. When the serving cell decides to hand over, the serving cell transmits a handover (HO) request message to a new gNB for providing services to the UE, i.e., a target gNB (2g-15). When the handover request is accepted, the target cell transmits a handover request ACK message to the serving cell (2g-20). The serving cell having received the handover request ACK message transmits a handover command message to the UE (2g-25). Before the handover command message is received, the UE continuously receives DL channel (e.g., PDCCH/PDSCH/PHICH) from and transmits UL channel data (e.g., PUSCH/PUCCH) to the serving cell. The handover command message is transmitted from the serving cell to the UE by using an RRC connection reconfiguration message (2g-25). The handover command message may include first active UL/DL BWP configuration information (e.g., center frequency, frequency band, and time (subframe or slot) information) of the target cell and further includes a cell ID, a UE identity (e.g., a cell radio network temporary identifier (C-RNTI)) in the target cell, radio resource configuration information of the target cell, etc. When the RRC message does not include DL initial BWP configuration information in the target cell, the UE may also receive corresponding information by receiving MSI of the target cell. When DL synchronization with the target cell is achieved after the UE receives the handover command message, the UE stops all DL BWP timers running in the serving cell and switches to the first active BWPs configured by the target cell. That is, the UE stops all BWP timers when a MAC entity of the serving cell is reset.

Thereafter, the serving cell transmits a sequence number (SN) status for UL/DL data to the target cell and forwards DL data to the target cell when the DL data is present (2g-30 and 2g-35). The UE uses the UL and DL BWPs indicated by the first active BWP configuration of the target cell (2g-40) to perform a random access procedure to the target cell (2g-45). The random access procedure is to notify the target cell that the UE is handed over to the target cell and, at the same time, to achieve UL synchronization with the target cell. For random access, the UE transmits, to the target cell, a preamble corresponding to a preamble ID provided from the serving cell or a randomly selected preamble ID. After a specific number of subframes from when the preamble is transmitted, the UE monitors whether a RAR message is received from the target cell. Such a monitoring period is called a RAR window. When the RAR message is received within the RAR window period, the UE transmits an RRC connection reconfiguration complete message including a handover complete message to the target cell (2g-50). Thereafter, the UE continuously receives DL channel data (e.g., PDCCH/PDSCH/PHICH) from and transmits UL channel data (e.g., PUSCH/PUCCH) to the target cell. When the RAR message is successfully received from the target cell, the UE stops the timer for handover, and the target cell requests the serving cell to modify paths of bearers set to the serving cell and requests the serving cell to delete context of the UE.

In operation 2g-55, after handover is completed, as in operation 2f-25, the UE receives, from the target cell, an RRC message including a list of a plurality of BWPs supported by a corresponding serving cell, and BWP timer information valid in the corresponding serving cell. The BWP list includes BWP indices and BWP configuration information. That is, the gNB may provide center frequency and bandwidth information of each of BWPs supported by the corresponding serving cell, separately for a UL and a DL by using the RRC message. The gNB may also provide indicators of a second BWP and a third BWP among the BWPs included in the BWP list. The second BWP is defined as a basic BWP or a default BWP and serves as a fallback BWP to which the UE returns when a BWP timer expires during operation using another BWP in the corresponding serving cell. The third BWP refers to a first active BWP among the plurality of BWPs by the gNB through RRC signaling. The second BWP and the third BWP may be configured as the same BWP or different BWPs. An indicator for activating the configured DL and UL BWPs may be included in the RRC message, or DCI of a PDCCH may include a control message for triggering activation of a corresponding BWP.

After the RRC message is received, the UE performs communication by using the DL and UL third BWPs (i.e., first active BWPs) configured by the gNB. The UE receives a PDCCH indicating an activation of a specific BWP (DCI indicates index information of the BWP to be activated) in operation 2g-60, and then starts the DL BWP timer valid in the corresponding cell (2g-65) and switches to the configured BWP (2g-70). The DL BWP timer is to define how long the UE uses the indicated active DL BWP. When DCI indicating a PDSCH resource for DL data transmission is received through the PDCCH (2g-75), the DL BWP timer restarts (2g-80). When the BWP timer expires, the UE falls back to the second BWP (i.e., the default BWP) configured by the gNB (2g-85 and 2g-90). This means that the configured DL BWP is deactivated when data transmission and reception is no longer actively performed using the configured DL BWP. Otherwise, deactivation may be explicitly indicated using DCI indicating the corresponding BWP index, and the configured BWP may be reconfigured to another BWP or the default BWP. In the case of the UL BWP, when the UL BWP is paired with the DL BWP (e.g., TDD), the UL BWP operates based on the DL BWP timer. That is, after the timer expires, the UL BWP falls back to the default BWP to perform communication. When the UL BWP is unpaired with the DL BWP (e.g., FDD), activation/deactivation of the UL BWP may be explicitly instructed through the PDCCH, an independent BWP timer may be used for the UL BWP, or the UL BWP may fall back to the default UL BWP along with expiration of the DL BWP timer.

When an SCell is activated after the above-described handover procedure is completed, that is, when an RRC connection reconfiguration message including configuration information for adding an SCell (e.g., an SCell index and a cell identifier, BWP configuration information (including second BWP (or default BWP) and third BWP (or first active BWP) information), radio channel configuration information, and BWP timer information) is received from the gNB in operation 2g-55, an indicator for activation/deactivation of the configured SCell may be received in operation 2g-95. The command may be indicated using a MAC control element (CE). When the UE having received the SCell activation indication receives an indication to activate a specific BWP through the PDCCH (DCI indicates an index of the specific BWP) during operation using the third BWP, the UE starts the configured BWP timer of the SCell (2g-100) and switches to the configured BWP of the SCell to perform communication. When PDCCH (e.g., DCI) for subsequent DL data communication is received using the configured BWP (2g-110), the UE and the gNB restart the BWP timer for the corresponding SCell (2g-115). When the DL BWP timer of the SCell expires (2g-120), the UE switches to the second BWP (2g-125).

Figure 13:
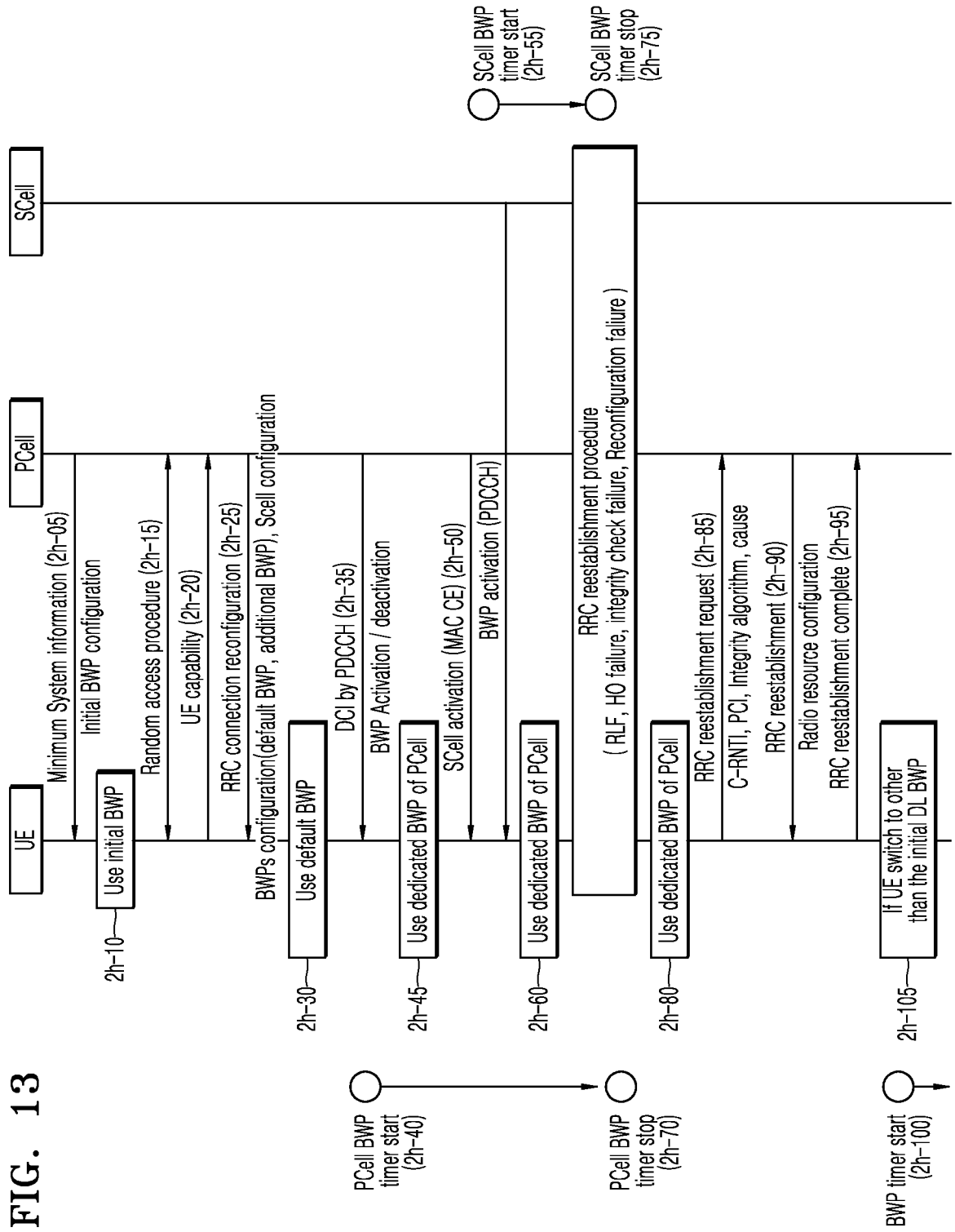
FIG. 13 is an exemplary flowchart for describing a radio resource control (RRC) connection reestablishment procedure using a BWP timer, according to an embodiment.

FIG. 13 is a flowchart for describing an RRC connection reestablishment procedure using a BWP timer, according to an embodiment.

A UE receives MSI broadcasted by a base station (e.g., an eNB or a gNB) at a specific frequency location (2h-05). The MSI is periodically broadcasted at a preset radio resource location and includes essential information required to camp on or initially access a corresponding cell. In an embodiment, the MSI includes configuration information of a first BWP used for initial access. The first BWP may be defined as an initial BWP. BWP configuration information includes center frequency and bandwidth information and random access radio resource information. In this case, the center frequency and bandwidth information may be indicated separately for a UL and a DL. The random access radio resource needs to be within at least the configured bandwidth. The bandwidth information may be provided as the number of PRBs or in units of Hz. In an embodiment, the DL configuration information of the first BWP may follow that of the MSI. In this case, the MSI does not need to additionally include the configuration information of the first BWP or includes only UL frequency information and the random access radio resource information.

The UE uses the first BWP (2h-10) to perform a subsequent procedure. The subsequent procedure includes a random access procedure and reception of a certain control message. The random access procedure (2h-15) includes transmitting a preamble for random access to the base station, transmitting a RAR message to the UE, transmitting Msg3 to the base station, and transmitting Msg4 to the UE. The UE transmits the preamble by using the random access radio resource indicated by the MSI. During a certain period after the preamble is transmitted, the UE monitors whether a RAR message corresponding to the preamble is received. When the RAR message is successfully received, the UE transmits the Msg3 by using a radio resource indicated by the RAR message. Within a certain time, the UE receives the Msg4 and determines whether ultimately attempted random access succeeds. All radio resources used to transmit and receive the above-mentioned messages need to be within at least the first BWP.

During random access or immediately after random access succeeds, the UE reports UE capability information to the base station by still using the first BWP (2h-20). The UE capability information includes information about the maximum bandwidth supported by the UE. In addition, the UE receives a certain RRC message from the base station by using the first BWP (2h-25). The RRC message includes a list of a plurality of BWPs supported by a corresponding serving cell, and BWP timer information valid in the corresponding serving cell, and the BWP list includes BWP indices and BWP configuration information. That is, the base station may provide center frequency and bandwidth information of each of BWPs supported by the corresponding serving cell, separately for a UL and a DL by using the RRC message. The bandwidth does not exceed the maximum bandwidth indicated by the UE capability information. The base station may also provide indicators of a second BWP and a third BWP among the BWPs included in the BWP list. The second BWP is defined as a default BWP or a basic BWP and serves as a fallback BWP to which the UE returns when a BWP timer expires during operation using another BWP in the corresponding serving cell. The third BWP refers to a first active BWP among the plurality of BWPs by the base station through RRC signaling. The second BWP and the third BWP may be configured as the same BWP or different BWPs. When the UE supports multiple numerologies and the base station desires to configure a BWP per numerology, the RRC message includes configuration information of a plurality of BWPs. The BWPs may be configured by maintaining the same bandwidth and shifting a center frequency by a certain time interval based on a certain pattern. Such a technology is called frequency hopping, and pattern information and execution information for frequency hopping may be included in the configuration information. An indicator for activating the configured DL and UL BWPs may be included in the RRC message, or DCI of a PDCCH may include a control message for triggering activation of a corresponding BWP.

In operation 2h-30, the UE performs communication by using the DL and UL third BWPs (i.e., first active BWPs) configured by the base station. The UE receives a PDCCH indicating an activation of a specific BWP (DCI indicates index information of the BWP to be activated) in operation 2h-35, and then starts the DL BWP timer valid in the corresponding cell (2h-40) and switches to the configured BWP (2h-45). The DL BWP timer is to define how long the UE uses the indicated active DL BWP. When DCI indicating a PDSCH resource for DL data transmission is received through the PDCCH, the DL BWP timer restarts. When the BWP timer expires, the UE falls back to the second BWP (i.e., the default BWP) configured by the base station. This means that the configured DL BWP is deactivated when data transmission and reception is no longer actively performed using the configured DL BWP. Otherwise, deactivation may be explicitly indicated using DCI indicating the corresponding BWP index, and the configured BWP may be reconfigured to another BWP or the default BWP. In the case of the UL BWP, when the UL BWP is paired with the DL BWP (e.g., TDD), the UL BWP operates based on the DL BWP timer. That is, after the timer expires, the UL BWP falls back to the default BWP to perform communication. When the UL BWP is unpaired with the DL BWP (e.g., FDD), activation/deactivation of the UL BWP may be explicitly indicated through the PDCCH, an independent BWP timer may be used for the UL BWP, or the UL BWP may fall back to the default UL BWP along with expiration of the DL BWP timer.

When an RRC connection reconfiguration message including configuration information for adding an SCell (e.g., an SCell index and a cell identifier, BWP configuration information (including second BWP (or basic BWP) and third BWP (or first active BWP) information), radio channel configuration information, and BWP timer information) is received from the base station in operation 2h-25, and when an indicator for activation/deactivation of the configured SCell (e.g., MAC CE) and an indicator for activation of a specific BWP (e.g., PDCCH) are received in operation 2h-50, the UE starts the configured BWP timer of the SCell (2h-55) and switches to the configured BWP of the SCell to perform communication (2h-60). When PDCCH data (e.g., DCI) for subsequent DL data communication is received using the configured BWP, the UE and the base station restart the BWP timer for the corresponding SCell. When the DL BWP timer of the SCell expires, the UE switches to the second BWP. Basically, BWPs are independently configured and used for a PCell and an SCell and an RRC reestablishment procedure may be performed while BWP timers are independently running (2h-65). The RRC reestablishment procedure refers to a procedure for reestablishing a connection of the UE in the current serving cell for a reason such as radio link failure (RLF), handover failure, integrity check failure, or reconfiguration failure. When the RRC reestablishment procedure is triggered, the UE stops all BWP timers currently running in all cells (2h-70 and 2h-75) and finds a suitable cell (2h-80). After the RRC reestablishment procedure is successfully and completely performed in the suitable cell (2h-85 to 2h-95), the UE activates and switches to a BWP per serving cell as in operations 2h-35 to 2h-60. That is, the UE starts a timer for the BWP of the cell configured to be activated (2h-100), and switches to the configured BWP (2h-105).

Figure 14:
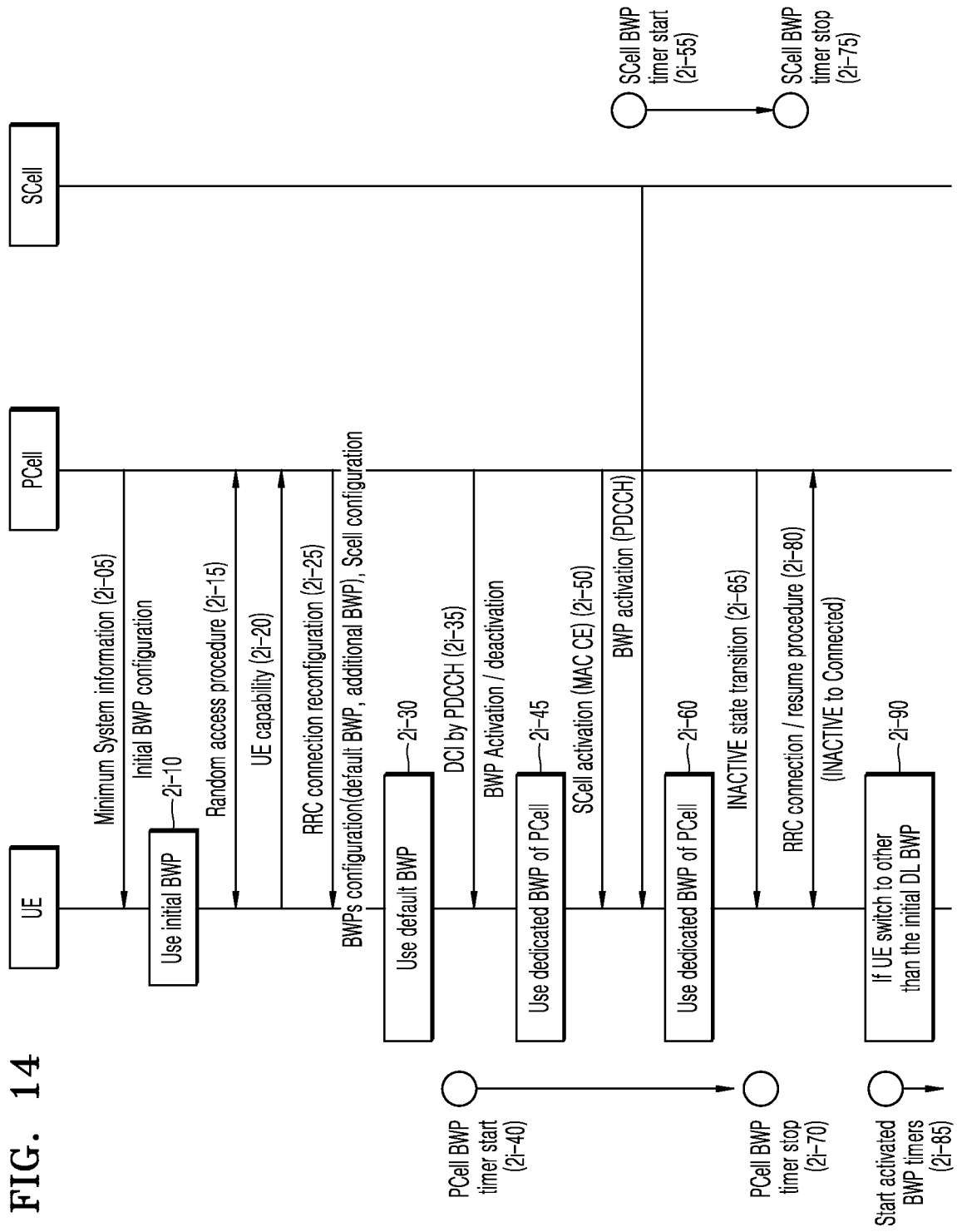
FIG. 14 is an exemplary flowchart for describing a procedure for transiting from an RRC INACTIVE state to an RRC CONNECTED state by using a BWP timer, according to an embodiment.

FIG. 14 is a flowchart for describing a procedure for transiting from an RRC INACTIVE state to an RRC CONNECTED state by using a BWP timer, according to an embodiment.

A UE receives MSI broadcasted by a base station (e.g., an eNB or a gNB) at a specific frequency location (2$i$-05). The MSI is periodically broadcasted at a preset radio resource location and includes essential information required to camp on or initially access a corresponding cell. In an embodiment, the MSI includes configuration information of a first BWP used for initial access. The first BWP may be defined as an initial BWP. BWP configuration information includes center frequency and bandwidth information and random access radio resource information. In this case, the center frequency and bandwidth information may be indicated separately for a UL and a DL. The random access radio resource needs to be within at least the configured bandwidth. The bandwidth information may be provided as the number of PRBs or in units of Hz. In an embodiment, the DL configuration information of the first BWP may follow that of the MSI. In this case, the MSI does not need to additionally include the configuration information of the first BWP or includes only UL frequency information and the random access radio resource information.

The UE uses the first BWP (2$i$-10) to perform a subsequent procedure. The subsequent procedure includes a random access procedure and reception of a certain control message. The random access procedure (2$i$-15) includes transmitting a preamble for random access to the base station, transmitting a RAR message to the UE, transmitting Msg3 to the base station, and transmitting Msg4 to the UE. The UE transmits the preamble by using the random access radio resource indicated by the MSI. During a certain period after the preamble is transmitted, the UE monitors whether a RAR message corresponding to the preamble is received. When the RAR message is successfully received, the UE transmits the Msg3 by using a radio resource indicated by the RAR message. Within a certain time, the UE receives the Msg4 and determines whether ultimately attempted random access succeeds. All radio resources used to transmit and receive the above-mentioned messages need to be within at least the first BWP.

During random access or immediately after random access succeeds, the UE reports UE capability information to the base station by still using the first BWP (2$i$-20). The UE capability information includes information about the maximum bandwidth supported by the UE. In addition, the UE receives a certain RRC message from the base station by using the first BWP (2$i$-25). The RRC message includes a list of a plurality of BWPs supported by a corresponding serving cell, and BWP timer information valid in the corresponding serving cell, and the BWP list includes BWP indices and BWP configuration information. That is, the base station may provide center frequency and bandwidth information of each of BWPs supported by the corresponding serving cell, separately for a UL and a DL by using the RRC message. The bandwidth does not exceed the maximum bandwidth indicated by the UE capability information. The base station may also provide indicators of a second BWP and a third BWP among the BWPs included in the BWP list. The second BWP is defined as a default BWP or a basic BWP and serves as a fallback BWP to which the UE returns when a BWP timer expires during operation using another BWP in the corresponding serving cell. The third BWP refers to a first active BWP among the plurality of BWPs by the base station through RRC signaling. The second BWP and the third BWP may be configured as the same BWP or different BWPs. When the UE supports multiple numerologies and the base station desires to configure a BWP per numerology, the RRC message includes configuration information of a plurality of BWPs. The BWPs may be configured by maintaining the same bandwidth and shifting a center frequency by a certain time interval based on a certain pattern. Such a technology is called frequency hopping, and pattern information and execution information for frequency hopping may be included in the configuration information. An indicator for activating the configured DL and UL BWPs may be included in the control message, or DCI of a PDCCH may include a control message for triggering activation of a corresponding BWP.

In operation 2$i$-30, the UE performs communication by using the DL and UL third BWPs (i.e., first active BWPs) configured by the base station. The UE receives a PDCCH indicating an activation of a specific BWP(DCI indicates index information of the BWP to be activated) in operation 2$i$-35, and then starts the DL BWP timer valid in the corresponding cell (2$i$-40) and switches to the configured BWP (2$i$-45). The DL BWP timer is to define how long the UE uses the indicated active DL BWP. When DCI indicating a PDSCH resource for DL data transmission is received through the PDCCH, the DL BWP timer restarts. When the BWP timer expires, the UE falls back to the second BWP (i.e., the default BWP) configured by the base station. This means that the configured DL BWP is deactivated when data transmission and reception is no longer actively performed using the configured DL BWP. Otherwise, deactivation may be explicitly indicated using DCI indicating the corresponding BWP index, and the configured BWP may be reconfigured to another BWP or the default BWP. In the case of the UL BWP, when the UL BWP is paired with the DL BWP (e.g., TDD), the UL BWP operates based on the DL BWP timer. That is, after the timer expires, the UL BWP falls back to the default BWP to perform communication. When the UL BWP is unpaired with the DL BWP (e.g., FDD), activation/deactivation of the UL BWP may be explicitly indicated through the PDCCH, an independent BWP timer may be used for the UL BWP, or the UL BWP may fall back to the default UL BWP along with expiration of the DL BWP timer.

When an RRC connection reconfiguration message including configuration information for adding an SCell (e.g., an SCell index and a cell identifier, BWP configuration information (including second BWP (or basic BWP) and third BWP (or first active BWP) information), radio channel configuration information, and BWP timer information) is received from the base station in operation 2$i$-25, and when an indicator for activation/deactivation of the configured SCell (e.g., MAC CE) and a indicator for activation of a specific BWP (e.g., PDCCH) are received in operation 2$i$-50, the UE starts the configured BWP timer of the SCell (2$i$-55) and switches to the configured BWP of the SCell to perform communication (2$i$-60). When PDCCH data (e.g., DCI) for subsequent DL data communication is received using the configured BWP, the UE and the base station restart the BWP timer for the corresponding SCell. When the DL BWP timer of the SCell expires, the UE switches to the second BWP. Basically, BWPs are independently configured and used for a PCell and an SCell and a transition to an INACTIVE state may be indicated while BWP timers are independently running (2$i$-65). The transition to the INACTIVE state may be indicated using an RRC connection release message or another RRC message. Such a message may include a RAN paging area, a resume ID, etc. The transition to the INACTIVE state refers to disconnection of the UE due to absence of data transmission and reception or for a specific reason that a network desires to disconnect the UE. In this operation, the base station may retain context information of the UE in the CONNECTED state and use the context information for a resume procedure (transition to the RRC CONNECTED state) later. When the INACTIVE state transition procedure is triggered, the UE stops all BWP timers currently running in all cells (2$i$-70 and 2$i$-75) and is on standby in the INACTIVE state until a transition procedure to the RRC CONNECTED state or an RRC resume procedure is performed later. Thereafter, when the transition procedure to the RRC CONNECTED state or the RRC resume procedure is triggered for a specific reason (e.g., requirement of UL/DL data transmission) (2$i$-80), the UE activates and switches to a BWP per serving cell as in operations 2$i$-35 to 2$i$-60. That is, the UE starts a timer for the BWP of the cell configured to be activated (2$i$-85), and switches to the configured BWP (2$i$-90).

Figure 15:
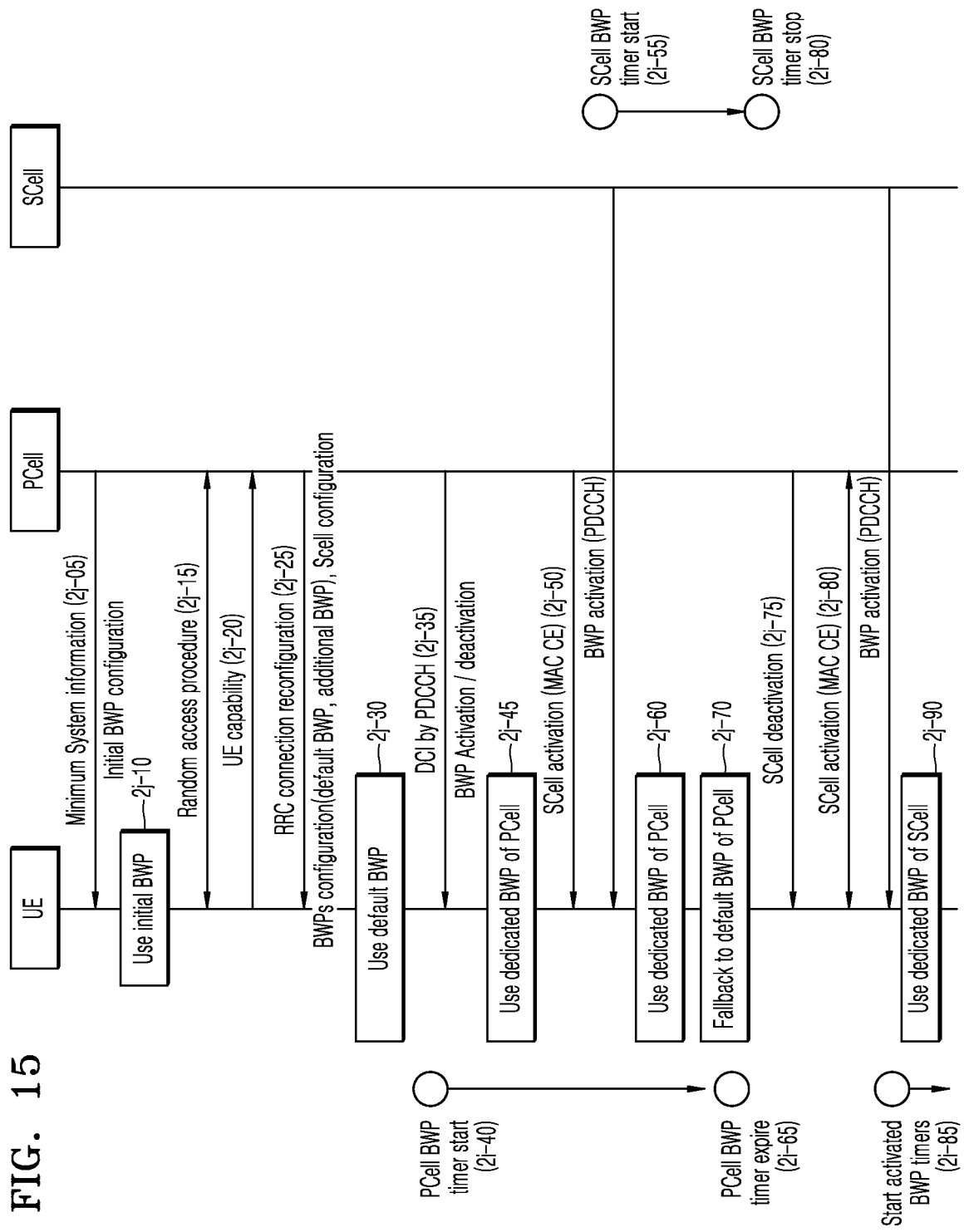
FIG. 15 is an exemplary flowchart for describing a secondary cell (Scell) activation/deactivation procedure using a BWP timer, according to an embodiment.

FIG. 15 is a flowchart for describing an Scell activation/deactivation procedure using a BWP timer, according to an embodiment.

A UE receives MSI broadcasted by a base station (e.g., an eNB or a gNB) at a specific frequency location (2$j$-05). The MSI is periodically broadcasted at a preset radio resource location and includes essential information required to camp on or initially access a corresponding cell. In an embodiment, the MSI includes configuration information of a first BWP used for initial access. The first BWP may be defined as an initial BWP. BWP configuration information includes center frequency and bandwidth information and random access radio resource information. In this case, the center frequency and bandwidth information may be indicated separately for a UL and a DL. The random access radio resource needs to be within at least the configured bandwidth. The bandwidth information may be provided as the number of PRBs or in units of Hz. In an embodiment, the DL configuration information of the first BWP may follow that of the MSI. In this case, the MSI does not need to additionally include the configuration information of the first BWP or includes only UL frequency information and the random access radio resource information.

The UE uses the first BWP (2$j$-10) to perform a subsequent procedure. The subsequent procedure includes a random access procedure and reception of a certain control message. The random access procedure (2$j$-15) includes transmitting a preamble for random access to the base station, transmitting a RAR message to the UE, transmitting Msg3 to the base station, and transmitting Msg4 to the UE. The UE transmits the preamble by using the random access radio resource indicated by the MSI. During a certain period after the preamble is transmitted, the UE monitors whether a RAR message corresponding to the preamble is received. When the RAR message is successfully received, the UE transmits the Msg3 by using a radio resource indicated by the RAR message. Within a certain time, the UE receives the Msg4 and determines whether ultimately attempted random access succeeds. All radio resources used to transmit and receive the above-mentioned messages need to be within at least the first BWP.

During random access or immediately after random access succeeds, the UE reports UE capability information to the base station by still using the first BWP (2$j$-20). The UE capability information includes information about the maximum bandwidth supported by the UE. In addition, the UE receives a certain RRC message from the base station by using the first BWP (2$j$-25). The RRC message includes a list of a plurality of BWPs supported by a corresponding serving cell, and BWP timer information valid in the corresponding serving cell, and the BWP list includes BWP indices and BWP configuration information. That is, the base station may provide center frequency and bandwidth information of each of BWPs supported by the corresponding serving cell, separately for a UL and a DL by using the RRC message. The bandwidth does not exceed the maximum bandwidth indicated by the UE capability information. The base station may also provide indicators of a second BWP and a third BWP among the BWPs included in the BWP list. The second BWP is defined as a default BWP or a basic BWP and serves as a fallback BWP to which the UE returns when a BWP timer expires during operation using another BWP in the corresponding serving cell. The third BWP refers to a first active BWP among the plurality of BWPs by the base station through RRC signaling. The second BWP and the third BWP may be configured as the same BWP or different BWPs. When the UE supports multiple numerologies and the base station desires to configure a BWP per numerology, the RRC control message includes configuration information of a plurality of BWPs. The BWPs may be configured by maintaining the same bandwidth and shifting a center frequency by a certain time interval based on a certain pattern. Such a technology is called frequency hopping, and pattern information and execution information for frequency hopping may be included in the configuration information. An indicator for activating the configured DL and UL BWPs may be included in the control message, or DCI of a PDCCH may include a control message for triggering activation of a corresponding BWP.

In operation 2$j$-30, the UE performs communication by using the DL and UL third BWPs (i.e., first active BWPs) configured by the base station. The UE receives a PDCCH indicating an activation of a specific BWP (DCI indicates index information of the BWP to be activated) in operation 2$j$-35, and then starts the DL BWP timer valid in the corresponding cell (2$j$-40) and switches to the configured BWP (2$j$-45). The DL BWP timer is to define how long the UE uses the indicated active DL BWP. When DCI indicating a PDSCH resource for DL data transmission is received through the PDCCH, the DL BWP timer restarts. When the BWP timer expires (2$j$-65), the UE falls back to the second BWP (i.e., the default BWP) configured by the base station (2$j$-70). This means that the configured DL BWP is deactivated when data transmission and reception is no longer actively performed using the configured DL BWP. Otherwise, deactivation may be explicitly indicated using DCI indicating the corresponding BWP index, and the configured BWP may be reconfigured to another BWP or the default BWP. In the case of the UL BWP, when the UL BWP is paired with the DL BWP (e.g., TDD), the UL BWP operates based on the DL BWP timer. That is, after the timer expires, the UL BWP falls back to the default BWP to perform communication. When the UL BWP is unpaired with the DL BWP (e.g., FDD), activation/deactivation of the UL BWP may be explicitly indicated through the PDCCH, an independent BWP timer may be used for the UL BWP, or the UL BWP may fall back to the default UL BWP along with expiration of the DL BWP timer.

When an RRC connection reconfiguration message including configuration information for adding an SCell (e.g., an SCell index and a cell identifier, BWP configuration information (including second BWP (or basic BWP) and third BWP (or first active BWP) information), radio channel configuration information, and BWP timer information) is received from the base station in operation 2*j*-25, and when an indicator indicating activation/deactivation of the configured SCell (e.g., MAC CE) and an indicator indicating activation of a specific BWP (e.g., PDCCH) are received in operation 2*j*-50, the UE starts the BWP timer of the configured SCell (2*j*-55) and switches to the indicated BWP of the SCell to perform communication (2*j*-60). When PDCCH (e.g., DCI) for subsequent DL data communication is received using the configured BWP, the UE and the base station restart the BWP timer for the corresponding SCell. When the DL BWP timer of the SCell expires, the UE switches to the second BWP. Basically, BWPs are independently configured and used for a PCell and an SCell and an SCell deactivation command may be explicitly indicated while BWP timers are independently running (2*j*-75). The SCell deactivation may be indicated using a MAC CE. The UE having received the indication of SCell deactivation stops the running SCell BWP timer.

Thereafter, when an activation of a specific SCell and an activation of a specific BWP is indicated in operation 2*j*-80, the UE activates and switches to a BWP per serving cell as in operations 2*j*-35 to 2*j*-60. That is, the UE starts a timer for the BWP of the cell configured to be activated (2*j*-85), and switches to the indicated BWP (2*j*-90).

Figure 16:
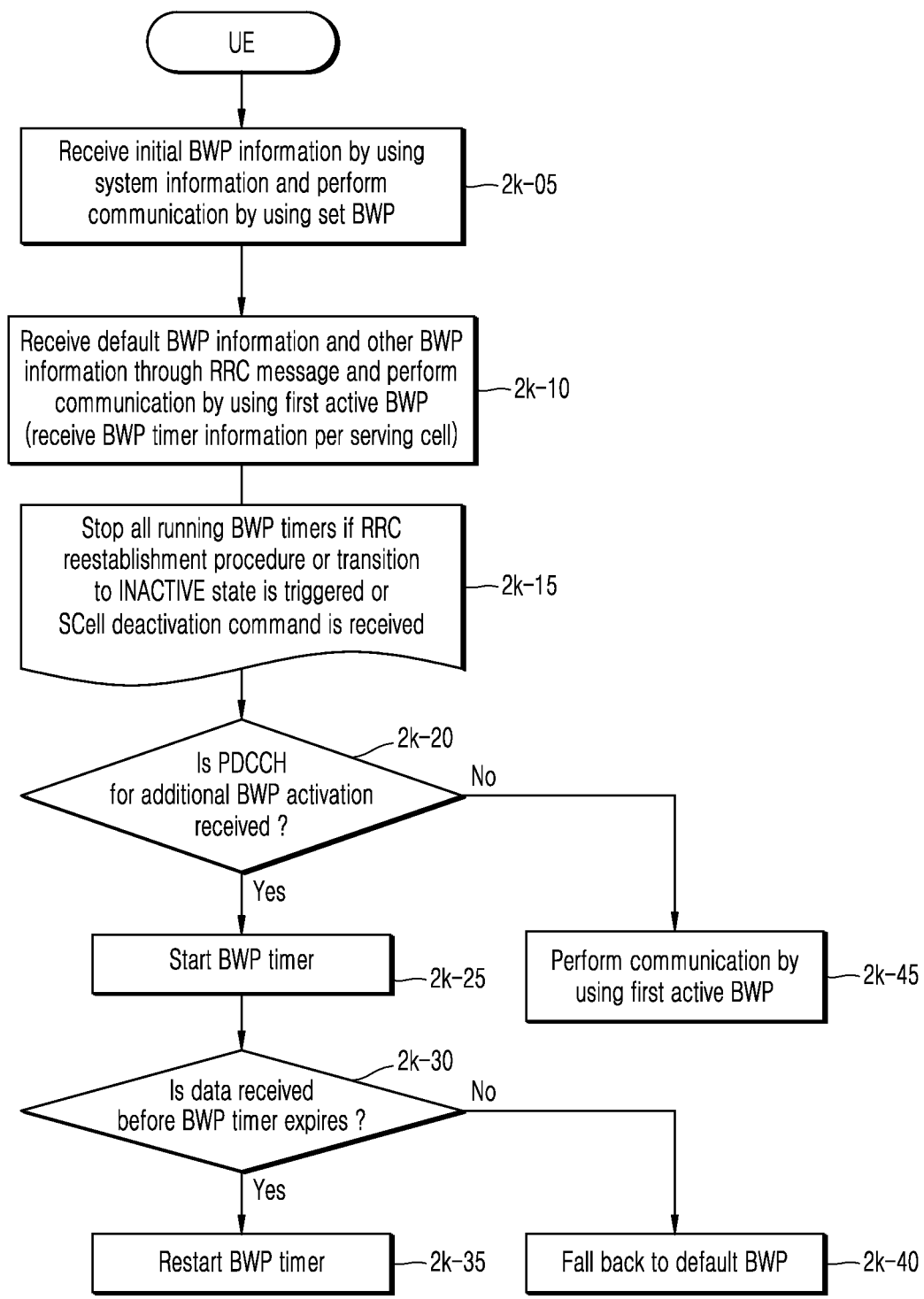
FIG. 16 is an exemplary flowchart for describing a UE operation according to an embodiment.

FIG. 16 is a flowchart for describing a UE operation according to an embodiment.

A UE receives MSI broadcasted by a base station (e.g., an eNB or a gNB) at a specific frequency location (2*k*-05). The MSI is periodically broadcasted at a preset radio resource location and includes essential information required to camp on or initially access a corresponding cell. In an embodiment, the MSI includes configuration information of a first BWP used for initial access. The first BWP may be defined as an initial BWP. BWP configuration information includes center frequency and bandwidth information and random access radio resource information. In this case, the center frequency and bandwidth information may be indicated separately for a UL and a DL. The random access radio resource needs to be within at least the configured bandwidth. The bandwidth information may be provided as the number of PRBs or in units of Hz. In an embodiment, the DL configuration information of the first BWP may follow that of the MSI. In this case, the MSI does not need to additionally include the configuration information of the first BWP or includes only UL frequency information and the random access radio resource information.

The UE uses the first BWP (2*k*-10) to perform subsequent random access and RRC message transmission and reception procedures. In operation 2*k*-10, the UE receives second BWP (or default BWP) information, third BWP (or first active BWP) information, and other BWP information from the base station by using an RRC message, and communicates with the base station by using the first active BWP configured by the RRC message. The RRC message also includes BWP timer information per serving cell.

When an indicator indicating activation of a specific BWP in the configured BWP list is received through a PDCCH in operation 2*k*-20, the UE starts a BWP timer in a corresponding serving cell in operation 2*k*-25 and switches to the indicated BWP to perform subsequent communication. When a resource for data reception is scheduled through the PDCCH in the BWP currently used by the UE before the timer expires in operation 2*k*-30, the UE restarts the BWP timer and continuously operates in the current BWP in operation 2*k*-35. However, when the BWP timer expires in the corresponding cell, that is, when data transmission and reception is not performed for a certain period, the UE switches to the third BWP in operation 2*k*-40.

When the indicator indicating activation of the specific BWP in the BWP list configured using the RRC message is not received through the PDCCH in operation 2*k*-20, the UE performs communication by using the configured first active BWP in operation 2*k*-45. Herein, the second BWP and the third BWP may be the same or different depending on network configuration.

Operation 2*k*-15 may be performed at an arbitrary timing during any of the above-described operations. When a specific procedure corresponding to operation 2*k*-15 is triggered, the UE stops all BWP timers running in the corresponding serving cell, and follows a subsequent procedure. Herein, the specific procedure includes, for example, an RRC reestablishment procedure, a transition to INACTIVE state, or reception of an SCell deactivation command. The subsequent procedure includes a BWP timer-based BWP activation/deactivation operation after operation 2*k*-15, which is as described above.

According to an embodiment, operations of the UE using BWPs may be clarified by clearly defining timer operations associated with BWP selection, based on an RRC connection state of the UE.

1: Motivation/Problem Description/Background
  BWP timer is introduced (fallback, UE battery saving, and the like).
  A UE starts the timer when it switches its active DL BWP to a DL BWP other than the default DL BWP.
  A UE restarts the timer to the initial value when it successfully decodes a DCI to schedule PDSCH(s) in its active DL BWP.
  A UE switches its active DL BWP to the default DL BWP when the timer expires 2: Main Points
BWP timer is per serving cell (or per carrier).
BWP timer handling upon handover (note; stop=stop and reset).
  UE stops all BWP timers together and switches PCell DL BWP to the initial access BWP of target PCell when DL synchronization for the target cell starts (or stops all BWP timers of a MAC entity, when the MAC entity reset).
  After handover completion, UE starts BWP timer of PCell when DL BWP switching to other than the default DL BWP happen in PCell.
  After handover completion and SCell activation, UE starts BWP timer of SCell when DL BWP switching to other than the default DL BWP happen in the SCell.
  BWP timer handling upon RRC connection reestablishment.
  UE stops all BWP timers together when RRC connection reestablishment procedure is triggered.
  After suitable cell selection, UE switches to the initial access DL BWP to perform RRC connection re-establishment procedure
  After successful completion of RRC connection reestablishment procedure, UE starts BWP timer when DL BWP switching to other than the default DL BWP happen
  BWP timer handling upon RRC state transition between INACTIVE and CONNECTED
  UE stops all BWP timers together when INACTIVE STATE transition is instructed.
  After successful state transition to CONNECTED, UE starts BWP timer when DL BWP switching to other than the default DL BWP happen BWP timer handling upon SCell deactivation/activation
UE stops BWP timer for a SCell when the SCell is deactivated.
After SCell activation, UE starts BWP timer for the SCell when DL BWP of the SCell switching to other than the default DL BWP happen.
When BWP timer expires, UE release configured DL assignments if DL assignment is configured outside of DL default BWP.
When BWP timer expires, UE release configured UL grant if the serving cell is TDD cell and if UL grant is configured outside of UL BWP corresponding to DL default BWP.

In a wireless communication system, a high frequency band and a wide bandwidth are used for a DL and thus a lot of transmission resources may be ensured. Furthermore, since a large number of antennas may be physically installed and used for a base station, a beamforming gain and a high signal intensity may be achieved and thus more data may be transmitted to a UE in a DL by using the same frequency/time resources. However, since the UE has a physically small size and a high frequency band and a wide bandwidth are not easily usable for a UL, a bottleneck phenomenon may occur in UL transmission resources compared to DL transmission resources. In addition, since the maximum transmit power level of the UE is much less than the maximum transmit power level of a base station, reduction in coverage for UL data transmission occurs.

A procedure in which a UE compresses UL data and a base station decompresses the data in a wireless communication system will now be proposed and a method of solving decompression failure, e.g., a method of supporting a data transception procedure in which a transmitter compresses data and a receiver decompresses the data, will now be described. The method described below may also be applied to a procedure in which a base station compresses DL data directed to a UE and the UE receives and decompresses the compressed DL data.

Figure 17:
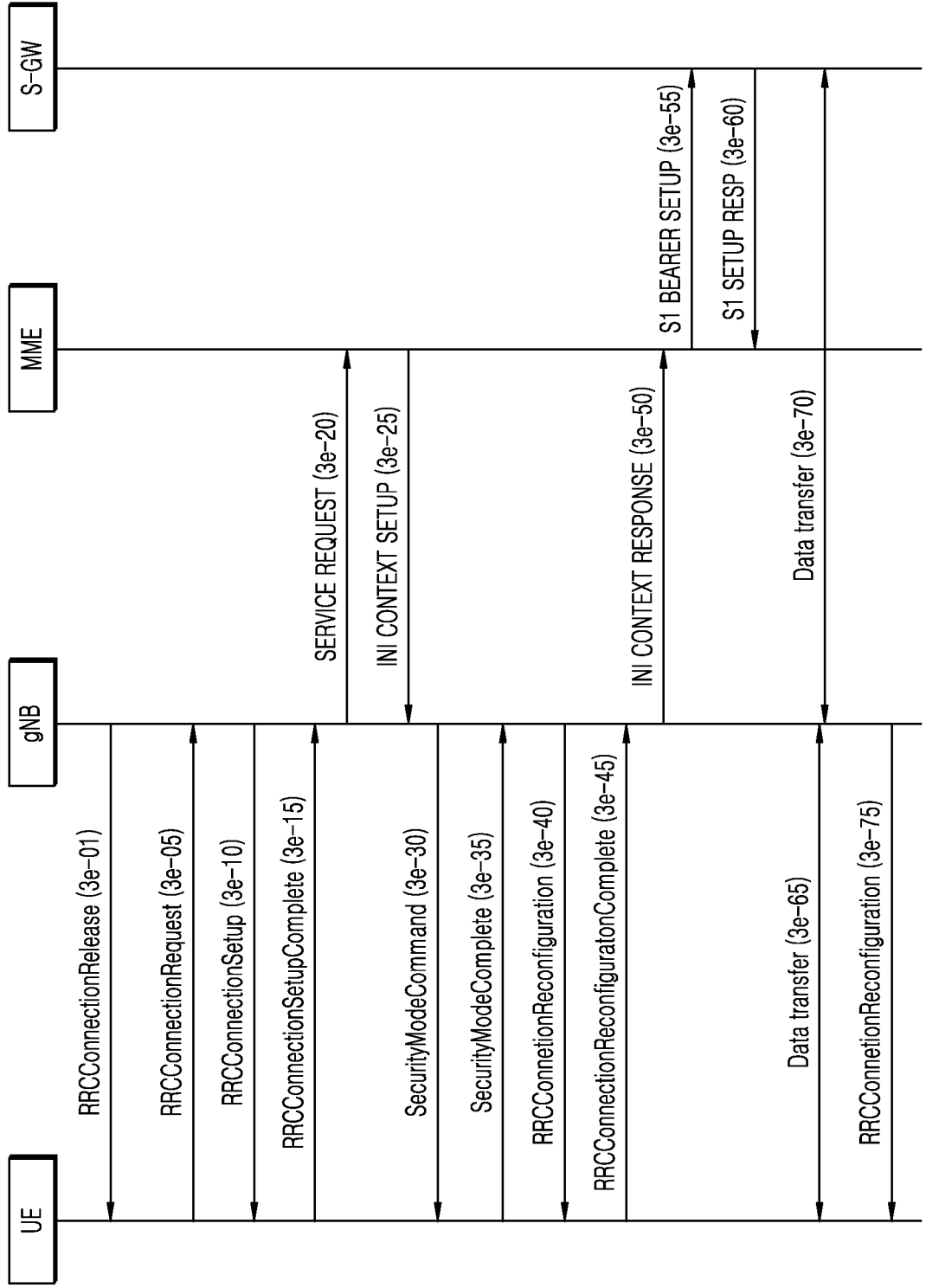
FIG. 17 is an exemplary flowchart for describing a procedure, performed by a base station, for signaling information indicating whether to perform uplink data compression (UDC), when a UE establishes a connection with a network, according to an embodiment.

FIG. 17 is a flowchart for describing a procedure, performed by a base station, for signaling information indicating whether to perform uplink data compression (UDC), when a UE establishes a connection with a network, according to an embodiment.

FIG. 17 illustrates a procedure in which the base station (e.g., a gNB) requests UDC when the UE in an RRC idle mode or an RRC inactive (or lightly-connected) mode switches to an RRC connected mode and establishes a connection with a network, according to an embodiment.

Referring to FIG. 17, when the UE for transmitting and receiving data in an RRC connected mode does not perform data transmission or reception for a certain reason or for a certain period, the gNB may send an RRC Connection Release message to the UE to switch the UE to an RRC idle mode (3e-01). When the UE which is not currently connected to a network (hereinafter referred to as an idle-mode UE) has data to be transmitted, the UE performs an RRC connection setup procedure with the gNB. The UE achieves reverse transmission synchronization with the gNB through a random access procedure and transmits an RRC Connection Request message to the gNB (3e-05). The RRC Connection Request message includes a UE identity, an establishmentCause, etc.

The gNB transmits an RRC Connection Setup message such that the UE establishes an RRC connection (3e-10). The RRC Connection Setup message may include information indicating whether to use UDC per logical channel (Logical Channel Config), per bearer, or per PDCP entity (PDCP-Config). Specifically, the RRC Connection Setup message may provide information indicating whether to use UDC only for which IP or QoS flow, for each logical channel, bearer, or PDCP entity (or service data adaptation protocol (SDAP) entity) (information about an IP or QoS flow to use or not to use UDC may be provided to the SDAP entity such that the SDAP entity may instruct the PDCP entity whether to use or not to use UDC for each QoS flow). Alternatively, the PDCP entity may autonomously check each QoS flow (based on configuration information provided by the gNB) and determine whether to apply or not to apply UDC.) In this case, when instructed to use UDC, a predefined library or dictionary ID to be used for UDC, a buffer size to be used for UDC, etc. may be provided. The RRC Connection Setup message may include a UDC decompression setup or release command. When configured to use UDC, it may always be configured with an RLC AM bearer (a lossless mode due to an ARQ function or a retransmission function) and may not be configured with a header compression protocol (e.g., a robust header compression (ROHC) protocol). The RRC Connection Setup message includes RRC connection configuration information. An RRC connection is also called a signaling radio bearer (SRB) and is used to transmit and receive an RRC message as a control message between the UE and the gNB.

The RRC connected UE transmits an RRC Connection Setup Complete message to the gNB (3e-15). When the gNB does not know of or desires to check capability of the currently connected UE, the gNB may send a UE capability inquiry message. The UE may send a UE capability report message. The UE capability report message may include an indicator indicating whether the UE is capable of using UDC. The RRC Connection Setup Complete message includes a control message such as a SERVICE REQUEST message for requesting an MME to configure bearers for a certain service for the UE.

The gNB transmits the SERVICE REQUEST message included in the RRC Connection Setup Complete message, to the MME (3e-20), and the MME determines whether to provide the service requested by the UE. Upon determining to provide the service requested by the UE, the MME transmits an INITIAL CONTEXT SETUP REQUEST message to the gNB (3e-25). The INITIAL CONTEXT SETUP REQUEST message includes QoS information to be used to configure data radio bearers (DRBs) and security information to be used for the DRBs (e.g., a security key or a security algorithm). The gNB exchanges a Security Mode Command message (3e-30) and a Security Mode Complete message(3e-35) with the UE to configure a security mode.

After the security mode is completely configured, the gNB transmits an RRC Connection Reconfiguration message to the UE (3e-40). The RRC Connection Reconfiguration message may include information indicating whether to use UDC per logical channel (Logical Channel Config), per bearer, or per PDCP entity (PDCP-Config). Specifically, the RRC Connection Reconfiguration message may provide information indicating whether to use UDC only for which IP or QoS flow, for each logical channel, bearer, or PDCP entity (or SDAP entity) (information about an IP or QoS flow to use or not to use UDC may be provided to the SDAP entity such that the SDAP entity may instruct the PDCP entity whether to use or not to use UDC for each QoS flow). Alternatively, the PDCP entity may autonomously check each QoS flow (based on configuration information provided by the gNB) and determine whether to apply or not to apply UDC.) In this case, when instructed to use UDC, a predefined library or dictionary ID to be used for UDC, a buffer size to be used for UDC, etc. may be provided. The RRC Connection Reconfiguration message may include a UDC decompression setup or release command. Herein, when configured to use UDC, it may always be configured with an RLC AM bearer (a lossless mode due to an ARQ function or a retransmission function) and may not be configured with a header compression protocol (e.g., a ROHC protocol). The RRC Connection Reconfiguration message includes DRB setup information for processing user data and the UE configures DRBs by using the DRB setup information and transmits an RRC Connection Reconfiguration Complete message to the gNB (3e-45).

The gNB having completely configured the DRBs with the UE transmits an INITIAL CONTEXT SETUP COMPLETE message to the MME (3e-50) and the MME having received the INITIAL CONTEXT SETUP COMPLETE message exchanges an S1 BEARER SETUP message and an S1 BEARER SETUP RESPONSE message with an S-GW to configure S1 bearers (3e-55 and 3e-60). The S1 bearers are data transmission connections established between the S-GW and the gNB and correspond to the DRBs one-to-one.

When the above-described operations are all completed, the UE transmits and receives data to and from the gNB and the S-GW (3e-65 and 3e-70). The above-described data transmission procedure includes three steps of RRC connection setup, security setup, and DRB setup. The gNB may transmit an RRC Connection Reconfiguration message to the UE to renew, add, or modify the RRC connection for a certain reason (3e-75). The RRC Connection Reconfiguration message may include information indicating whether to use UDC per logical channel (Logical Channel Config), per bearer, or per PDCP entity (PDCP-Config). Specifically, the RRC Connection Reconfiguration message may provide information indicating whether to use UDC only for which IP or QoS flow, for each logical channel, bearer, or PDCP entity (or SDAP entity) (information about an IP or QoS flow to use or not to use UDC may be provided to the SDAP entity such that the SDAP entity may instruct the PDCP entity whether to use or not to use UDC for each QoS flow). Alternatively, the PDCP entity may autonomously check each QoS flow (based on configuration information provided by the gNB) and determine whether to apply or not to apply UDC.) In this case, when instructed to use UDC, a predefined library or dictionary ID to be used for UDC, a buffer size to be used for UDC, etc. may be provided. The RRC Connection Reconfiguration message may include a UDC decompression setup or release command. Herein, when configured to use UDC, it may always be configured with an RLC AM bearer (a lossless mode due to an ARQ function or a retransmission function) and may not be configured with a header compression protocol (e.g., a ROHC protocol).

In the above-described procedure, information indicating whether to use UDC only for which IP or QoS flow, for each logical channel, bearer, or PDCP entity (or SDAP entity) may be signaled. For example, the gNB or a CN may provide information about or an indicator of an IP or QoS flow to use or not to use UDC, to the SDAP entity by using an RRC message (or an AS message) or a NAS message such that the SDAP entity may provide, to the PDCP entity, an indicator indicating whether to use or not to use UDC for each QoS flow. Alternatively, the PDCP entity may autonomously check each QoS flow (based on configuration information or an indicator provided by the gNB or the CN) and determine whether to apply or not to apply UDC, or the gNB or the CN may provide traffic flow template (TFT) filtering information including a UDC application indicator to the UE such that the PDCP entity of the UE may determine whether to apply UDC for each packet.

Figure 18:
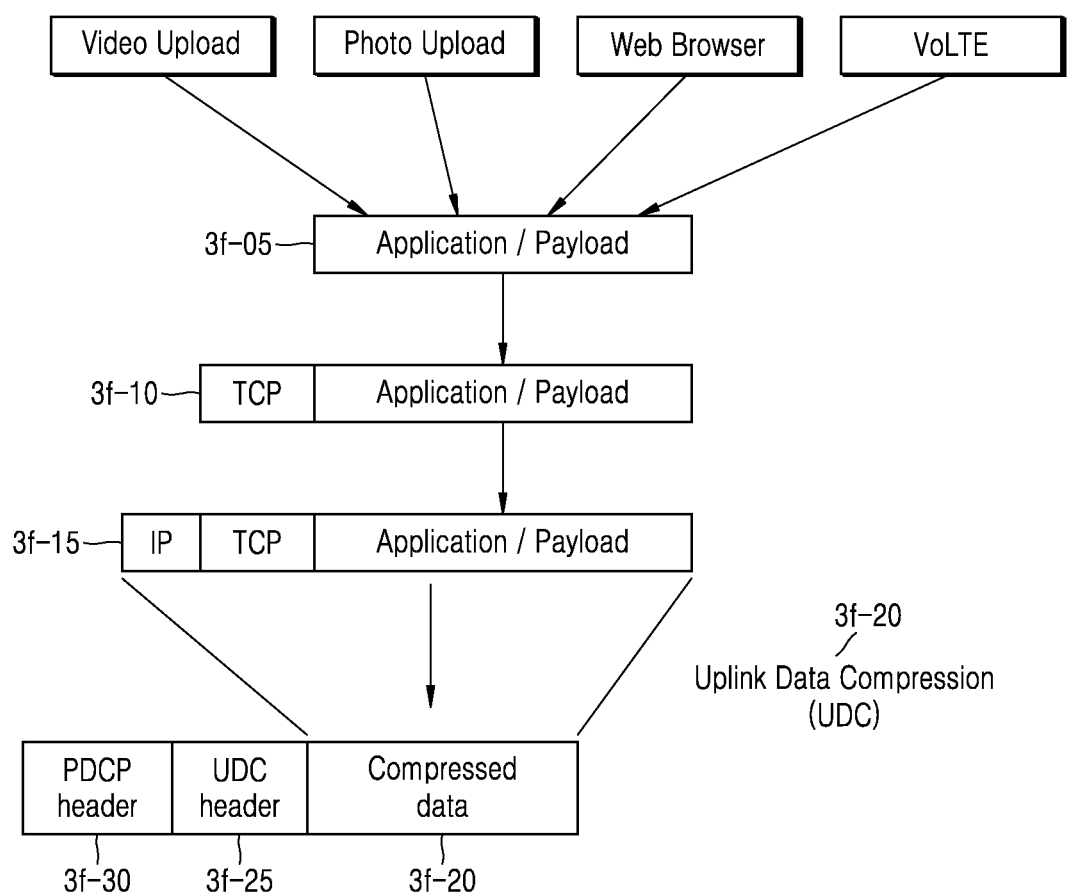
FIG. 18 is a diagram illustrating an exemplary procedure and data configuration for performing UDC, according to an embodiment.

FIG. 18 is a diagram illustrating a procedure and data configuration for performing UDC, according to an embodiment.

In FIG. 18, UL data 3f-05 may include data corresponding to services such as video upload, photo upload, web browser, and voice over LTE (VoLTE). Data generated by an application entity may be processed by a network data transmission layer such as a TCP/IP or UDP layer to configure headers 3f-10 and 3f-15 and may be delivered to a PDCP entity. When a PDCP SDU is received from an upper layer, the PDCP entity may perform the following operations.

When the RRC message indicated by 3e-10, 3e-40, or 3e-75 in FIG. 17 indicates to use UDC for the PDCP entity, the PDCP entity may perform UDC on the PDCP SDU as indicated by 3f-20 to compress the UL data, configure a UDC header (a header for the compressed UL data 3f-20) 3f-25, perform ciphering, perform integrity protection when configured, and configure a PDCP header 3f-30, thereby generating a PDCP PDU. The PDCP entity includes a UDC compression/decompression entity and determines whether to perform UDC on each data unit as indicated by the RRC message and uses the UDC compression/decompression entity. In a transmitter, a transmitting PDCP entity performs data compression by using a UDC compression entity and, in a receiver, a receiving PDCP entity performs data decompression by using a UDC decompression entity.

The above-described procedure of FIG. 18 may be used not only to compress the UL data by a UE but also to compress DL data. The above description related to the UL data may be equally applied to the DL data.

The UDC header 3f-25 and the PDCP header 3f-30 are separately described in relation to FIG. 18. However, a UDC header and a PDCP header are configured, generated, and concatenated by a PDCP entity and may be collectively called a PDCP header. The UDC header will be described below as a part of the PDCP header.

Figure 19:
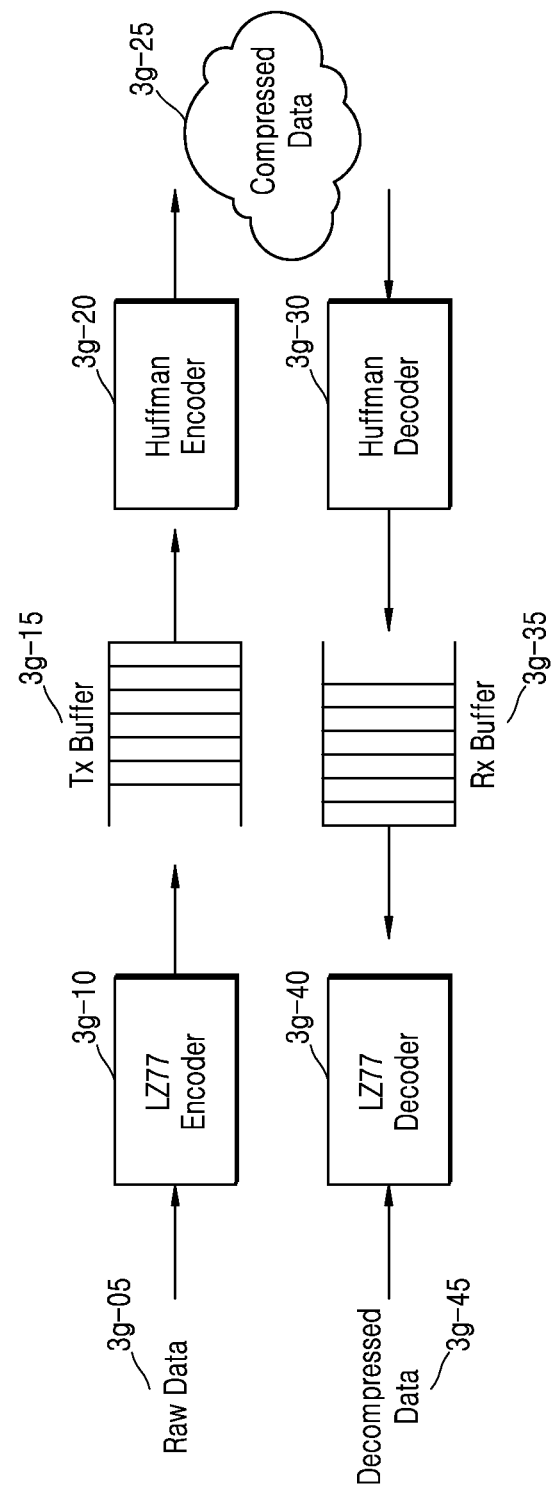
FIG. 19 is an exemplary diagram for describing a UDC method according to an embodiment.

FIG. 19 is a diagram for describing a UDC method according to an embodiment.

FIG. 19 illustrates a DEFLATE-based UDC algorithm which is a lossless compression algorithm. According to the DEFLATE-based UDC algorithm, basically, UL data is compressed using a combination of an LZ77 algorithm and Huffman coding.

According to the LZ77 algorithm, a sliding window is searched for repeated occurrences of data and, when repeated data is found within the sliding window, data compression is performed by expressing the repeated data in the sliding window as a location and length of the repeated data. The sliding window is called a buffer in the UDC method and may be set to 8 kilobytes or 32 kilobytes. That is, the sliding window or the buffer may record 8,192 or 32,768 characters, find repeated data, and perform data compression by expressing the repeated data as a location and length of the repeated data. Therefore, since the LZ77 algorithm is a sliding window scheme, that is, since subsequent data is coded immediately after previously coded data is updated in a buffer, successive data has correlations therebetween. Thus, the subsequent data may be normally decoded only when the previously coded data is normally decoded.

The codes compressed and expressed as the location and length by using the LZ77 algorithm is compressed once again by using the Huffman coding. According to the Huffman coding, repeated characters are found and data compression is performed once again by assigning the shortest code to the most frequent character and assigning the longest code to the least frequent character. The Huffman coding is a prefix coding algorithm and is an optimal coding scheme by which all codes are uniquely decodable.

As described above, a transmitter may encode raw data 3g-05 by using the LZ77 algorithm (3g-10), update a buffer 3g-15, and configure a UDC header by generating checksum bits for the contents (or data) of the buffer. The checksum bits are used by a receiver to determine validity of a buffer status. The transmitter may compress the codes encoded using the LZ77 algorithm, by using the Huffman coding (3g-20), and transmit the compressed data as UL data (3g-25). The receiver performs a decompression procedure on the compressed data received from the transmitter, in an inverse manner to that of the transmitter. That is, the receiver performs Huffman decoding (3g-30), updates a buffer (3g-35), and checks validity of the updated buffer, based on the checksum bits of the UDC header. Upon determining that the checksum bits have no error, the receiver may decompress the data by performing decoding using the LZ77 algorithm (3g-40) to reconstruct the raw data and deliver the decompressed data to an upper layer (3g-45).

As described above, since the LZ77 algorithm is a sliding window scheme, that is, since subsequent data is coded immediately after previously coded data is updated in a buffer, successive data has correlations therebetween. Thus, the subsequent data may be normally decoded only when the previously coded data is normally decoded. Therefore, a receiving PDCP entity checks PDCP sequence numbers of a PDCP header, checks a UDC header (check an indicator indicating whether data compression is or is not performed), and decompresses the compressed UDC data in ascending order of the PDCP sequence numbers.

A procedure for configuring UDC for a UE by a base station and a procedure for performing UDC by the UE are as described below.

The base station (e.g., an eNB or a gNB) may configure or release UDC for a bearer or a logical channel which configures a RLC AM mode for the UE, by using the RRC message indicated by 3e-10, 3e-40, or 3e-75 in FIG. 17. The gNB may reset a UDC entity (or protocol) of a PDCP entity of the UE, by using the RRC message. Herein, resetting the UDC entity (or protocol) means that a UDC buffer for UDC compression of the UE is reset, and is required to achieve synchronization between the UDC buffer of the UE and a UDC buffer for UDC decompression of the gNB. Herein, to reset the buffer of the UDC entity, an existing PDCP control PDU may be modified or a new PDCP control PDU may be defined and a transmitter (e.g., the gNB) may reset a UDC buffer of a receiver (e.g., the UE) by using the PDCP control PDU instead of the RRC message to achieve synchronization for user data compression and decompression between the transmitter and the receiver.

Using the RRC message, whether to perform UDC compression may be determined per bearer, per logical channel, or per PDCP entity. Specifically, whether to perform or not to perform UDC decompression may be configured per IP (or QoS) flow in each bearer, logical channel, or PDCP entity. Herein, for the configuration per QoS flow, the PDCP entity may configure an indicator or information to indicate for which QoS flow to perform UDC decompression and for which QoS flow not to perform UDC decompression. Herein, the configuration per QoS flow may be provided to a SDAP entity other than the PDCP entity such that the SDAP entity may instruct the PDCP entity whether to perform or not to perform UDC decompression for each QoS flow when the QoS flow is mapped to a bearer.

Using the RRC message, the gNB may configure a PDCP discard timer value for the UE. For the PDCP discard timer value, a PDCP discard timer value for data to which UDC is not applied and a PDCP discard timer value for data to which UDC is applied may be separately configured.

When configured to perform UDC for a certain bearer, logical channel, or PDCP entity (or for any QoS flows of the certain bearer, logical channel, or PDCP entity) by using the RRC message, the UE resets a buffer in a UDC entity of the PDCP entity in accordance with the configuration and prepares a UDC procedure. When a PDCP SDU is received from an upper layer and when configured to perform UDC for the PDCP entity, the UE performs UDC on the received PDCP SDU. When configured to perform UDC only for specific QoS flows of the PDCP entity, the UE determines whether to perform UDC by checking an instruction of an upper SDAP layer or QoS flow identities, and performs UDC. When UDC is performed and the buffer is updated in accordance with the UDC compression, the UE configures a UDC buffer. Herein, when UDC is performed, the PDCP SDU received from the upper layer may be compressed into UDC data (e.g., a UDC block) having a smaller size. The UE configures a UDC header for the compressed UDC data. The UDC header may include an indicator indicating whether UDC is or is not performed (for example, a 1-bit indicator of the UDC header may have a value 0 indicating that UDC is applied, or a value 1 indicating that UDC is not applied). In this case, UDC may not be applied because an upper layer has already performed data compression such that, although the PDCP entity performs UDC, a very low compression ratio may be obtained and processing load of a transmitter may unnecessarily increase due to the compression procedure, or because the PDCP SDU received from the upper layer does not have a repeated data structure and thus may not be compressed using the UDC method (e.g., the DEFLATE algorithm) described herein. In this case, when UDC is performed on the PDCP SDU received from the upper layer and the UDC buffer is updated, the receiving PDCP entity may calculate checksum bits and include the calculated checksum bits in the UDC buffer to check validity of the updated UDC buffer (the checksum bits have a certain length, e.g., 4 bits).

The UE performs integrity protection on data to which UDC decompression is applied or not applied, when integrity protection is configured for the data, performs ciphering, and delivers the data to a lower layer.

Figure 20:
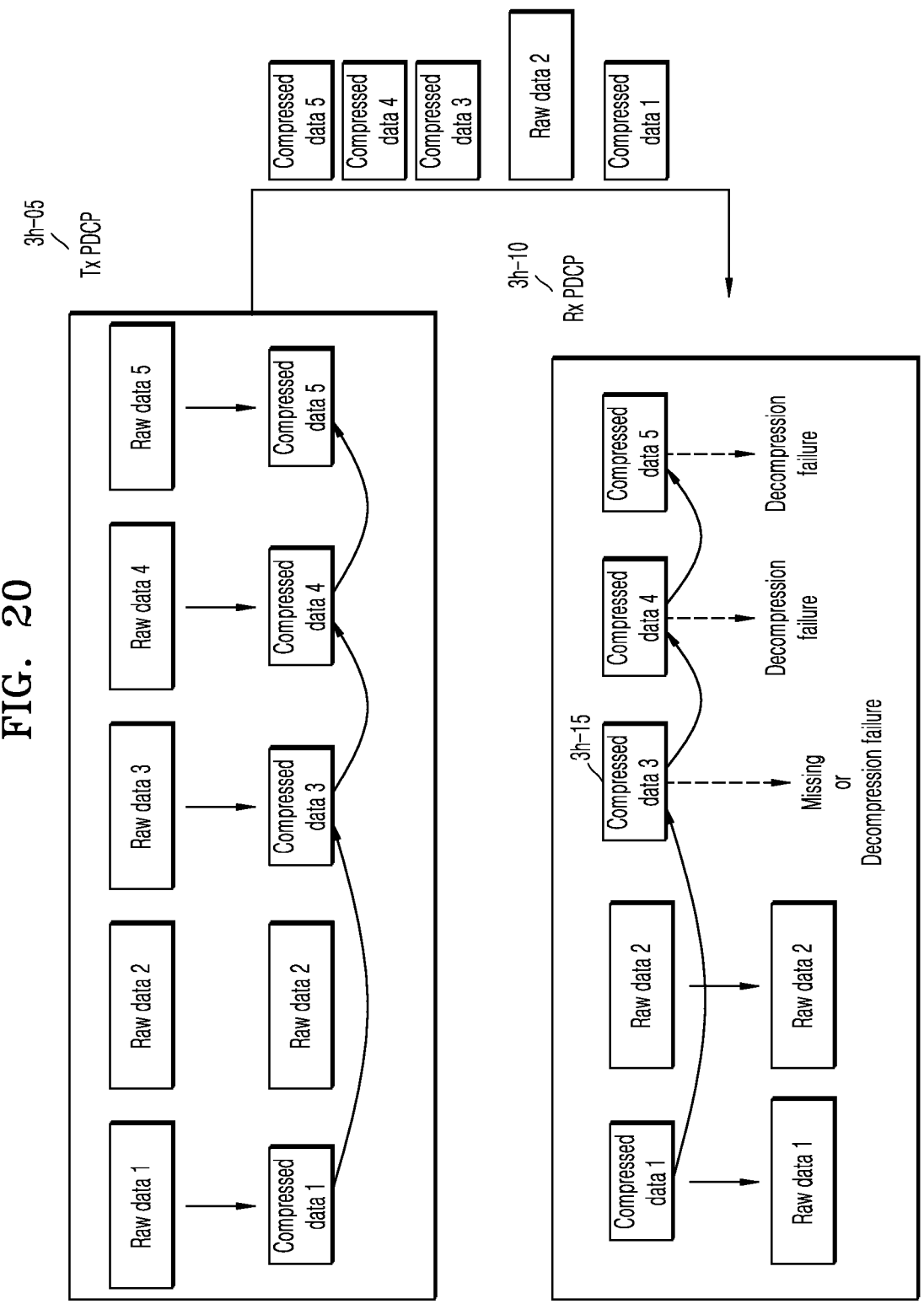
FIG. 20 is a n exemplary diagram showing that decompression failure occurs in a UDC method, according to an embodiment.

FIG. 20 is a diagram showing that decompression failure occurs in a UDC method, according to an embodiment.

As described above in relation to FIG. 19, according to a UDC algorithm (i.e., a DEFLATE algorithm (for performing a LZ77 algorithm and then performing Huffman coding)), when a transmitter performs data compression, previously compressed data is updated in a buffer, data to be subsequently compressed is compared to the data of the buffer, and a repeated data structure is found and is compressed into a location and length of the repeated data structure. Therefore, a receiver needs to follow the compression order of the transmitter to successfully decompress the data. For example, when the transmitter performs UDC compression on data of PDCP sequence numbers 1, 3, 4, and 5 and does not perform UDC compression on data of PDCP sequence number 2 (3h-05), a PDCP entity of the receiver needs to perform decompression in the order of PDCP sequence numbers 1, 3, 4, and 5 to successfully decompress the received data.

When UDC compression is performed by the transmitter, since a UDC header indicates that UDC compression is performed, the receiver may check the UDC header to determine whether UDC compression is applied. When the data of PDCP sequence number 3 is missing during a series of UDC decompression operations (3h-15), all subsequent UDC decompression operations fail. That is, the data of PDCP sequence numbers 4 and 5 may not be UDC-decompressed (3h-10). Thus, in the UL decompression procedure, missing data (packet) is not allowed and the receiver needs to perform decompression in the order in which the transmitter UDC-compresses the data. Therefore, UDC needs to be performed in an RLC AM mode corresponding to a lossless mode and having a retransmission function.

As described above in relation to FIG. 19, according to the UDC algorithm (i.e., the DEFLATE algorithm (for performing the LZ77 algorithm and then performing the Huffman coding)), after UL data is compressed, the transmitter generates checksum bits by using current contents of the buffer, and configures the UDC header with the checksum bits. Then, the transmitter updates the buffer by using raw data of the compressed data, data to be subsequently compressed is compared to the data of the buffer, and a repeated data structure is found and is compressed into a location and length of the repeated data structure. Herein, the checksum bits in the UDC header are used by a UDC entity (or function) of the receiving PDCP entity to determine validity of a current buffer status before performing data decompression. That is, before performing data decompression, the receiver checks validity of the current receiving UDC buffer based on the checksum bits of the UDC header, and performs data decompression when a checksum error does not occur. When a checksum error occurs, the receiver needs to transmit a checksum error report to the transmitter without performing data decompression.

The receiver needs to follow the compression order of the transmitter to successfully decompress the data. For example, when the transmitter performs UDC compression on the data of PDCP sequence numbers 1, 3, 4, and 5 and does not perform UDC compression on the data of PDCP sequence number 2, the PDCP entity of the receiver needs to perform decompression in the order of PDCP sequence numbers 1, 3, 4, and 5 to successfully decompress the received data. When UDC compression is performed by the transmitter, since the UDC header indicates that UDC compression is performed, the receiver may check the UDC header to determine whether UDC compression is applied. When a checksum error occurs at PDCP sequence number 3 during a series of UDC decompression operations, all subsequent UDC decompression operations may fail. That is, the data of PDCP sequence numbers 4 and 5 may not be successfully UDC-decompressed.

Checksum error processing methods for solving the above-described checksum error will now be described.

A first embodiment of the checksum error processing method relates to a partial reestablishment method of an RLC entity and may operate as described below.

When a checksum error of a receiving UDC buffer is detected in data to be UDC-decompressed, a receiver (e.g., an eNB or a gNB) transmits an RRC Connection Reconfiguration message to a UE to signal that the checksum error occurs. In this case, a new RRC message may be defined and used, or a new indicator may be defined and an existing RRC message may be modified to include the new indicator. The RRC message may indicate a PDCP sequence number of the data in which the checksum error occurs. Alternatively, the RRC message may define and include an indicator of the checksum error.

Receiver operation: The receiver (e.g., the eNB or the gNB) may transmit the RRC message, perform a partial reestablishment procedure on a PDCP entity, perform a partial reestablishment procedure on a RLC entity, and perform a buffer emptying procedure on a MAC entity. The receiver may re-establish only a receiving AM RLC entity and may not re-establish a transmitting AM RLC entity. The RLC entity supports bi-directional data communication and thus may operate independent buffers, independent RLC sequence numbers, independent RLC window variables or windows, and timers for transmit data and received data. Therefore, the partial reestablishment procedure does not refer to a procedure for re-establishing both of the transmitting AM RLC entity and the receiving AM RLC entity but refers to a procedure for re-establishing only the transmitting AM RLC entity or only the receiving AM RLC entity. That is, in the partial reestablishment procedure, the receiving AM RLC entity processes and transmits received data to an upper layer, resets a receiving RLC buffer and resets the receiving RLC window, timers, and window variables, and expects to receive a reset new RLC sequence number (all window variables and timers are reset). The transmitting AM RLC entity is not re-established, does not reset the transmitting RLC window, timers, and window variables, and may equally continue data transmission. A reestablishment procedure of the PDCP entity refers to a procedure for re-establishing the PDCP entity for UL and DL data transmissions. However, the partial reestablishment procedure of the PDCP entity refers to a procedure for re-establishing a receiving PDCP entity for UL data transmission when the receiver is the gNB, or refers to a procedure for re-establishing a receiving PDCP entity for DL data transmission when the receiver is the UE. In the reestablishment procedure of the PDCP entity, the PDCP entity transmits the RRC message and processes data received from a lower layer, resets a UDC buffer, and waits for data to be newly received. When the data received from the lower layer is processed, the PDCP entity may discard all data having PDCP sequence numbers greater than a PDCP sequence number at which the checksum error occurs. According to another method, when the data received from the lower layer is processed, the PDCP entity may check PDCP headers (or UDC headers) of data having PDCP sequence numbers greater than a PDCP sequence number at which the checksum error occurs, and discard only data to which UDC is applied. According to another method, when the data received from the lower layer is processed, the PDCP entity may check PDCP headers (or UDC headers) of data having PDCP sequence numbers greater than a PDCP sequence number at which the checksum error occurs, and discard only data to which UDC is applied. The PDCP entity may check PDCP sequence numbers of packets to which UDC is not applied, and process and transmit the packets, to which UDC is not applied, to an upper layer when data having PDCP sequence numbers less than the PDCP sequence numbers of the packets to which UDC is not applied are received without any missing. A security key for deciphering or integrity checking may be newly configured and used in the partial reestablishment procedure of the PDCP entity. According to another method, a security key for deciphering or integrity checking may not be newly configured and used and a previously used security key may be continuously used in the partial reestablishment procedure of the PDCP entity. The MAC entity may reset a HARQ buffer (e.g., may empty the buffer). The MAC entity may also perform partial resetting. Specifically, the MAC entity may reset a receiving HARQ procedure and reset and empty only a receiving buffer without emptying a transmitting buffer. Using the RRC message instructing to perform a checksum error processing operation, the gNB may update security keys of a PDCP entity of the UE when required.

Transmitter operation: When the RRC message is received, the transmitter (e.g., the UE) may perform a partial reestablishment procedure on a RLC entity and perform a buffer emptying procedure on a MAC entity. The transmitter may re-establish only a transmitting AM RLC entity and may not re-establish a receiving AM RLC entity. The RLC entity supports bi-directional data communication and thus may operate independent buffers, independent RLC sequence numbers, independent RLC window variables or windows, and timers for transmit data and received data. Therefore, the partial reestablishment procedure does not refer to a procedure for re-establishing both of the transmitting AM RLC entity and the receiving AM RLC entity but refers to a procedure for re-establishing only the transmitting AM RLC entity or only the receiving AM RLC entity. That is, in the partial reestablishment procedure, only the transmitting AM RLC entity is re-established, resets a RLC buffer (e.g., discards all of not-transmitted AMD PDUs or SDUs), resets the RLC sequence numbers, and resets all window variables and timers. The receiving AM RLC entity is not re-established, does not reset the receiving RLC window, timers, and window variables, and may equally continue data reception. A reestablishment procedure of the PDCP entity refers to a procedure for re-establishing the PDCP entity for UL and DL data transmissions. However, the partial reestablishment procedure of the PDCP entity refers to a procedure for re-establishing a transmitting PDCP entity for UL data transmission when the transmitter is the gNB, or refers to a procedure for re-establishing a transmitting PDCP entity for DL data transmission when the transmitter is the UE. In the reestablishment procedure of the PDCP entity, the PDCP entity may receive the RRC message, reset a UDC buffer, and process data to be transmitted. When the data to be transmitted is processed, the PDCP entity may update the UDC buffer by performing UDC again from a PDCP sequence number indicated by the RRC message, calculate and include corresponding checksum bits in the UDC buffer, and retransmit the data to a lower layer, or retransmit the data to the lower layer without performing UDC when UDC is not required for the data. According to another method, when the PDCP entity retransmits the data by performing UDC again from the PDCP sequence number indicated by the RRC message, only data (e.g., PDCP SDUs) to which UDC is applied in the previous transmission may be retransmitted. That is, data to which UDC is not applied in the previous transmission (e.g., non-UDC data acknowledged by the RLC entity) may not be retransmitted. According to another method, when the PDCP entity is re-established, the PDCP entity may update the UDC buffer by performing UDC again from a first PDCP sequence number unacknowledged by the lower layer, configure a UDC header by calculating corresponding checksum bits, and retransmit the data to the lower layer, or retransmit the data to the lower layer without performing UDC when UDC is not required for the data. A security key for deciphering or integrity checking may be newly configured and used in the partial reestablishment procedure of the PDCP entity. According to another method, a security key for deciphering or integrity checking may not be newly configured and used and a previously used security key may be continuously used in the partial reestablishment procedure of the PDCP entity. The MAC entity may reset a HARQ buffer. The MAC entity may also perform partial resetting. Specifically, the MAC entity may reset a transmitting HARQ procedure and reset and empty only a transmitting buffer without emptying a receiving buffer.

In an embodiment, the PDCP entity may not perform partial reestablishment, the RLC entity may not perform partial reestablishment, and the MAC entity may not perform partial resetting. For convenience of implementation, the PDCP entity for UL data transmission and the PDCP entity for DL data transmission may be both re-established, the transmitting AM RLC entity and the receiving AM RLC entity may be both re-established, and the MAC entity may reset both the transmitting and receiving HARQ procedures and both the transmitting and receiving buffers.

Figure 21:
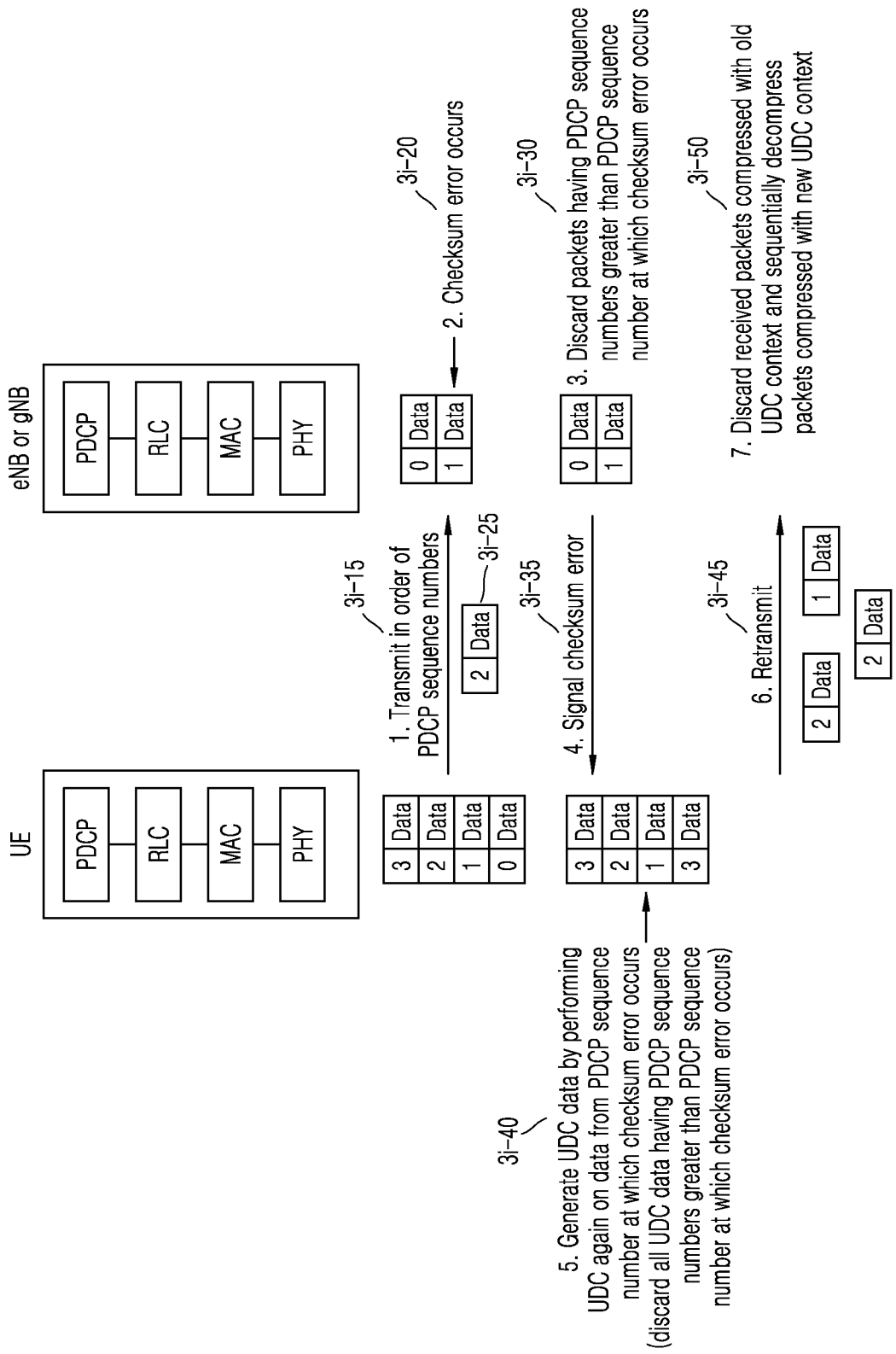
FIG. 21 is an exemplary diagram showing that data compressed with old UDC context and data compressed with now UDC context are not distinguishable by a receiver when a checksum error occurs, according to an embodiment.

FIG. 21 is a diagram showing that data compressed with old UDC context and data compressed with now UDC context are not distinguishable by a receiver when a checksum error occurs, according to an embodiment.

When a RLC entity is not re-established as described above in the previous embodiment and when a checksum error occurs in the receiver, data compressed with old UDC context is not distinguishable from data compressed with new UDC context. Since PDCP layers, RLC layers, or MAC layers of a transmitter and a receiver are re-established in the previous embodiment, data compressed with old UDC context and data compressed with new UDC context are not mixed in the receiving PDCP layer. The old UDC context may refer to data (e.g., buffer data of the transmitter and the receiver) compressed before the checksum error occurs and the new UDC context may refer to data (e.g., buffer data of the transmitter and the receiver) newly compressed after the checksum error occurs.

Referring to FIG. 21, a transmitting PDCP layer $3i$-05 of a UE may perform UDC on UL transmit data. For example, the transmitting PDCP layer $3i$-05 may perform UDC on data of PDCP sequence numbers 0, 1, 2, and 3 and transmit the compressed data through a lower layer to a receiver (e.g., an eNB or a gNB). The transmitted data may arrive at the receiver in an order different from its original order $3i$-15 due to a HARQ retransmission procedure of a MAC layer and a retransmission procedure of an RLC layer. A specific packet may arrive very late.

It is assumed that the transmitting PDCP entity $3i$-05 performs UDC on and transmits data corresponding to PDCP sequence numbers 0, 1, and 2 and a receiving PDCP entity $3i$-10 receives the data corresponding to PDCP sequence numbers 0 and 1 and the checksum error occurs in the data corresponding to PDCP sequence number 1. According to an embodiment, the receiver may transmit an RRC message or PDCP control PDU indicating that the checksum error occurs in the data corresponding to PDCP sequence number 1 ($3i$-35). The data corresponding to PDCP sequence number 2 may arrive very late due to HARQ retransmission and RLC layer retransmission ($3i$-25). In this case, the RRC message or PDCP control PDU indicating the PDCP sequence number at which the checksum error occurs is transmitted to the UE and the receiver (e.g., the eNB or the gNB) may discard data packets which have PDCP sequence numbers greater than or equal to the PDCP sequence number at which the checksum error occurs and to which UDC is applied (whether UDC is applied may be determined by checking an indicator of a UDC header).

The UE having received the RRC message or PDCP control PDU indicating the PDCP sequence number at which the checksum error occurs may reset a UDC buffer and perform UDC again on data packets which have PDCP sequence numbers greater than or equal to the indicated PDCP sequence number and to which UDC is previously applied or to be newly applied, update the UDC buffer, calculate and include corresponding checksum bits in the UDC buffer, and retransmit the data to the lower layer (after the retransmission, new transmission may be performed by allocating sequential PDCP sequence numbers). The UE newly compresses data packets which have PDCP sequence numbers equal to or greater than the indicated PDCP sequence number 1 and to which UDC is previously applied (compresses with new UDC context) and retransmits the data to the lower layer. The transmitter may discard data compressed with old UDC context and not yet transmitted.

The data packets compressed with new UDC context may be transmitted with PDCP sequence numbers 1 and 2 and the data compressed with old UDC context and corresponding to PDCP sequence number 2 may arrive late. Since data decompression failure may occur when the two data packets corresponding to PDCP sequence number 2 are not distinguished, the receiver needs to discard the data compressed with old UDC context and sequentially decompress the data packets compressed with new UDC context (3*i*-50).

Figure 22:
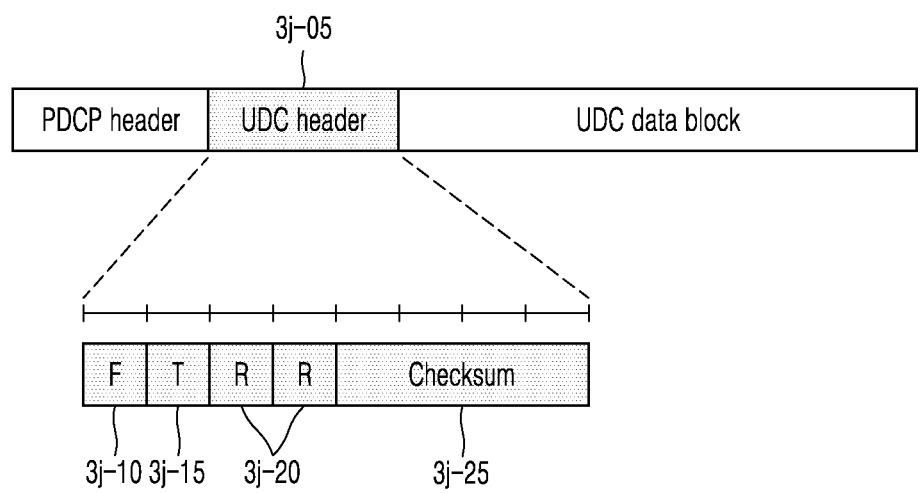
FIG. 22 is an exemplary diagram for describing a UDC header for allowing a receiver to distinguish between data compressed with old UDC context and data compressed with new UDC context, according to an embodiment.

FIG. 22 is a diagram for describing a UDC header 3*j*-05 for allowing a receiver to distinguish between data compressed with old UDC context and data compressed with new UDC context, according to an embodiment.

Referring to FIG. 22, when UDC is applied (when UDC is performed), a PDCP PDU may include a PDCP header, the UDC header 3*j*-05, and a compressed UDC data block. Herein, the UDC header 3*j*-05 may have a size of 1 byte and include an F field 3*j*-10, a T field 3*j*-15, an R field 3*j*-20, and checksum bits 3*j*-25.

In the UDC header 3*j*-05, the F field 3*j*-10 is a field indicating whether UDC is applied or not applied to the UDC data block (the F field 3*j*-10 indicates whether UDC is performed or not performed). That is, a transmitting PDCP entity may set the F field 3*j*-10 to be, for example, 1 when a PDCP SDU is received from an upper layer and UDC is applied thereto, or may set the F field 3*j*-10 to be 0 when UDC is not applied thereto.

The T field 3*j*-15 of the UDC header 3*j*-05 indicates a toggle bit (or T bit) and may be changed whenever a UDC buffer is reset (or whenever UDC is reconfigured, restarted, or reset). That is, the T field 3*j*-15 may be toggled (from 0 to 1 or from 1 to 0). An initial value of the toggle bit may be set to be 0 or 1. For example, when the initial value is 0, the toggle bit of the T field 3*j*-15 of the UDC header 3*j*-05 of all data packets to which UDC is applied by a transmitter may be set to be 0. When the transmitter transmits an RRC message or PDCP control PDU instructing to reset the UDC buffer (or to reconfigure, restart, or reset UDC), to the receiver, the toggle bit 3*j*-15 of the UDC header 3*j*-05 may be set to be 1 for data to which UDC is newly applied. For example, when a checksum error occurs and the receiver notifies the transmitter of the checksum error, the transmitter may toggle the toggle bit 3*j*-15 of the UDC header 3*j*-05 and transmit data, to which UDC is applied, to the receiver. Therefore, when a checksum error occurs in the receiver, the receiver may check the toggle bit 3*j*-15 of the UDC header 3*j*-05, discard data having the same value as the toggle bit 3*j*-15 before the checksum error occurs, and distinguishably and normally process data having a value toggled from the toggle bit 3*j*-15. In this case, when the F field 3*j*-10 indicates that UDC is not applied, the data may not be discarded and may be normally processed regardless of the toggle bit 3*j*-15.

According to an embodiment, when data compressed with old UDC context and data compressed with new UDC context are not distinguishable by the receiver as described above in relation to FIG. 21, the indistinguishableness may be solved by defining and using the toggle bit 3*j*-15 of the UDC header 3*j*-05 as described above.

In an embodiment, the toggle bit 3*j*-15 may not be defined as 1-bit and may be defined and used as more bits by using reserved bits. For example, 2 bits may be defined as toggle bits and be toggled in the order of 00→01→10→11→00→01, e.g., in the order of 0, 1, 2, 3, . . . in decimal numbers. In this case, when the checksum error frequently occurs, a larger number of bits may be defined as toggle bits such that the receiver may better distinguish and process data packets to which UDC is applied.

The R bits 3*j*-20 of FIG. 22 are reserved bits and may be defined and used to indicate whether to reset the UDC buffer, whether to use current data to update the UDC buffer, or whether to use a pre-defined dictionary.

The checksum bits 3*j*-25 of FIG. 22 are used to check validity of the contents of a transmitting UDC buffer used when the transmitter applies UDC, as described above. When the receiver decompresses the compressed UDC data, the receiver may calculate and use checksum bits to check validity of the contents of a receiving UDC buffer. The checksum bits 3*j*-25 may have a length of 4 bits or have a longer length to increase accuracy of checking validity.

A second embodiment of the checksum error processing method using a toggle bit as described above in relation to FIG. 22 may operate as described below.

When a checksum error of a receiving UDC buffer is detected in data to be UDC-decompressed, a receiver (e.g., an eNB or a gNB) transmits an RRC Connection Reconfiguration message (or PDCP control PDU) to a UE to signal that the checksum error occurs. In this case, a new RRC message (or PDCP control PDU) may be defined and used, or a new indicator may be defined and an existing RRC message (or PDCP control PDU) may be modified to include the new indicator. The RRC message (or PDCP control PDU) may indicate a PDCP sequence number of the data in which the checksum error occurs.

Receiver operation: The receiver (e.g., the eNB or the gNB) transmits the RRC message (or PDCP control PDU) including the PDCP sequence number at which the checksum error occurs, and discards all PDCP PDUs (or PDCP SDUs) having PDCP sequence numbers greater than or equal to the PDCP sequence number. The receiver checks a toggle bit of a UDC header of the discarded data, checks a UDC header of subsequently received data, and discards the data when a toggle bit of the UDC header has the same value as the toggle bit of the discarded data, or regards the data as being newly configured by a transmitter and receives and processes the data when the toggle bit of the UDC header has a different value (e.g., a toggled value) from the toggle bit of the UDC header of the discarded data.

Transmitter operation: When the RRC message (or PDCP control PDU) is received, the transmitter (e.g., the UE) may reset a transmitting UDC buffer, discard data not yet transmitted and having PDCP sequence numbers greater than the PDCP sequence number indicated by the RRC message (or PDCP control PDU), perform UDC again on data (e.g., PDCP SDUs) having PDCP sequence numbers equal to or greater than the indicated PDCP sequence number, update the UDC buffer, toggle a toggle bit of a UDC header (from 0 to 1 or from 1 to 0), include checksum bits in the UDC header, and retransmit the data to a lower layer. Among the data (e.g., PDCP SDUs) having PDCP sequence numbers equal to or greater than the indicated PDCP sequence number, the transmitter may not apply UDC to data which does not require application of UDC, set the toggle bit of the UDC header to be the same value, and transmit the data to the lower layer. Among the data having PDCP sequence numbers equal to or greater than the indicated PDCP sequence number, the transmitter may newly compress data to which PDCP sequence numbers have been allocated and which have been compressed (and transmitted), and subsequently compress new data by sequentially allocating new PDCP sequence numbers to the new data and setting the toggle bit of the UDC header to be the same value as the toggled toggle bit.

A third embodiment of the checksum error processing method may operate as described below.

When a checksum error of a receiving UDC buffer is detected in data to be UDC-decompressed, a receiver (e.g., an eNB or a gNB) transmits an RRC Connection Reconfiguration message (or PDCP control PDU) to a UE to signal that the checksum error occurs. In this case, a new RRC message (or PDCP control PDU) may be defined and used, or a new indicator may be defined and an existing RRC message (or PDCP control PDU) may be modified to include the new indicator. The RRC message (or PDCP control PDU) may indicate a PDCP sequence number of the data in which the checksum error occurs.

Receiver operation: The receiver (e.g., the eNB or the gNB) transmits the RRC message (or PDCP control PDU) including the PDCP sequence number at which the checksum error occurs, checks a UDC header (e.g., a 1-bit indicator indicating whether UDC is applied) of PDCP PDUs (or PDCP SDUs) having PDCP sequence numbers greater than or equal to the PDCP sequence number, and discards only PDCP PDUs (or PDCP SDUs) on which UDC is performed. That is, data on which UDC is not performed is not relevant to the checksum error and thus is not discarded. The receiver checks a toggle bit of a UDC header of the discarded data, checks a UDC header of subsequently received data, and discards the data when a toggle bit of the UDC header has the same value as the toggle bit of the discarded data, or regards the data as being newly configured by a transmitter and receives and processes the data when the toggle bit of the UDC header has a different value (e.g., a toggled value) from the toggle bit of the UDC header of the discarded data.

Transmitter operation: When the RRC message (or PDCP control PDU) is received, the transmitter (e.g., the UE) may reset a transmitting UDC buffer, discard data to which UDC is applied and which is not yet transmitted and has PDCP sequence numbers greater than the PDCP sequence number indicated by the RRC message (or PDCP control PDU), perform UDC again on only data (e.g., PDCP SDUs) to which UDC is previously applied and which has PDCP sequence numbers equal to or greater than the indicated PDCP sequence number, update the UDC buffer, toggle a toggle bit of a UDC header, include checksum bits in the UDC header, and retransmit the data to a lower layer. That is, data to which UDC is not applied and which has PDCP sequence numbers greater than the indicated PDCP sequence number is not retransmitted. Among the data having PDCP sequence numbers equal to or greater than the indicated PDCP sequence number, the transmitter may newly compress data to which PDCP sequence numbers have been allocated and which have been compressed (and transmitted), and subsequently compress new data by sequentially allocating new PDCP sequence numbers to the new data and set the toggle bit of the UDC header to be the same value as the toggle bit of the previous UDC header.

A fourth embodiment of the checksum error processing method may operate as described below.

When a checksum error of a receiving UDC buffer is detected in data to be UDC-decompressed, a receiver (e.g., an eNB or a gNB) transmits an RRC Connection Reconfiguration message (or PDCP control PDU) to a UE to signal that the checksum error occurs. In this case, a new RRC message (or PDCP control PDU) may be defined and used, or a new indicator may be defined and an existing RRC message (or PDCP control PDU) may be modified to include the new indicator. The RRC message (or PDCP control PDU) may indicate a PDCP sequence number of the data in which the checksum error occurs.

Receiver operation: The receiver (e.g., the eNB or the gNB) transmits the RRC message including the PDCP sequence number at which the checksum error occurs, and discards only data corresponding to the PDCP sequence number. The receiver checks a toggle bit of a UDC header of the discarded data, checks a UDC header of subsequently received data, and discards the data when a toggle bit of the UDC header has the same value as the toggle bit of the discarded data, or regards the data as being newly configured by a transmitter and receives and processes the data when the toggle bit of the UDC header has a different value (e.g., a toggled value) from the toggle bit of the UDC header of the discarded data.

Transmitter operation: When the RRC message is received, the transmitter (e.g., the UE) may reset a transmitting UDC buffer, reconfigure only data corresponding to the PDCP sequence number indicated by the RRC message, and retransmit the data (or retransmit data of the buffer when the data is stored in the buffer). Herein, the transmitter may transmit contents of the transmitting UDC buffer, which are used to apply UDC to the data corresponding to the indicated PDCP sequence number (a new PDCP control PDU may be defined and transmitted). That is, to update the receiving UDC buffer having the checksum error and to achieve synchronization between the contents of the transmitting UDC buffer and contents of the receiving UDC buffer, the transmitter may transmit the contents of the transmitting UDC buffer corresponding to the PDCP sequence number, thereby updating the receiving UDC buffer and achieving synchronization.

Figure 23:
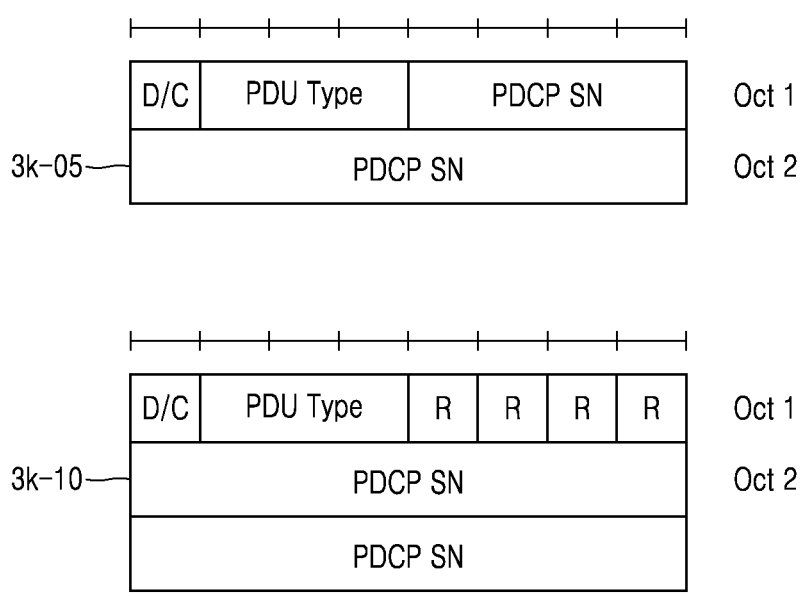
FIG. 23 is an exemplary diagram for describing a packet data convergence protocol (PDCP) control PDU format usable in a checksum error processing method, according to an embodiment.

FIG. 23 is a diagram for describing a PDCP control PDU format usable in a checksum error processing method, according to an embodiment.

In FIG. 23, a D/C field is to distinguish between a general PDCP PDU and a PDCP control PDU, and a PDU type field indicates the type of the PDCP control PDU. The PDCP control PDU format usable in the checksum error processing method according to an embodiment may have different sizes 3k-05 and 3k-10 depending on lengths of a PDCP sequence number, and may be used when a receiver indicates a PDCP sequence number at which a checksum error occurs. Herein, when the receiver indicates the PDCP sequence number at which the checksum error occurs, an existing PDCP control PDU for a PDCP status report may also be used. That is, the PDCP control PDU format proposed in FIG. 23 may be used as a control command of a PDCP entity for UDC feedback (e.g., an interspersed UDC feedback packet). In addition, the proposed PDCP control PDU may be modified to a format including an indicator of the checksum error.

In checksum error processing methods according to embodiments, a transmitter may equally perform the above-described methods on data from data corresponding to a PDCP sequence number immediately before the PDCP sequence number signaled by a receiver.

Figure 24:
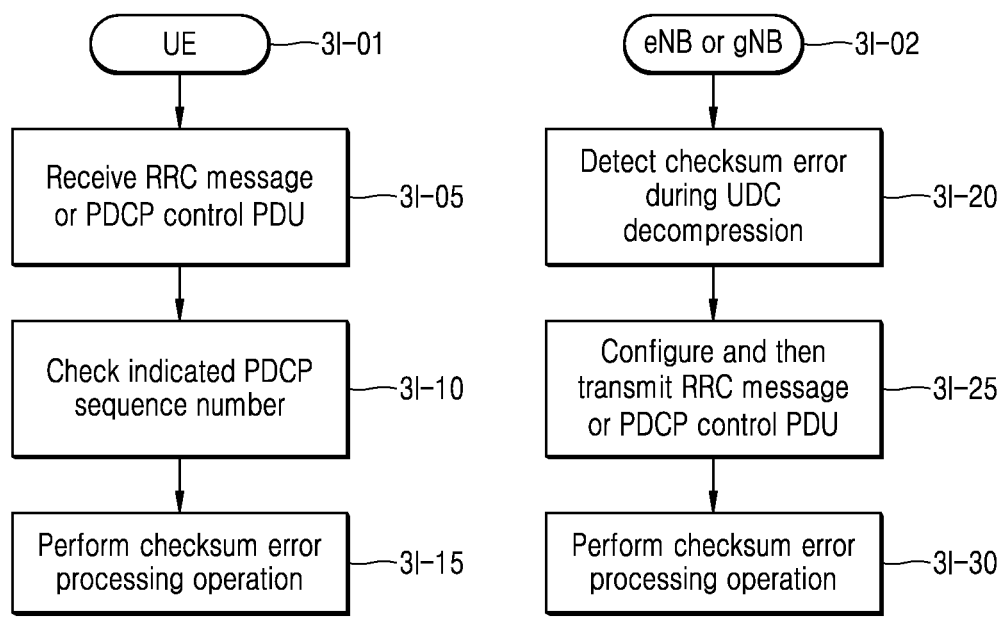
FIG. 24 is an exemplary flowchart for describing a UE operation and a base station operation for performing a checksum error processing method, according to an embodiment.

FIG. 24 is a flowchart for describing a UE operation and a base station operation for performing a checksum error processing method, according to an embodiment.

Referring to FIG. 24, when a checksum error is detected during UDC decompression (31-20), an eNB (or gNB) 31-02 may transmit, to a UE 31-01, an RRC message or PDCP control PDU including a PDCP sequence number corresponding to the checksum error (31-25). In this case, the eNB (or gNB) 31-02 may report the checksum error to the UE and discard or normally process data received or to be received, based on PDCP sequence numbers (the data may be distinguished and processed using a F bit and a T bit of a UDC header) (31-30).

When the RRC message or PDCP control PDU indicating the checksum error is received (31-05), the UE 31-01 may check the PDCP sequence number indicated by the RRC message or PDCP control PDU (31-10), and perform a checksum error processing operation.

The checksum error processing operation of the eNB (or gNB) 31-02 and the UE 31-01 may follow the afore-described first, second, third, or fourth embodiment of the checksum error processing method.

The UE and eNB (or gNB) operations for transmitting compressed UL data and solving a checksum error when the checksum error occurs, in a UL environment according to an embodiment may be equally applied to eNB (or gNB) and UE operations for transmitting compressed DL data and solving a checksum error when the checksum error occurs, in a DL environment. That is, the UE operation in the UL environment according to an embodiment may be equally applied to the eNB (or gNB) operation in the DL environment, and the eNB (or gNB) operation in the UL environment may be equally applied to the UE operation in the DL environment. When an eNB (or gNB) compresses DL data, an IP (or QoS) flow for which data compression is performed and an IP (or QoS) flow for which data compression is not performed may be determined based on information included in a NAS message transmitted from a CN. For example, the CN may transmit, to the eNB (or gNB), the NAS message including information indicating an IP (or QoS) flow for which data compression is performed by an upper layer (e.g., an application layer), information indicating an IP (or QoS) flow for which data compression is required, or the like.

According to an embodiment, since a transmitter transmits compressed data, more data may be transmitted and coverage may be improved.

A data ciphering method in a case when a transmitting PDCP entity and a receiving PDCP entity use a UDC function, according to an embodiment, will now be described.

A first embodiment of the data ciphering method is as described below.

When data is received from an upper layer and when it is determined to apply UDC, a transmitting PDCP entity may generate a compressed UDC data block by applying UDC to the upper layer data, and configure and concatenate a 1-byte UDC header including a 1-bit indicator indicating that UDC is applied, in front of the UDC data block. The transmitting PDCP entity may integrally cipher the UDC header and the UDC data block by using a security key, configure and concatenate a PDCP header in front of the ciphered UDC header and the UDC data block, and transmit the data to a lower layer. When it is determined not to apply UDC to the upper layer data, the transmitting PDCP entity may not apply UDC to the upper layer data and may configure and concatenate a 1-byte UDC header including a 1-bit indicator indicating that UDC is not applied, in front of the upper layer data. The transmitting PDCP entity may integrally cipher the UDC header and the upper layer data by using a security key, configure and concatenate a PDCP header in front of the ciphered UDC header and the upper layer data, and transmit the data to the lower layer.

In the first embodiment of the data ciphering method, the UDC header and the UDC data block may be integrally ciphered using the security key. When the UDC header and the UDC data block are integrally ciphered using the security key as described above, since UDC compression and UDC header configuration may be implemented as a series of processes in view of the transmitting PDCP entity, a UDC function may be separately and easily implemented.

A second embodiment of the data ciphering method is as described below.

When data is received from an upper layer and when it is determined to apply UDC, a transmitting PDCP entity may generate a compressed UDC data block by applying UDC to the upper layer data, cipher the UDC data block by using a security key, and configure and concatenate a 1-byte UDC header including a 1-bit indicator indicating that UDC is applied, in front of the UDC data block. The transmitting PDCP entity may configure and concatenate a PDCP header in front of the UDC header and the UDC data block, and transmit the data to a lower layer. When it is determined not to apply UDC to the upper layer data, the transmitting PDCP entity may not apply UDC to the upper layer data and may cipher the upper layer data by using a security key, and concatenate a 1-byte UDC header in front of the ciphered upper layer data. The transmitting PDCP entity may configure and concatenate a PDCP header in front of the UDC header and the ciphered upper layer data, and transmit the data to the lower layer.

In the second embodiment of the data ciphering method, only the UDC data block or the upper layer data other than the UDC header may be ciphered using the security key. When only the UDC data block or the upper layer data other than the UDC header is ciphered using the security key as described above, since a receiving PDCP entity may read the PDCP header and then read the UDC header without deciphering the UDC header, when checksum bits of a receiving UDC buffer are calculated by checking a checksum field of the UDC header and when it is determined that a checksum error occurs, the receiving PDCP entity does not need to decipher a UDC data block in which the checksum error occurs. Therefore, processing complexity and processing load of the receiving PDCP entity may be reduced.

Figure 25:
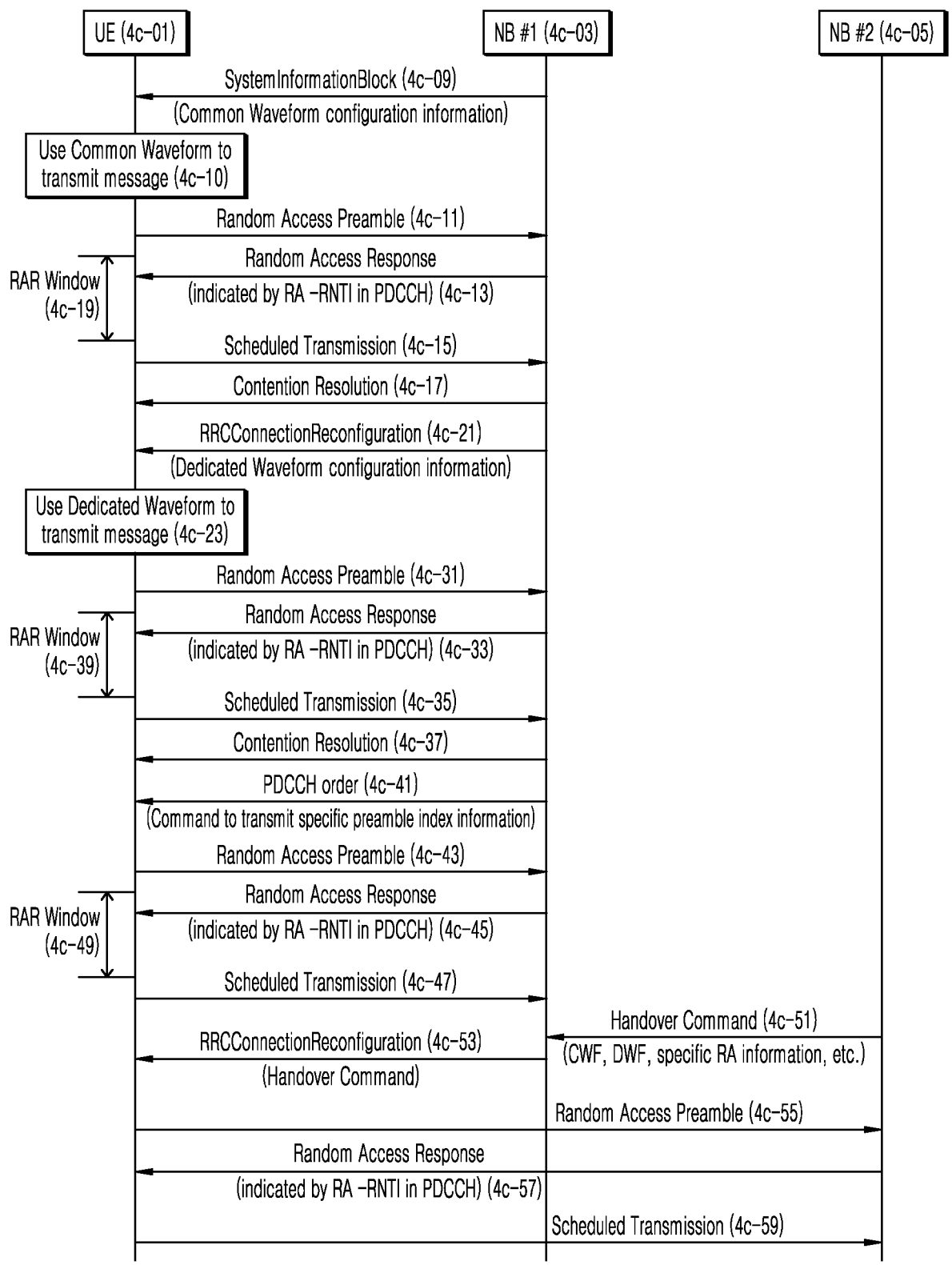
FIG. 25 is an exemplary flowchart for describing a procedure related to random access of a UE to a base station, and configuration of an uplink (UL) waveform, according to an embodiment.

FIG. 25 is a flowchart for describing a procedure related to random access of a UE to a base station, and configuration of a UL waveform, according to an embodiment.

Referring to FIG. 25, for various purposes requiring random access, e.g., initial access, re-access, and handover, a UE 4c-01 performs random access on a NB 4c-03 as described below. In FIG. 25, it is assumed that the UE 4c-01 is in an IDLE status and desires to access the NB 4c-03 to be transited to a CONNECTED state.

Initially, the UE 4c-01 receives a system information block transmitted by the NB 4c-03 and required to access the NB 4c-03 (4c-09). The system information is broadcasted to all UEs in a cell and provides, for example, channel configuration information required when the UEs accesses the NB 4c-03. For example, the configuration information may include various parameters required for random access and will be described below (e.g., a preamble index range usable for random access, and allocation information of a physical random access resource). The configuration information may also provide configuration information of a transmit waveform basically used for UL transmission. A NR system to which an embodiment is applicable supports the following two UL (i.e., a radio link from a UE to a NB) signal transmission technologies.

Single-carrier frequency-division multiple access (SC-FDMA): This generally provides a wider coverage.
Orthogonal frequency-division multiple access (OFDMA): This is also used for a DL and thus a transmission and reception structure may be simplified.

Since the above-described two technologies are simultaneously usable by the NB 4c-03, the technology/waveform used by the UE 4c-01 to transmit a message on a UL should be known by the NB 4c-03 to appropriately receive the message. Therefore, when the UE 4c-01 initially accesses the cell, the NB 4c-03 needs to provide UL waveform information to the UE 4c-01 in advance and the above-described system information block includes such information indicating a UL technology/waveform to be used for UL transmission by the UE 4c-01. Such a waveform is called a common waveform (CWF). Thereafter, except for special physical signals to be described below, e.g., a preamble, the UE 4c-01 transmits all UL data by using the indicated CWF (4c-10).

The UE 4c-01 having obtained the system information transmits a random access preamble to the NB 4c-03 through a physical channel for random access (4c-11). Such a physical channel is called a physical random access channel (PRACH) in an LTE system and, in some cases, one or more UEs may simultaneously transmit random access preambles by using a corresponding PRACH resource. The random access preamble is a specific sequence specially designed to be receivable even before being completely synchronized with the NB 4c-03 and a plurality of preamble indices may be present depending on the standards. When a plurality of preamble indices are present, the preamble transmitted by the UE 4c-01 may be randomly selected by the UE 4c-01, or may be a specific preamble designated by the NB 4c-03.

When the preamble is received, the NB 4c-03 transmits a random access response (RAR) message to the UE 4c-01 (4c-13). The RAR message includes index information of the preamble used in operation 4c-11, UL transmission timing correction information, allocation information of a UL resource to be used in a subsequent operation (i.e., 4c-15), temporary UE identity information, etc. The index information of the preamble is transmitted to identify a preamble to which the RAR message is a response, for example, when a plurality of UEs transmit different preambles to attempt random access in operation 4c-11. The UL resource allocation information is detailed information about a resource to be used by the UE 4c-01 in operation 4c-15, and includes a physical location and size of the resource, a modulation and coding scheme to be used for transmission, transmit power adjustment information, etc. The temporary UE identity information is a value transmitted because, when the UE 4c-01 having transmitted the preamble initially accesses the NB 4c-03, the UE 4c-01 does not have an identity allocated by the NB 4c-03 for communication with the NB 4c-03.

The RAR message needs to be transmitted within a certain period after a certain time from when the preamble is sent, and such a certain period is called a RAR window. When the RAR message is transmitted, the NB 4c-03 schedules the RAR message through a PDCCH, corresponding scheduling information is scrambled using a random access-radio network temporary identifier (RA-RNTI), and the RA-RNTI is mapped to a PRACH resource used to transmit the preamble in operation 4c-11. The UE 4c-01 having transmitted the preamble by using a specific PRACH resource determines whether the RAR message is received, by attempting PDCCH reception based on the corresponding RA-RNTI.

The UE 4c-01 having received the RAR message transmits a message according to the above-described various purposes by using the resource allocated by the RAR message (4c-15). Referring to FIG. 25, such a message is called message 3 (Msg3) (that is, the preamble of operation 4c-11 is called message 1 (Msg1) and the RAR message of operation 4c-13 is called message 2 (Msg2)). For example, the Msg3 transmitted by the UE 4c-01 includes an RRC Connection Request message for initial access, includes an RRC Connection Reestablishment Request message for re-access, or includes an RRC Connection Reconfiguration Complete message for handover. Alternatively, a buffer status report (BSR) message for requesting a resource may be transmitted.

In this case, as described above, the UE 4c-01 transmits the Msg3 to the NB 4c-03 by using the CWF indicated by the information received in 4c-09.

Then, when the Msg3 is initially transmitted (for example, when the Msg3 does not include NB identity information previously allocated for the UE 4c-01), the UE 4c-01 may receive a contention resolution message from the NB 4c-03 (4c-17). The contention resolution message includes the entirety of the information included in the Msg3 transmitted by the UE 4c-01 and thus the UE 4c-01 to receive the contention resolution message may be identified even when a plurality of UEs select the same preamble in operation 4c-11.

Thereafter, the NB 4c-03 may instruct the UE 4c-01 to use a UL waveform other than the above-described CWF (4c-21). For example, a scenario in which, when the NB 4c-03 configures OFDMA for the UE 4c-01 but a wider coverage is required due to UE signal weakening or the like, the UL waveform configuration is changed to SC-FDMA is possible. Such a specific waveform only for the UE 4c-01 is called a dedicated waveform (DWF).

The UE 4c-01 having instructed to use the UL waveform other than the above-described CWF uses the DWF to transmit a message to the NB 4c-03 (4c-23).

Even after the DWF is configured, the UE 4c-01 may perform the above-described contention-based random access (CBRA) on the NB 4c-03 (4c-31, 4c-33, 4c-35, and 4c-37). CBRA refers to a case in which a certain UE may not perform random access because a NB does not allocate a random access resource (e.g., an index and a physical resource) for the UE.

When CBRA is applied, when the UE 4c-01 transmits Msg3 (4c-35) by using a UL resource indicated by a RAR message (4c-33), the NB 4c-03 does not know whether a DWF is configured for the UE 4c-01. As such, even the UE 4c-01 for which the DWF is configured uses the CWF to transmit the Msg3 (4c-35).

When the UE 4c-01 is in a CONNECTED state, the NB 4c-03 may allocate a random access resource (e.g., an index and a physical resource) for the UE 4c-01 and thus the UE 4c-01 may perform contention-free random access (CFRA). In this case, for example, the NB 4c-03 may instruct the UE 4c-01 through the PDCCH to transmit a specific random access preamble (4c-41). As such, when the UE 4c-01 transmits the corresponding random access preamble (4c-43), the NB 4c-03 allocates a RAR message in response to the preamble (4c-45). Although CFRA does not require a contention resolution process using Msg3/Msg4, since the RAR message includes allocation information of a UL resource, the UE 4c-01 may transmit data of the UE 4c-01 by using the corresponding resource (4c-47). According to an embodiment, in CFRA, the Msg3 may be transmitted using the DWF when the DWF is configured, or may be transmitted using the CWF when the DWF is not configured.

According to another embodiment, a scenario in which the UE 4c-01 always uses the CWF to transmit the Msg3 regardless of whether the DWF is configured is also possible. That is, when the DWF is configured, the UE 4c-01 may use the DWF to transmit PUSCH data by using a resource allocated to an identifier (e.g., a C-RNTI) of the UE 4c-01, or use the CWF to transmit PUSCH data by using a resource allocated by the RAR message during random access.

Thereafter, a scenario of performing handover for a reason such as movement of the UE 4c-01 may be additionally considered. As such, when the UE 4c-01 reports a result of measuring a neighboring NB 4c-05 (hereinafter referred to as a target NB) and the NB 4c-03 (hereinafter referred to as a source NB) determines to hand the UE 4c-01 over to the target NB 4c-05, the source NB 4c-03 transmits a handover request to the target NB 4c-05 and the target NB 4c-05 transmits a handover command (4c-51). In this case, the handover command may include information about a waveform used as a CWF by the target NB 4c-05 and information about a waveform used as a DWF when the DWF is configured for the UE 4c-01. In addition, the handover command includes information required to perform random access on the target NB 4c-05 for handover. For example, the target NB 4c-05 may transmit, to the source NB 4c-03, the handover command including not only channel resource information for CBRA but also a specific random access resource (e.g., a preamble index). The source NB 4c-03 having received the handover command transmits all the information included in the handover command, to the UE 4c-01 to command handover to the target NB 4c-05 (4c-53).

Thereafter, the UE 4c-01 achieves synchronization with the target NB 4c-05 and then performs random access on the target NB 4c-05. In this case, when the target NB 4c-05 has provided a random access preamble or the like, the UE 4c-01 performs the above-described CFRA operation. Then, when a RAR message is successfully received from the target NB 4c-05, the UE 4c-01 uses a DWF to transmit Msg3 (e.g., a handover complete message) by using a resource allocated by the RAR message (4c-59).

However, when a specific random access resource is not configured or when a specific random access resource is configured but random access attempted using the specific random access resource for a configured certain period fails, the UE 4c-01 needs to perform CBRA and thus uses the CWF of the target NB 4c-05 to transmit Msg3 (e.g., a handover complete message).

Figure 26:
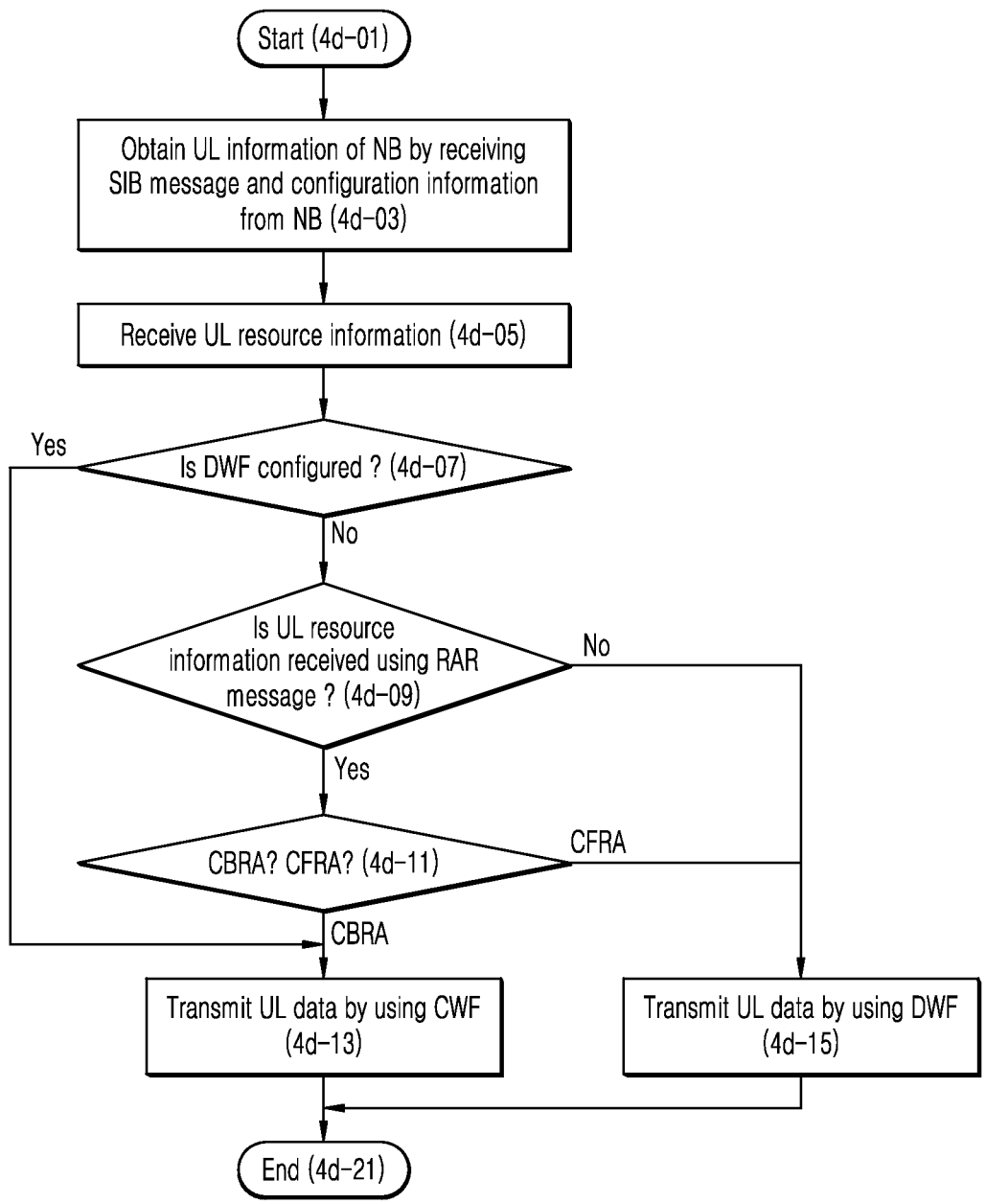
FIG. 26 is an exemplary flowchart for describing a UE operation according to an embodiment.

FIG. 26 is a flowchart for describing a UE operation according to an embodiment.

In an embodiment, a UE obtains CWF information from a system information block (or a handover command) as described above, and obtains DWF information from a message (or a handover command) additionally configured for the UE (4d-03).

When UL resource information is received from a NB (4d-05) and when a DWF is not configured (4d-07), the UE transmits UL data by using the CWF (4d-13).

However, when a DWF is configured (4d-07), the UE determines whether the UL resource information is received using a RAR message or through a PDCCH (4d-09). When the UL resource information is received using a RAR message, the UE determines whether the UL resource information corresponds to CBRA or CFRA (4d-11). As such, when the UL resource information corresponds to CBRA, although the DWF is configured, the UE transmits UL data by using the CWF (4d-13).

However, when the UL resource information is not received using a RAR message or when the UL resource information is received using a RAR message but corresponds to CFRA, the UE transmits UL data by using the DWF (4d-15).

Figure 27:
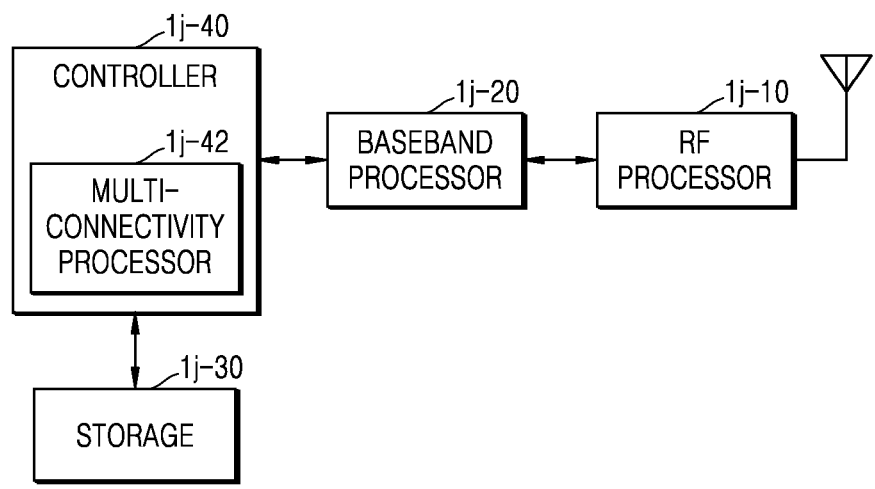
FIG. 27 is an exemplary block diagram of a UE according to an embodiment.

FIG. 27 is a block diagram of a UE according to an embodiment.

Referring to FIG. 27, the UE includes a radio frequency (RF) processor 1j-10, a baseband processor 1j-20, a storage 1j-30, and a controller 1j-40.

The RF processor 1j-10 performs functions for transmitting and receiving signals through radio channels, e.g., signal band conversion and amplification. That is, the RF processor 1j-10 upconverts a baseband signal provided from the baseband processor 1j-20, to a RF band signal and transmits the RF band signal through an antenna, and downconverts a RF band signal received through an antenna, to a baseband signal. For example, the RF processor 1j-10 may include a transmit filter, a receive filter, an amplifier, a mixer, an oscillator, a digital-to-analog convertor (DAC), and an analog-to-digital convertor (ADC). Although only a single antenna is illustrated in FIG. 27, the UE may include multiple antennas. The RF processor 1j-10 may include multiple RF chains. The RF processor 1j-10 may perform beamforming. For beamforming, the RF processor 1j-10 may adjust phases and amplitudes of signals transmitted or received through multiple antennas or antenna elements. The RF processor 1j-10 may perform multiple input multiple output (MIMO) and may receive data of multiple layers in the MIMO operation. The RF processor 1j-10 may perform received beam sweeping by appropriately configuring multiple antennas or antenna elements, or adjust a direction and a beam width of the received beam to coordinate with a transmit beam, under the control of the controller 1j-40.

The baseband processor 1j-20 converts between a baseband signal and a bitstream based on physical layer specifications of a system. For example, for data transmission, the baseband processor 1j-20 generates complex symbols by encoding and modulating a transmit bitstream. For data reception, the baseband processor 1j-20 reconstructs a received bitstream by demodulating and decoding a baseband signal provided from the RF processor 1j-10. For example, according to an orthogonal frequency-division multiplexing (OFDM) scheme, for data transmission, the baseband processor 1j-20 generates complex symbols by encoding and modulating a transmit bitstream, maps the complex symbols to subcarriers, and then configures OFDM symbols by performing inverse fast Fourier transformation (IFFT) and cyclic prefix (CP) insertion. For data reception, the baseband processor 1j-20 segments a baseband signal provided from the RF processor 1j-10, in OFDM symbol units, reconstructs signals mapped to subcarriers by performing fast Fourier transformation (FFT), and then reconstructs a received bitstream by demodulating and decoding the signals.

The baseband processor 1j-20 and the RF processor 1j-10 transmit and receive signals as described above. As such, each of the baseband processor 1j-20 and the RF processor 1j-10 may also be called a transmitter, a receiver, a transceiver, or a communication unit. At least one of the baseband processor 1j-20 and the RF processor 1j-10 may include multiple communication modules to support multiple different radio access technologies. At least one of the baseband processor 1j-20 and the RF processor 1j-10 may include multiple communication modules to process signals of different frequency bands. For example, the different radio access technologies may include a wireless local area network (wireless LAN) (e.g., IEEE 802.11) and a cellular network (e.g., LTE). The different frequency bands may include a super-high frequency (SHF) (e.g., 2.5 GHz, 2 NRHz, 5 GHz, and NRhz) band and a millimeter wave (mmWave) (e.g., 60 GHz) band.

The storage 1j-30 stores data for operation of the UE, e.g., basic programs, application programs, and configuration information. In particular, the storage 1j-30 may store information about a second access node for performing wireless communication by using a second radio access technology. The storage 1j-30 provides the stored data upon request by the controller 1j-40.

The controller 1j-40 controls overall operations of the UE. For example, the controller 1j-40 transmits and receives signals through the baseband processor 1j-20 and the RF processor 1j-10. The controller 1j-40 records and reads data on or from the storage 1j-30. In this regard, the controller 1j-40 may include at least one processor. For example, the controller 1j-40 may include a communication processor (CP) for controlling communications and an application processor (AP) for controlling an upper layer such as an application program. According to an embodiment, the controller 1j-40 includes a multi-connectivity processor 1j-42 for operation in a multi-connectivity mode. In addition, the controller 1j-40 may control a UE operation. Furthermore, the controller 1j-40 may control UL data transmission by determining a waveform to be used, based on CWF or DFW information received from a base station.

Figure 28:
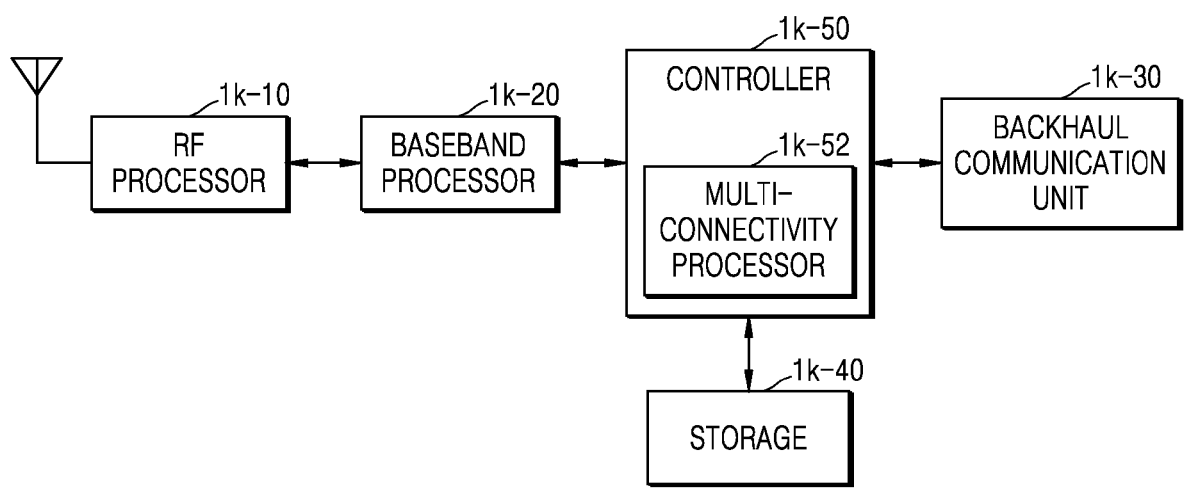
FIG. 28 is an exemplary block diagram of a base station according to an embodiment.

FIG. 28 is a block diagram of a base station according to an embodiment.

As illustrated in FIG. 28, the base station includes a RF processor 1k-10, a baseband processor 1k-20, a backhaul communication unit 1k-30, a storage 1k-40, and a controller 1k-50.

The RF processor 1k-10 performs functions for transmitting and receiving signals through radio channels, e.g., signal band conversion and amplification. That is, the RF processor 1k-10 upconverts a baseband signal provided from the baseband processor 1k-20, to a RF band signal and transmits the RF band signal through an antenna, and downconverts a RF band signal received through an antenna, to a baseband signal. For example, the RF processor 1k-10 may include a transmit filter, a receive filter, an amplifier, a mixer, an oscillator, a DAC, and an ADC. Although only a single antenna is illustrated in FIG. 28, the base station may include multiple antennas. The RF processor 1k-10 may include multiple RF chains. The RF processor 1k-10 may perform beamforming. For beamforming, the RF processor 1k-10 may adjust phases and amplitudes of signals transmitted or received through multiple antennas or antenna elements. The RF processor 1k-10 may perform DL MIMO by transmitting data of two or more layers.

The baseband processor 1k-20 converts between a baseband signal and a bitstream based on physical layer specifications of a first radio access technology. For example, for data transmission, the baseband processor 1k-20 generates complex symbols by encoding and modulating a transmit bitstream. For data reception, the baseband processor 1k-20 reconstructs a received bitstream by demodulating and decoding a baseband signal provided from the RF processor 1k-10. For example, according to an OFDM scheme, for data transmission, the baseband processor 1k-20 generates complex symbols by encoding and modulating a transmit bitstream, maps the complex symbols to subcarriers, and then configures OFDM symbols by performing IFFT and CP insertion. For data reception, the baseband processor 1k-20 segments a baseband signal provided from the RF processor 1k-10, in OFDM symbol units, reconstructs signals mapped to subcarriers by performing FFT, and then reconstructs a received bitstream by demodulating and decoding the signals. The baseband processor 1k-20 and the RF processor 1k-10 transmit and receive signals as described above. As such, each of the baseband processor 1k-20 and the RF processor 1k-10 may also be called a transmitter, a receiver, a transceiver, a communication unit, or a wireless communication unit.

The backhaul communication unit 1k-30 provides an interface for communicating with other nodes in a network. That is, the backhaul communication unit 1k-30 transforms a bitstream to be transmitted from a primary base station to another node, e.g., a secondary base station or a core network, into a physical signal, or transforms a physical signal received from another node, into a bitstream.

The storage 1k-40 stores data for operation of the primary base station, e.g., basic programs, application programs, and configuration information. In particular, the storage 1k-40 may store information about bearers allocated for a connected UE, a measurement report transmitted from the connected UE, etc. The storage 1k-40 may store criteria information used to determine whether to provide or release multi-connectivity to or from the UE. The storage 1k-40 provides the stored data upon request by the controller 1k-50.

The controller 1k-50 controls overall operations of the primary base station. For example, the controller 1k-50 transmits and receives signals through the baseband processor 1k-20 and the RF processor 1k-10 or through the backhaul communication unit 1k-30. The controller 1k-50 records and reads data on or from the storage 1k-40. In this regard, the controller 1k-50 may include at least one processor.

The methods according to the embodiments described in the claims or the detailed description may be implemented in hardware, software, or a combination of hardware and software.

When the methods are implemented in software, a computer-readable recording medium having one or more programs (software modules) recorded thereon may be provided. The one or more programs recorded on the computer-readable recording medium are configured to be executable by one or more processors in a device. The one or more programs include instructions to execute the methods according to the embodiments described in the claims or the detailed description.

The programs (e.g., software modules or software) may be stored in random access memory (RAM), non-volatile memory including flash memory, read-only memory (ROM), electrically erasable programmable read-only memory (EEPROM), a magnetic disc storage device, a compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according the embodiments of the present disclosure. Another storage device on the communication network may also be connected to the apparatus performing the embodiments of the present disclosure.

In the afore-described embodiments, elements included in the present disclosure are expressed in a singular or plural form according to the disclosed embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

It should be understood that embodiments described herein should be considered in a descriptive sense only and not for purposes of limitation. Descriptions of features or aspects within each embodiment should be considered as available for other similar features or aspects in other embodiments. The afore-described embodiments may operate in combination when required. For example, a base station and a UE may operate according to a combination of parts of the embodiments. Although the embodiments have been described on the basis of a FDD LTE system, modifications thereof based on the technical aspects of the embodiments are applicable to other systems such as 5G or NR systems.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
  receiving, from a base station, configuration information for a bandwidth part (BWP) of a serving cell, the configuration information including information associated with a BWP timer;
  performing a BWP switching and starting the BWP timer, in case that a physical downlink control channel (PDCCH) for the BWP switching of the serving cell is received;
  receiving, from the base station, a radio resource control (RRC) message associated with a handover;
  stopping the BWP timer based on the RRC message;
  in case that information for a BWP of a target cell is included in the RRC message, performing, on the target cell, a random access procedure based on the information for the BWP of the target cell included in the RRC message; and
  in case that the information for the BWP of the target cell is not included in the RRC message, performing, on the target cell, the random access procedure based on information for a BWP included in system information received from the target cell.

2. The method of claim 1, wherein the information for the BWP of the target cell comprises information for an initial BWP of the target cell.

3. The method of claim 1, further comprising:
  restarting the BWP timer in case that a PDCCH for a resource allocation is received.

4. The method of claim 3, further comprising:
  performing a BWP switching to a default BWP in case that the BWP timer expires.

5. The method of claim 1, further comprising:
  performing a downlink synchronization with the target cell based on the RRC message.

6. The method of claim 1, wherein, the configuration information further includes information on a downlink BWP and an uplink BWP, and
  wherein, the downlink BWP is paired with the uplink BWP and a switching of the uplink BWP is performed based on the BWP timer, in case that the wireless communication system is operating in a time division duplex (TDD) mode.

7. A user equipment (UE) in a wireless communication system, the UE comprising:
  a transceiver; and
  at least one controller configured to:
    receive, from a base station, configuration information for a bandwidth part (BWP) of a serving cell, the configuration information including information associated with a BWP timer,
    perform a BWP switching and starting the BWP timer in case that a physical downlink control channel (PDCCH) for the BWP switching of the serving cell is received,
    receive, from the base station, a radio resource control (RRC) message associated with a handover,
    stop the BWP timer based on the RRC message,
    in case that information for a BWP of a target cell is included in the RRC message, perform, on the target cell, a random access procedure based on the information for the BWP of the target cell included in the RRC message; and
    in case that the information for the BWP of the target cell is not included in the RRC message, perform, on the target cell, the random access procedure based on information for a BWP included in system information received from the target cell.

8. The UE of claim 7, wherein the information for the BWP of the target cell comprises information for an initial BWP of the target cell.

9. The UE of claim 7, wherein the at least one controller is further configured to restart the BWP timer in case that a PDCCH for a resource allocation is received.

10. The UE of claim 9, wherein the at least one controller is further configured to perform a BWP switching to a default BWP in case that the BWP timer expires.

11. The UE of claim 7, wherein the at least one controller is further configured to perform a downlink synchronization with the target cell based on the RRC message.

12. The UE of claim 7, wherein the configuration information further includes information on a downlink BWP and an uplink BWP, and
wherein, the downlink BWP is paired with the uplink BWP and a switching of the uplink BWP is performed based on the BWP timer in case that the wireless communication system is operating a time division duplex (TDD) mode.

13. A method performed by a base station in a wireless communication system, the method comprising:
transmitting, to a user equipment (UE), configuration information for a bandwidth part (BWP) of a serving cell, the configuration information including information associated with a BWP timer;
transmitting, to the UE, a physical downlink control channel (PDCCH) for a BWP switching of the serving cell;
transmitting, to the UE, a radio resource control (RRC) message associated with a handover, the RRC message including information for a BWP of a target cell; and
forwarding data to the target cell,
wherein the RRC message triggers the UE to perform a downlink synchronization with the target cell, and to stop the BWP timer.

14. The method of claim 13, wherein the information for the BWP of the target cell comprises information for an initial BWP of the target cell.

15. The method of claim 13, wherein the configuration information further includes information on a downlink BWP and an uplink BWP, and
wherein the downlink BWP is paired with the uplink BWP and a switching of the uplink BWP is performed based on the BWP timer, in case that the wireless communication system is operating in a time division duplex (TDD) mode.

16. A base station in a wireless communication system, the base station comprising:
a transceiver; and
at least one controller configured to:
transmit, to a user equipment (UE), configuration information for a bandwidth part (BWP) of a serving cell, the configuration information including information associated with a BWP timer,
transmit, to the UE, a physical downlink control channel (PDCCH) for a BWP switching of the serving cell,
transmit, to the UE, a radio resource control (RRC) message associated with a handover, the RRC message including information for a BWP of a target cell, and
forward data to the target cell,
wherein the RRC message triggers the UE to perform a downlink synchronization with the target cell, and to stop the BWP timer.

17. The base station of claim 16, wherein the information for the BWP of the target cell comprises information for an initial BWP of the target cell.

18. The base station of claim 16, wherein the configuration information further includes information on a downlink BWP and an uplink BWP, and
wherein the downlink BWP is paired with the uplink BWP and a switching of the uplink BWP is performed based on the BWP timer, in case that the wireless communication system is operating in a time division duplex (TDD) mode.

* * * * *